(12) United States Patent
Stull et al.

(10) Patent No.: US 8,001,607 B2
(45) Date of Patent: Aug. 16, 2011

(54) SYSTEM AND METHOD FOR OBFUSCATION OF DATA ACROSS AN ENTERPRISE

(75) Inventors: Edward L. Stull, Brookeville, MD (US); Robert J. Lentz, East Hartford, CT (US); George Lang, East Northport, NY (US)

(73) Assignee: Direct Computer Resources, Inc., Franklin Lakes, NJ (US)

( * ) Notice: Subject to any disclaimer, the term of this patent is extended or adjusted under 35 U.S.C. 154(b) by 1067 days.

(21) Appl. No.: 11/738,477

(22) Filed: Apr. 21, 2007

(65) Prior Publication Data

US 2008/0275829 A1 Nov. 6, 2008

Related U.S. Application Data

(60) Provisional application No. 60/848,015, filed on Sep. 27, 2006.

(51) Int. Cl.
*G06F 7/04* (2006.01)

(52) U.S. Cl. ............... 726/26; 706/14; 706/26; 706/45; 706/902

(58) Field of Classification Search .................. None
See application file for complete search history.

(56) References Cited

U.S. PATENT DOCUMENTS

| | | | |
|---|---|---|---|
| 5,826,268 A | 10/1998 | Schaefer et al. | |
| 6,061,449 A | 5/2000 | Candelore et al. | |
| 6,363,337 B1 * | 3/2002 | Amith | 704/7 |
| 6,374,402 B1 | 4/2002 | Schmeidler et al. | |
| 6,473,851 B1 * | 10/2002 | Plutowski | 713/1 |
| 6,640,305 B2 | 10/2003 | Kocher et al. | |
| 6,643,648 B1 | 11/2003 | Ross et al. | |
| 6,654,754 B1 | 11/2003 | Knauft et al. | |
| 6,662,235 B1 * | 12/2003 | Callis et al. | 719/318 |
| 6,668,325 B1 | 12/2003 | Collberg et al. | |
| 6,732,172 B1 * | 5/2004 | House et al. | 709/225 |
| 6,763,370 B1 | 7/2004 | Schmeidler et al. | |
| 6,862,683 B1 | 3/2005 | Wille et al. | |
| 6,901,516 B1 | 5/2005 | Howard et al. | |
| 6,981,217 B1 | 12/2005 | Knauft et al. | |
| 7,003,107 B2 | 2/2006 | Ananth | |
| 7,007,025 B1 | 2/2006 | Nason et al. | |
| 7,017,188 B1 | 3/2006 | Schmeidler et al. | |
| 7,054,443 B1 | 5/2006 | Jakubowski et al. | |
| 7,062,707 B1 | 6/2006 | Knauft et al. | |
| 7,080,257 B1 | 7/2006 | Kabubowski et al. | |
| 7,103,181 B2 | 9/2006 | Ananth | |
| 7,150,003 B2 | 12/2006 | Naumovich et al. | |
| 2001/0018678 A1 * | 8/2001 | Weiss et al. | 705/37 |
| 2002/0042875 A1 | 4/2002 | Shukla | |
| 2003/0046572 A1 | 3/2003 | Newman et al. | |

(Continued)

*Primary Examiner* — Edan Orgad
*Assistant Examiner* — Brian Olion
(74) *Attorney, Agent, or Firm* — Antoinette M. Tease

(57) ABSTRACT

A system for obfuscating data across an enterprise, comprising a rule evaluator; an active rule editor; and an active rule editor repository; wherein the rule evaluator evaluates active rules and optimizes its behavior based on both user-specified guidance and properties learned during system execution; wherein the active rule editor provides functionality for specifying, examining, maintaining, simulating and testing active rule behavior and for documenting rules that are bound to any named and typed data spaces of the enterprise that are accessible through connectors to the data systems of the enterprise; and wherein the active rule editor and repository provide functionality for promoting a candidate rule to an active rule and managing the rule in its active state. A method for obfuscating data across an enterprise using the system described above.

246 Claims, 5 Drawing Sheets

U.S. PATENT DOCUMENTS

| | | |
|---|---|---|
| 2003/0126457 A1 | 7/2003 | Kohiyama et al. |
| 2003/0233542 A1 | 12/2003 | Benaloh |
| 2004/0003278 A1 | 1/2004 | Chen et al. |
| 2004/0064454 A1 | 4/2004 | Ross et al. |
| 2004/0123153 A1* | 6/2004 | Wright et al. ............ 713/201 |
| 2005/0021613 A1 | 1/2005 | Schmeidler et al. |
| 2005/0055564 A1 | 3/2005 | Haselden et al. |
| 2005/0081048 A1* | 4/2005 | Komarla et al. ............ 713/193 |
| 2005/0086666 A1 | 4/2005 | Nason et al. |
| 2005/0102249 A1* | 5/2005 | Bigus ............................ 706/47 |
| 2005/0102264 A1 | 5/2005 | Nason et al. |
| 2005/0102266 A1 | 5/2005 | Nason et al. |
| 2005/0102528 A1 | 5/2005 | Tan et al. |
| 2005/0108525 A1 | 5/2005 | Nason et al. |
| 2005/0111762 A1 | 5/2005 | Mathew et al. |
| 2005/0149485 A1 | 7/2005 | Nason et al. |
| 2005/0149486 A1 | 7/2005 | Nason et al. |
| 2005/0171932 A1 | 8/2005 | Nandhra |
| 2005/0183072 A1 | 8/2005 | Horning et al. |
| 2005/0204165 A1 | 9/2005 | Nason et al. |
| 2005/0204348 A1 | 9/2005 | Horning et al. |
| 2005/0210275 A1 | 9/2005 | Homing et al. |
| 2005/0216611 A1 | 9/2005 | Martinez |
| 2005/0251865 A1 | 11/2005 | Mont et al. |
| 2006/0053112 A1 | 3/2006 | Chitkara et al. |
| 2006/0075135 A1 | 4/2006 | Rambhia |
| 2006/0106745 A1* | 5/2006 | Armstrong et al. ............ 706/47 |
| 2006/0177061 A1 | 8/2006 | Orsini et al. |
| 2006/0179075 A1 | 8/2006 | Fay |
| 2006/0206337 A1* | 9/2006 | Paek et al. .................... 704/275 |
| 2006/0212698 A1 | 9/2006 | Peckover |
| 2006/0259978 A1 | 11/2006 | Pikus et al. |
| 2006/0294139 A1* | 12/2006 | Taylor et al. ............... 707/104.1 |
| 2007/0124797 A1* | 5/2007 | Gupta et al. ..................... 726/1 |
| 2008/0313116 A1* | 12/2008 | Groble ............................ 706/45 |

* cited by examiner

SYSTEM AND METHOD FOR OBFUSCATION OF DATA ACROSS AN ENTERPRISE

CROSS-REFERENCE TO RELATED APPLICATION

This application claims priority back to U.S. Patent Application Ser. No. 60/848,015 filed on 27 Sep. 2006.

BACKGROUND OF THE INVENTION

1. Field of the Invention

The present invention relates generally to the field of data obfuscation, and more particularly, to a system and method for obfuscation of data across an enterprise.

2. Description of the Related Art

During 2006, the cost of a data breach in an enterprise ranged from approximately $200 to $22 million U.S. dollars per year at an average of $182 per customer record and $4.8 million per incident. The total cost of some 93 million compromised records was in the billions of dollars [1]. Based on this report and others like it, and in light of legislative efforts to address data breaches and related privacy issues at both the state and federal levels, it is evident that the protection of data containing private information has become both a legislative and a business priority. As a consequence, and for reasons relating to accountability, it has become necessary not only to obfuscate data on an enterprise level but also to have the capability to trace actions taken to protect sensitive data.

Numerous methods currently exist for the obfuscation of data. As used herein, the term "data obfuscation" means to conceal or change the underlying data and/or the relationships between data so that the original meaning of the data is not revealed. The typical purpose or rationale for obfuscation is to protect sensitive or private data when that data is shared either between organizations (for example, for analytical purposes) or between individuals within an organization with different levels of security. These methods include, among other methods, encryption, data masking, de-identification, data scrambling, and replacing data items with a constant value. These terms are often not used consistently, and their definitions may overlap. The term "encryption" generally refers to the process of using an algorithm to alter data so that it is unintelligible to unauthorized parties and requires a significant expenditure of resources to return the data to its original form without knowledge of the algorithm. The term "data masking" is sometimes used synonymously with "data obfuscation," but technically it refers to using a pattern of characters, bits, or bytes to control the elimination or retention of another pattern of characters, bits, or bytes. The term "de-identification" generally refers to using an algorithm to replace a value with another value taken from a particular domain of values wherein this target domain sufficiently matches the domain for the original value. The term "data scrambling" generally refers to altering information in such a way that it is not intelligible (with or without the same algorithm). Replacing data items with a constant value obliterates an original value or values; for example, a field may be simply erased or filled with X's or asterisks.

The present invention is not a new form of data obfuscation. Rather, the present invention allows these and other data obfuscation methods to be applied appropriately in an automated manner across an enterprise. The challenges associated with obfuscating data across an enterprise, and those addressed by the present invention, include: (i) determining and finding the information that needs to be obfuscated; (ii) determining the appropriate method for obfuscating the data; (iii) assuring that the method for obfuscating the data conforms to the needs of the applications that use this data; (iv) determining a strategy for obfuscating large collections of data that are distributed (for example, geographically or across different systems or technologies) across the enterprise; (v) federating the data across an enterprise so that there is a common understanding as to what that data represents; (vi) providing procedural instructions and property specifications to a system for obfuscation that are easy to express and reliable in their execution; and (vii) providing a means to test and validate obfuscation operations on the enterprise. There is also a need, addressed by the present invention, to account for how the data obfuscation was accomplished once it has been done, including providing change histories and information on the sources of such changes.

Federal, state and local regulatory demands, in addition to organizational directives, have created very stringent and difficult requirements for organizations that handle sensitive data. Industry response so far has generally been to encrypt all data collections that may contain sensitive information, to encrypt those data elements that contain sensitive information, to exchange sensitive data with non-sensitive data, or to do nothing. When steps are taken to obfuscate data in an enterprise, those efforts have typically focused on simple collections of data involving a discrete number of data sets rather than focusing on the enterprise as a whole. This piecemeal approach results in the data obfuscation activity not being sufficiently comprehensive.

Accordingly, it is an object of the present invention to provide a means for obfuscating data across an enterprise that determines and finds the information that needs to be obfuscated, determines the appropriate method for obfuscating the data, assures that the method for obfuscating that data conforms to the needs of the applications that use this data, determines a strategy for obfuscating large collections of data that are distributed across an enterprise, federates the data across an enterprise so that there is a common understanding as to what the data represents, provides procedural instructions and property specifications to a system for obfuscation that are easy to express and reliable in their execution; and provides a means to test and validate obfuscation operations on the enterprise.

It is a further object of the present invention to provide a means for assuring that actions taken to protect the data are both recorded and traceable. In that these recorded actions may quickly become voluminous and often need to be cross-referenced, it is yet another object of the present invention to ensure that the records relating to actions taken to obfuscate data are in a form that can be readily manipulated and analyzed by computer. In this respect, it is an object of the present invention to maintain the recorded data as formally expressed elements of a database that is compatible with a wide variety of analytical techniques.

BRIEF SUMMARY OF THE INVENTION

The present invention is a system for obfuscating data across an enterprise, comprising: a rule evaluator; an active rule editor; and an active rule editor repository; wherein the enterprise has one or more data systems; wherein the rule evaluator evaluates active rules and optimizes its behavior based on both user-specified guidance and properties learned during system execution; wherein the active rule editor provides functionality for specifying, examining, maintaining, simulating and testing active rule behavior and for documenting rules that are bound to any named and typed data spaces of the enterprise that are accessible through connectors to the data systems of the enterprise; and wherein the active rule editor and repository provide functionality for promoting a candidate rule to an active rule and managing the rule in its active state.

In a preferred embodiment, the system further comprising a candidate rule editor and repository; wherein the candidate rule editor provides functionality for specifying, examining, maintaining, simulating and testing active rule behavior and for documenting rules that are bound to any named and typed data spaces of the enterprise that are accessible through connectors to the data systems of the enterprise; and wherein the candidate rule editor and repository provide functionality for developing rules that are candidates for subsequent use as active rules.

In a preferred embodiment, the system further comprises a metadata editor and repository, wherein the metadata editor and repository provide functionality for extending metadata about the data systems of the enterprise in order to enable bindings to rules that will be used to obfuscate the data and for saving the extensions.

In a preferred embodiment, the system further comprises a data systems metadata interface; wherein the enterprise has data content; and wherein the data systems metadata interface provides functionality for capturing existing rules about metadata in the data content of the enterprise and/or in one or more repositories of the present invention. Preferably, the metadata is persisted in multiple forms across disparate data systems.

In a preferred embodiment, the system further comprises an external models interface, wherein the external model interface translates elements of common industry enterprise models into rule and metadata specifications.

In a preferred embodiment, the system further comprises a data systems explorer, wherein the enterprise comprises one or more data systems, and wherein the data systems explorer examines known metadata about the data systems of the enterprise and discovers additional metadata that was previously unknown or in conflict with specifications already existing in the repositories.

In a preferred embodiment, the system further comprises a data set editor; wherein the enterprise has data content; wherein the data content comprises data elements and data items; and wherein the data set editor has an ability to manually or automatically selectively rewrite portions of the data content of the enterprise and/or to extend or remove the data content.

In a preferred embodiment, the system further comprises an interactive monitor; wherein the interactive monitor actively and interactively monitors and records obfuscation-related processing executed by the present invention.

In an alternate embodiment, the present invention is a system for obfuscating data across an enterprise, comprising: a candidate rule editor; a candidate rule repository; a candidate rule repository manager; an active rule editor; an active rule repository; an active rule repository manager; a rule evaluator; a data systems metadata interface; a metadata editor; a metadata repository; a metadata repository manager; a data set editor; a data systems explorer; an interactive monitor; an external models interface; and a multi-platform runtime environment; wherein the candidate rule editor manipulates, edits and tests rules that have been identified by a user as candidate rules for conducting the obfuscation; wherein the active rule editor creates an active rule and/or promotes a candidate rule to an active rule based on criteria applied by the user; wherein the rule evaluator evaluates the active rules; wherein the data systems metadata interface captures metadata residing in and associated with data systems within the enterprise and the repositories of the present invention; wherein the metadata editor edits the metadata captured by the metadata capture agent and stored in the metadata repository; wherein the data set editor edits data sets and data systems within the enterprise; wherein the data systems explorer explores the enterprise to discover digital content stored in data systems within the enterprise; wherein the interactive monitor actively and interactively monitors, reports, enunciates, and alerts, and has an ability to detect obfuscation activities that are not in compliance with active rules and change the obfuscation activities; and wherein the external models interface provides access to systems external to the present invention.

The interactive monitor preferably comprises an active monitor and repository. Preferably, any evaluation of a rule comprises at least one state, wherein probes installed in the rule evaluator sense aspects of a rule evaluation and report on the state of the evaluation. Preferably, an evaluation of a rule produces a result, wherein the probes have an ability to interrupt the rule evaluation to change the content of variables that represent the current state of the rule evaluation, force the result to be different than that of the current rule evaluation, force the evaluation of a newly user-created rule or a current active rule, begin or change reporting on succeeding rule evaluations, edit the rule involved in the current rule evaluation or any other active or candidate rule and then restart the rule evaluation from the current rule evaluation state, and change what is being monitored and how it is being monitored.

Preferably, the ability of the probes to begin or change reporting on succeeding rule evaluations is accomplished through the use of a monitor reporting manager. Preferably, the ability of the probes to edit the rule involved in the current rule evaluation or any other active or candidate rule and then restart the rule evaluation from the current rule evaluation state is accomplished through the use of an editor. Preferably, the ability of the probes to change what is being monitored and how it is being monitored is accomplished through the use of an editor.

In a preferred embodiment, the enterprise comprises classes of external components, and rules operating as agents simulate common events and activities for each class of external components.

In a preferred embodiment, the rule evaluator senses whether a rule has changed over time, forces re-evaluation of the rule if it has changed, and raises an event to notify a user of the change.

In a preferred embodiment, the rule evaluator comprises optimized primitive features for data-driven and goal-seeking logic, intelligent scheduling, quantification of variables, intensional rules, transducer-type rules, and testing rule behavior.

In a preferred embodiment, the rule evaluator provides functionality for auto-generation of filler data and auto-generation and distribution of obfuscated data sets to specified organizational elements that are part of or external to the enterprise.

In a preferred embodiment, the system uses data-driven and goal-seeking rules to reason about a means for achieving a goal, wherein the data-driven rules are supported by an extended form of forward chaining logic, wherein the goal-seeking rules are supported by an extended form of backward chaining logic, and wherein the extended forms of logic are provided by the rule evaluator.

In a preferred embodiment, the data-driven and goal-seeking rules discover and assist in defining implications in sensitive data that might otherwise not be realized in an obfuscation activity.

In a preferred embodiment, the system comprises one or more repositories and a code base, wherein each repository comprises content, and wherein information about the enterprise is not built into the code base but modeled in the content of one or more of the repositories.

In a preferred embodiment, when a task is executed, it either succeeds or fails, wherein an ancestor task is a task that must succeed prior to a subsequent task being executed, and wherein the intelligent scheduling functionality of the rule evaluator allows the system to automatically discover tasks to be executed, execute tasks and/or sub-tasks in parallel, and conditionally execute a task based on the success of an ancestor task or any other rule known to the system.

In a preferred embodiment, each active rule has one or more variables, wherein each active rule has a behavior, and wherein the behavior of an active rule expresses quantification of the variable(s) in the active rule.

In a preferred embodiment, active rules are used to obfuscate the data, wherein each rule has a behavior, and wherein the system uses intensional rules in obfuscating data items, verifying the logic of the active rules used to conduct the obfuscation, and/or validating the behavior of rules during obfuscation.

In a preferred embodiment, a transducer-type rule is a means for expressing temporal rule evaluations, and the system uses transducer-type rules to support probabilistic selection of alternative changes of state and to learn which alternative state changes are more successful than others. Preferably, each transducer-type rule has a specification, and as probabilistic information is learned, the system updates the specification of the transducer-type rule.

Preferably, a transducer-type rule processes an input and generates an output; wherein the input is context-sensitive string and graph language input; wherein the output is context-sensitive string and graph language output; wherein the transducer-type rule comprises control logic and a memory; wherein the control logic cycles the transducer-type rule through states and transitions; wherein each state is context-sensitive; wherein the memory comprises a symbol stack, a context stack, and a general purpose memory; wherein the symbol stack holds information about handling the input; wherein the context stack holds information about the context-sensitive state of the processing; and wherein the general purpose memory is used for various primitive functions.

Preferably, the transducer-type rule has an ability to call upon one or more other rules, effectuate a recursive call to itself, and/or form a new rule and launch the evaluation of that rule. Preferably, the transducer-type rule a specifications of how to translate one language into another, and the transducer-type rule has specialized and optimized primitives that simplify the specification. Preferably, the transducer-type rule is an extended Mealy machine.

Preferably, the transducer-type rule undergoes transitions from one state to another, wherein there is a relation that defines each transition from one state to another state, and wherein the transducer-type rule visually represents its allowable behaviors by depicting its set of states and the relation that defines each transition from one state to another state. Preferably, the visual representation is a labeled directed graph.

Preferably, the labeled directed graph comprises a set of vertices and a set of edges, and the set of vertices represents the states and the set of edges represents the transitions. Preferably, the graph comprises edges, wherein each edge is a labeled edge from one vertex to the same or another vertex, and wherein each edge has an edge input label and an edge output label. Preferably, a specific execution of a transducer-type rule describes a path by indicating in order all of the labeled edges used from an initial state to a final state. Preferably, the transducer-type rule is reused in the expression of both an edge input label and an edge output label, wherein there may be more than one reference to the same transducer-type rule, and wherein each reference to the same transducer-type rule is a different instance of that transducer-type rule. Preferably, the transducer-type rule hosts a transition, wherein a reference to another transducer-type rule or a recursive reference to the transducer-type rule that is hosting the transition is substituted for any edge output label or edge input label.

Preferably, the system supports intrinsic multi-threading of a transducer-type rule such that more than one execution may be concurrently in progress with one or more other executions in the same transducer-type rule.

In a preferred embodiment, the rule evaluator enables multiple process threads to use the same active rule simultaneously. Preferably, each rule has static and mutable aspects, and the static aspects of a rule are shared among the threads and the mutable aspects of a rule are replicated into a separate instance for each thread. Preferably, the transducer-type rule has an output, wherein the transducer-type rule executes an operation when the rule evaluator causes the rule to be evaluated, and wherein the transducer-type rule is successful in its execution if its output is not empty.

In a preferred embodiment, the system comprises one or more repositories, wherein the system uses transducer-type rules to support probabilistic selection of alternative changes of state and to learn which alternative state changes are more successful than others, wherein the transducer-type rule has an ability to make new assertions to the repositories, and wherein an assertion has an ability to cause one or more other assertions to be added or an existing assertion to be modified or removed.

In a preferred embodiment, the system comprises one or more repositories, wherein the system uses transducer-type rules to support probabilistic selection of alternative changes of state and to learn which alternative state changes are more successful than others, and wherein the transducer-type rule has an ability to query the repositories using data-driven and goal-seeking logic features.

In a preferred embodiment, the system uses transducer-type rules to support probabilistic selection of alternative changes of state and to learn which alternative state changes are more successful than others, wherein each transducer-type rule has a specification, and wherein each transducer-type rule has a retrospection ability that allows the transducer-type rule to examine its own specification and/or the specification of another transducer-type rule, what that rule is doing, what it has done, and what it will do next.

In a preferred embodiment, the system uses transducer-type rules to support probabilistic selection of alternative changes of state and to learn which alternative state changes are more successful than others, wherein each state comprises one or more edges, and wherein the transducer-type rule has an ability to suspend or terminate a transition operation of one or more edges of the same state.

In a preferred embodiment, the system uses transducer-type rules to support probabilistic selection of alternative changes of state and to learn which alternative state changes are more successful than others, and the transducer-type rule has an ability to dynamically create, modify or destroy one or more transducer-type rules.

In a preferred embodiment, the rule evaluator is a logic programming system that uses a transducer-type rule as a means for knowledge representation.

In a preferred embodiment, candidate rules and active rules have execution behaviors, and the rule evaluator comprises functionality for testing candidate and active rules through tracing and simulating the execution behavior of a rule. Preferably, the simulation is presented graphically to a user as a network of nodes and links depicting steps, their execution status and errors, and including multiple paths to depict multi-threaded operations.

In a preferred embodiment, the rule evaluator includes functionality for the automated generated of filler data; wherein the filler data is added to one or more data sets; wherein each data set has metadata; wherein the metadata has constraints; wherein the rule evaluator evaluates a rule that has a specification; and wherein the new filler data abides by the constraints of the metadata for each data set as specified by one or more repositories that participate in the specification. Preferably, the generation of filler data is accomplished by deriving the filler data from actual data. Preferably, the filler data is comprised of one or more data types, wherein there is a technique for generating each data type, and wherein the generation of filler data is accomplished by generating artificial data based on rules that specify the technique for generating each data type.

In a preferred embodiment, the system comprises one or more repositories, wherein there are rules and properties for obfuscation, and wherein the system automatically creates obfuscated data sets by evaluating the rules and properties for obfuscation in the various repositories.

In a preferred embodiment, the system uses transducer-type rules to support probabilistic selection of alternative changes of state and to learn which alternative state changes are more successful than others; wherein the enterprise has one or more external obfuscation applications; wherein each external obfuscation application conducts obfuscation activities and generates results; and wherein the transducer-type rule has an ability to remotely configure, execute and examiner the results of one or more obfuscation activities of the external applications. Preferably, the enterprise has one or more external obfuscation applications, wherein each external obfuscation application conducts obfuscation activities and generates results, and wherein the transducer-type rule has an ability to remotely configure, execute and examine the results of one or more obfuscation activities of the external applications.

In a preferred embodiment, the system comprises one or more repositories, wherein each repository holds data content, and wherein each repository comprises a repository manager. Preferably, the repository manager provides functionality for computationally searching and editing the repository content, performing general purpose algorithmic services, and performing management services for persisting and virtualizing the content of the repository in an execution environment.

In a preferred embodiment, the system comprises one or more repositories, and context-sensitive string and graph language statements are translated into statement in the graph language that are persisted in the repositories. Preferably, the graph language statements are interpreted by a graph automaton in each repository.

In a preferred embodiment, there are obfuscation rules for the enterprise; wherein the data to be obfuscated exists in one or more data sets; wherein each data set has metadata; and wherein the obfuscation rules include specifications for what data elements are to be obfuscated, what obfuscation technique is to be applied to a data element, how each obfuscation technique is to operate, how to get the metadata about a data set, binding a data element to a data resource, decomposition of a data element into sub-fields, how and where to substitute a new value for a data item or items, relationships among and between the data sets of the enterprise, how an obfuscation activity is to operate, how and what to monitor in an obfuscation activity, and how and what to report in an obfuscation activity. Preferably, the system comprises one or more repositories, and the obfuscation rules are predefined and preloaded in the repositories.

In a preferred embodiment, the system applies one or more of the following functions to one or more single or combined data elements to create obfuscation rules that specify a desired obfuscation activity and/or how the obfuscation activity is to be temporally ordered: pre-masking, derivation, value domain constraints, substitution, and post-masking.

In a preferred embodiment, the data to be obfuscated comprises data elements, wherein each data element has a data type, and wherein the system recognizes the data type of each data element and does not require the data types of all of the data elements to be the same. Preferably, data constraints are associated with each data element, and the data constraints associated with a data element controls what data values are allowable for that data element.

In a preferred embodiment, complex data types are decomposed into collections of standard data types using rules, and each rule specifies a particular decomposition of a complex data type. Preferably, a data type has a specification, wherein there are constraints associated with a data element, wherein the rule editor has an ability to extend the constraints associated with a data element to include constraints other than the specification of a data type, wherein a data element comprises data values, and wherein this ability applies whether the data values are concrete or symbolic.

In a preferred embodiment, the rule editor comprises functionality for extending information about a rule to include a provision for documenting the rule from different perspectives. Preferably, the rule has a test and acceptance status, wherein the rule has a development process and progress, and wherein the documentation of the rule includes describing the rule, reporting the test and acceptance status of the rule, and documenting the development process and progress of the rule.

In a preferred embodiment, the system further comprises a data systems metadata interface, wherein the data systems metadata interface dynamically extends metadata of a data system so that bindings may be created by the rule evaluator between the metadata of a data system and associated rules. Preferably, information that specifies the active rule to be applied to a particular data element is included in the metadata extensions.

In a preferred embodiment, the data systems metadata interface dynamically extends metadata of a data system so that bindings may be created by the rule evaluator between the metadata of a data system and associated rules. Preferably, information that specifies the active rule to be applied to a particular data element is included in the metadata extensions.

In a preferred embodiment, the system further comprises a metadata editor and repository, wherein the enterprise comprises one or more data systems, wherein the data systems comprise data resources, wherein there is metadata about the data resources, and wherein the metadata editor extends the metadata about the data resources in the data systems of the enterprise. Preferably, the extensions of the metadata include information about what data elements are to be obfuscated and how each data element is to be obfuscated. Preferably, the extended metadata is in the form of rules that are directly interpreted by the rule evaluator. Preferably, the system further comprises a data systems metadata interface and a data systems explorer, wherein the metadata editor receives metadata from the data systems metadata interface as directed by the data systems explorer.

In a preferred embodiment, the enterprise comprises one or more data systems, wherein the data systems comprise data resources, wherein there is metadata about the data resources, and wherein the metadata editor extends the metadata about the data resources in the data systems of the enterprise. Preferably, the extensions of the metadata include information about what data elements are to be obfuscated and how each data element is to be obfuscated. Preferably, the extended metadata is in the form of rules that are directly interpreted by the rule evaluator. Preferably, the metadata editor receives metadata from the data systems metadata interface as directed by the data systems explorer.

In a preferred embodiment, the system further comprises an external models interface, wherein there are one or more external models, wherein each external model has specifications, and wherein the external models interface assimilates relevant metadata information from pre-existing external model specifications. Preferably, each external model has a language, wherein the language has a grammar, and wherein the external models interface is a mutable transducer-type rule that parses the language of the external model by applying the grammar for that language. Preferably, the transducer-type rule of the external models interface is a series of transformal grammars that are applied so as to produce an efficient and useful result of the parse action. Preferably, the system further comprises a candidate rule editor repository and a data systems explorer, wherein the result of the parse action is transduced into a graph structure that is readily assimilated into the candidate rule editor repository and by the data systems explorer.

In a preferred embodiment, the system further comprises an external models interface that generates candidate rules.

In a preferred embodiment, there are one or more external models, wherein each external model has specifications, and wherein the external models interface assimilates relevant metadata information from pre-existing external model specifications. Preferably, each external model has a language, wherein the language has a grammar, and wherein the external models interface is a mutable transducer-type rule that parses the language of the external model by applying the grammar for that language. Preferably, the transducer-type rule of the external models interface is a series of transformal grammars that are applied so as to produce an efficient and useful result of the parse action. Preferably, the result of the parse action is transduced into a graph structure that is readily assimilated into the candidate rule editor repository and by the data systems explorer.

In a preferred embodiment, the external models interface generates candidate rules.

In a preferred embodiment, the system further comprises a data systems explorer, wherein the enterprise comprises one or more data systems, and wherein the data systems explorer is specialized and optimized to discover, locate and extricate metadata about the data systems and to index the metadata that it finds. Preferably, the system further comprises a metadata editor and repository, wherein the data systems comprise data sets, and wherein when the data systems explorer discovers a new or changed data set, it directs the metadata editor to update its repository. Preferably, the system further comprises a data systems metadata interface, wherein the metadata editor and repository create dynamic bindings to a data system's metadata resources through the data systems metadata interface. Preferably, metadata is bound to active rules, and the metadata editor repository knows all of the metadata that is bound to the active rules. Preferably, a data system comprises metadata, wherein if the rule evaluator detects a change in the metadata of a data system, the rule evaluator notifies the metadata editor to update its repository.

In a preferred embodiment, the enterprise comprises one or more data systems, wherein the data systems explorer is specialized and optimized to discover, locate and extricate metadata about the data systems and to index the metadata that it finds. Preferably, the data systems comprise data sets, and when the data systems explorer discovers a new or changed data set, it directs the metadata editor to update its repository. Preferably, the metadata editor and repository create dynamic bindings to a data system's metadata resources through the data systems metadata interface. Preferably, metadata is bound to active rules, and the metadata editor repository knows all of the metadata that is bound to the active rules. Preferably, a data system comprises metadata, wherein if the rule evaluator detects a change in the metadata of a data system, the rule evaluator notifies the metadata editor to update its repository.

In a preferred embodiment, the system further comprises a data set editor, wherein the data set editor comprises functionality for satisfying transactional integrity requirements for atomicity, consistency, isolation and durability.

In a preferred embodiment, the data set editor comprises functionality for satisfying transactional integrity requirements for atomicity, consistency, isolation and durability.

In a preferred embodiment, the system further comprises an interactive monitor, wherein results are generated when a rule is evaluated by the rule evaluator, wherein there is metadata about the enterprise, and wherein the interactive monitor monitors user-specified events, the generation of results such that results that are incongruent with one or more active rules are detected, and changes to the metadata about the enterprise.

In a preferred embodiment, results are generated when a rule is evaluated by the rule evaluator, wherein there is metadata about the enterprise, and wherein the interactive monitor monitors user-specified events, the generation of results such that results that are incongruent with one or more active rules are detected, and changes to the metadata about the enterprise.

In a preferred embodiment, the system further comprises an interactive monitor, wherein the interactive monitor comprises a monitor editor and repository, and wherein the monitor editor creates active monitor probes.

In a preferred embodiment, the interactive monitor comprises a monitor editor and repository, and the monitor editor creates active monitor probes. Preferably, the active monitor probes provide verification reporting through query and review of active monitoring rules and validation reporting through simulation of selected events and activities to validate their expected behavior.

In a preferred embodiment, the system further comprises an interactive monitor, wherein the interactive monitor has an operation, wherein the interactive monitor comprises a test, verify and validation manager, and wherein the test, verify and validation manager tests the operation of the interactive monitor.

In a preferred embodiment, the interactive monitor has an operation, wherein the interactive monitor comprises a test, verify and validation manager, and wherein the test, verify and validation manager tests the operation of the interactive monitor.

In a preferred embodiment, the system further comprises an interactive monitor and a data set editor, wherein a data set comprises content, wherein the interactive monitor comprises an active monitor, and wherein the active monitor and rule evaluator together have an ability to override rules that are involved with accessing a data set by adding new rules that represent the content of a data set and/or set a state of the data set editor through a primitive rule that blocks changes to a designated data set.

In a preferred embodiment, a data set comprises content, wherein the interactive monitor comprises an active monitor, and wherein the active monitor and rule evaluator together have an ability to override rules that are involved with accessing a data set by adding new rules that represent the content of a data set and/or set a state of the data set editor through a primitive rule that blocks changes to a designated data set.

In a preferred embodiment, the system further comprises an interactive monitor, wherein the interactive monitor comprises a monitor reporting manager and a monitor editor, wherein events and activities are specified to be monitored using the monitor editor, wherein the events and activities have a presentation, and wherein the monitor reporting manager formats the presentation of specified properties of events and activities that have been specified to be monitored.

In a preferred embodiment, the interactive monitor comprises a monitor reporting manager and a monitor editor, wherein events and activities are specified to be monitored using the monitor editor, wherein the events and activities have a presentation, and wherein the monitor reporting manager formats the presentation of specified properties of events and activities that have been specified to be monitored.

In a preferred embodiment, the system further comprises an interactive monitor, wherein the interactive monitor comprises an enunciator manager, and wherein the enunciator manager senses high-interest events that are designated for enunciation by a user.

In a preferred embodiment, the interactive monitor comprises an enunciator manager, and the enunciator manager senses high-interest events that are designated for enunciation by a user.

In a preferred embodiment, the system further comprises an interactive monitor, wherein the interactive monitor comprises an alarm manager, and wherein the alarm manager senses events and activities that are designated to be alarmed.

In a preferred embodiment, the interactive monitor comprises an alarm manager, wherein the alarm manager senses events and activities that are designated to be alarmed.

In a preferred embodiment, the system further comprises an interactive monitor, wherein the interactive monitor comprises a transcript report generator, wherein active rules are evaluated by the rule evaluator, and wherein the transcript report generator senses events and activities that are designated to be reported and creates a transcript report of activities performed by the evaluation of an active rule.

In a preferred embodiment, the interactive monitor comprises a transcript report generator, wherein active rules are evaluated by the rule evaluator, and wherein the transcript report generator senses events and activities that are designated to be reported and creates a transcript report of activities performed by the evaluation of an active rule.

In a preferred embodiment, the multi-platform runtime environment is scalable, allows multiple instances to operate concurrently, and allows an instance to have its own multiple execution threads operating concurrently.

In a preferred embodiment, the system interfaces to multiple disparate data systems.

In a preferred embodiment, the data to be obfuscated may be either online or offline.

The present invention also covers a method for obfuscating data across an enterprise, comprising: providing a rule evaluator; providing an active rule editor; and providing an active rule editor repository; wherein the enterprise has one or more data systems; wherein the rule evaluator evaluates active rules and optimizes its behavior based on both user-specified guidance and properties learned during system execution; wherein the active rule editor provides functionality for specifying, examining, maintaining, simulating and testing active rule behavior and for documenting rules that are bound to any named and typed data spaces of the enterprise that are accessible through connectors to the data systems of the enterprise; and wherein the active rule editor and repository provide functionality for promoting a candidate rule to an active rule and managing the rule in its active state.

In a preferred embodiment, the method further comprises providing a candidate rule editor and repository; wherein the candidate rule editor provides functionality for specifying, examining, maintaining, simulating and testing active rule behavior and for documenting rules that are bound to any named and typed data spaces of the enterprise that are accessible through connectors to the data systems of the enterprise; and wherein the candidate rule editor and repository provide functionality for developing rules that are candidates for subsequent use as active rules.

In a preferred embodiment, the method further comprises providing a metadata editor and repository, wherein the metadata editor and repository provide functionality for extending metadata about the data systems of the enterprise in order to enable bindings to rules that will be used to obfuscate the data and for saving the extensions.

In a preferred embodiment, the method further comprises providing a data systems metadata interface; wherein the enterprise has data content; and wherein the data systems metadata interface provides functionality for capturing existing rules about metadata in the data content of the enterprise and/or in one or more repositories of the present invention. Preferably, the metadata is persisted in multiple forms across disparate data systems.

Preferably, the method further comprises providing an external models interface, wherein the external models interface translates elements of common industry enterprise models into rule and metadata specifications.

Preferably, the method further comprises providing a data systems explorer, wherein the enterprise comprises one or more data systems, and wherein the data systems explorer examines known metadata about the data systems of the enterprise and discovers additional metadata that was previously unknown or in conflict with specifications already existing in the repositories.

Preferably, the method further comprises providing a data set editor; wherein the enterprise has data content; wherein the data content comprises data elements and data items; and wherein the data set editor has an ability to manually or automatically selectively rewrite portions of the data content of the enterprise and/or to extend or remove the data content.

In a preferred embodiment, the method further comprises providing an interactive monitor; wherein the interactive monitor actively and interactively monitors and records obfuscation-related processing executed by the present invention.

In an alternate embodiment, the present invention is a method for obfuscating data across an enterprise, comprising: providing a candidate rule editor; providing a candidate rule repository; providing a candidate rule repository manager; providing an active rule editor; providing an active rule repository; providing an active rule repository manager; providing a rule evaluator; providing a data systems metadata interface; providing a metadata editor; providing a metadata repository; providing a metadata repository manager; providing a data set editor; providing a data systems explorer; providing an interactive monitor; providing an external models interface; and providing a multi-platform runtime environment; wherein the candidate rule editor manipulates, edits and tests rules that have been identified by a user as candidate rules for conducting the obfuscation; wherein the active rule editor creates an active rule and/or promotes a candidate rule to an active rule based on criteria applied by the user; wherein the rule evaluator evaluates the active rules; wherein the data systems metadata interface captures metadata residing in and associated with data systems within the enterprise and the repositories of the present invention; wherein the metadata editor edits the metadata captured by the metadata capture agent and stored in the metadata repository; wherein the data set editor edits data sets and data systems within the enterprise; wherein the data systems explorer explores the enterprise to discover digital content stored in data systems within the enterprise; wherein the interactive monitor actively and interactively monitors, reports, enunciates, and alerts, and has an ability to detect obfuscation activities that are not in compliance with active rules and change the obfuscation activities; and wherein the external models interface provides access to systems external to the present invention.

The interactive monitor preferably comprises an active monitor and repository. Preferably, any evaluation of a rule comprises at least one state, wherein probes installed in the rule evaluator sense aspects of a rule evaluation and report on the state of the evaluation. Preferably, an evaluation of a rule produces a result, wherein the probes have an ability to interrupt the rule evaluation to change the content of variables that represent the current state of the rule evaluation, force the result to be different than that of the current rule evaluation, force the evaluation of a newly user-created rule or a current active rule, begin or change reporting on succeeding rule evaluations, edit the rule involved in the current rule evaluation or any other active or candidate rule and then restart the rule evaluation from the current rule evaluation state, and change what is being monitored and how it is being monitored.

Preferably, the ability of the probes to begin or change reporting on succeeding rule evaluations is accomplished through the use of a monitor reporting manager. Preferably, the ability of the probes to edit the rule involved in the current rule evaluation or any other active or candidate rule and then restart the rule evaluation from the current rule evaluation state is accomplished through the use of an editor. Preferably, the ability of the probes to change what is being monitored and how it is being monitored is accomplished through the use of an editor.

In a preferred embodiment, the enterprise comprises classes of external components, wherein rules operating as agents simulate common events and activities for each class of external components.

In a preferred embodiment, the rule evaluator senses whether a rule has changed over time, forces re-evaluation of the rule if it has changed, and raises an event to notify a user of the change.

In a preferred embodiment, the rule evaluator comprises optimized primitive features for data-driven and goal-seeking logic, intelligent scheduling, quantification of variables, intensional rules, transducer-type rules, and testing rule behavior.

In a preferred embodiment, the rule evaluator provides functionality for auto-generation of filler data and auto-generation and distribution of obfuscated data sets to specified organizational elements that are part of or external to the enterprise.

In a preferred embodiment, data-driven and goal-seeking rules are used to reason about a means for achieving a goal, wherein the data-driven rules are supported by an extended form of forward chaining logic, wherein the goal-seeking rules are supported by an extended form of backward chaining logic, and wherein the extended forms of logic are provided by the rule evaluator.

In a preferred embodiment, the data-driven and goal-seeking rules discover and assist in defining implications in sensitive data that might otherwise not be realized in an obfuscation activity.

In a preferred embodiment, the method comprises providing one or more repositories and a code base, wherein each repository comprises content, and wherein information about the enterprise is not built into the code base but modeled in the content of one or more of the repositories.

In a preferred embodiment, when a task is executed, it either succeeds or fails, wherein an ancestor task is a task that must succeed prior to a subsequent task being executed, and wherein the intelligent scheduling functionality of the rule evaluator allows for automatic discovery of tasks to be executed, execution of tasks and/or sub-tasks in parallel, and conditional execution of a task based on the success of an ancestor task or any other known rule.

In a preferred embodiment, each active rule has one or more variables, wherein each active rule has a behavior, and wherein the behavior of an active rule expresses quantification of the variable(s) in the active rule.

In a preferred embodiment active rules are used to obfuscate the data, wherein each rule has a behavior, and wherein intensional rules are used in obfuscating data items, verifying the logic of the active rules used to conduct the obfuscation, and/or validating the behavior of rules during obfuscation.

In a preferred embodiment, a transducer-type rule is a means for expressing temporal rule evaluations, and transducer-type rules are used to support probabilistic selection of alternative changes of state and to learn which alternative state changes are more successful than others. Preferably, each transducer-type rule has a specification, and as probabilistic information is learned, the specification of the transducer-type rule is updated.

Preferably, a transducer-type rule processes an input and generates an output; wherein the input is context-sensitive string and graph language input; wherein the output is context-sensitive string and graph language output; wherein the transducer-type rule comprises control logic and a memory; wherein the control logic cycles the transducer-type rule through states and transitions; wherein each state is context-sensitive; wherein the memory comprises a symbol stack, a context stack, and a general purpose memory; wherein the symbol stack holds information about handling the input; wherein the context stack holds information about the context-sensitive state of the processing; and wherein the general purpose memory is used for various primitive functions.

Preferably, the transducer-type rule has an ability to call upon one or more other rules, effectuate a recursive call to itself, and/or form a new rule and launch the evaluation of that rule. Preferably, the transducer-type rule a specifications of how to translate one language into another, and the transducer-type rule has specialized and optimized primitives that simplify the specification. Preferably, the transducer-type rule is an extended Mealy machine.

Preferably, the transducer-type rule undergoes transitions from one state to another, wherein there is a relation that defines each transition from one state to another state, and wherein the transducer-type rule visually represents its allowable behaviors by depicting its set of states and the relation that defines each transition from one state to another state. Preferably, the visual representation is a labeled directed graph.

Preferably, the labeled directed graph comprises a set of vertices and a set of edges, and the set of vertices represents the states and the set of edges represents the transitions. Preferably, the graph comprises edges, wherein each edge is a labeled edge from one vertex to the same or another vertex, and wherein each edge has an edge input label and an edge output label. Preferably, a specific execution of a transducer-type rule describes a path by indicating in order all of the labeled edges used from an initial state to a final state. Preferably, the transducer-type rule is reused in the expression of both an edge input label and an edge output label, wherein there may be more than one reference to the same transducer-type rule, and wherein each reference to the same transducer-type rule is a different instance of that transducer-type rule. Preferably, the transducer-type rule hosts a transition, wherein a reference to another transducer-type rule or a recursive reference to the transducer-type rule that is hosting the transition is substituted for any edge output label or edge input label.

Preferably, intrinsic multi-threading of a transducer-type rule is supported such that more than one execution may be concurrently in progress with one or more other executions in the same transducer-type rule.

In a preferred embodiment, the rule evaluator enables multiple process threads to use the same active rule simultaneously. Preferably, each rule has static and mutable aspects, and the static aspects of a rule are shared among the threads and the mutable aspects of a rule are replicated into a separate instance for each thread. Preferably, the transducer-type rule has an output, wherein the transducer-type rule executes an operation when the rule evaluator causes the rule to be evaluated, and wherein the transducer-type rule is successful in its execution if its output is not empty.

In a preferred embodiment, the method comprises providing one or more repositories, wherein transducer-type rules are used to support probabilistic selection of alternative changes of state and to learn which alternative state changes are more successful than others, wherein the transducer-type rule has an ability to make new assertions to the repositories, and wherein an assertion has an ability to cause one or more other assertions to be added or an existing assertion to be modified or removed.

In a preferred embodiment, the method comprises providing one or more repositories, wherein transducer-type rules are used to support probabilistic selection of alternative changes of state and to learn which alternative state changes are more successful than others, and wherein the transducer-type rule has an ability to query the repositories using data-driven and goal-seeking logic features.

In a preferred embodiment, transducer-type rules are used to support probabilistic selection of alternative changes of state and to learn which alternative state changes are more successful than others, wherein each transducer-type rule has a specification, and wherein each transducer-type rule has a retrospection ability that allows the transducer-type rule to examine its own specification and/or the specification of another transducer-type rule, what that rule is doing, what it has done, and what it will do next.

In a preferred embodiment, transducer-type rules are used to support probabilistic selection of alternative changes of state and to learn which alternative state changes are more successful than others, wherein each state comprises one or more edges, and wherein the transducer-type rule has all ability to suspend or terminate a transition operation of one or more edges of the same state.

In a preferred embodiment, transducer-type rules are used to support probabilistic selection of alternative changes of state and to learn which alternative state changes are more successful than others, and the transducer-type rule has an ability to dynamically create, modify or destroy one or more transducer-type rules.

In a preferred embodiment, the rule evaluator is a logic programming system that uses a transducer-type rule as a means for knowledge representation.

In a preferred embodiment, candidate rules and active rules have execution behaviors, and the rule evaluator comprises functionality for testing candidate and active rules through tracing and simulating the execution behavior of a rule. Preferably, the simulation is presented graphically to a user as a network of nodes and links depicting steps, their execution status and errors, and including multiple paths to depict multi-threaded operations.

In a preferred embodiment, the rule evaluator includes functionality for the automated generated of filler data; wherein the filler data is added to one or more data sets; wherein each data set has metadata; wherein the metadata has constraints; wherein the rule evaluator evaluates a rule that has a specification; and wherein the new filler data abides by the constraints of the metadata for each data set as specified by one or more repositories that participate in the specification. Preferably, the generation of filler data is accomplished by deriving the filler data from actual data. Preferably, the filler data is comprised of one or more data types, wherein there is a technique for generating each data type, and wherein the generation of filler data is accomplished by generating artificial data based on rules that specify the technique for generating each data type.

In a preferred embodiment, the method comprises providing one or more repositories, wherein there are rules and properties for obfuscation, and wherein obfuscated data sets are created automatically by evaluating the rules and properties for obfuscation in the various repositories.

In a preferred embodiment, transducer-type rules are used to support probabilistic selection of alternative changes of state and to learn which alternative state changes are more successful than others; wherein the enterprise has one or more external obfuscation applications; wherein each external obfuscation application conducts obfuscation activities and generates results; and wherein the transducer-type rule has an ability to remotely configure, execute and examiner the results of one or more obfuscation activities of the external applications. Preferably, the enterprise has one or more external obfuscation applications, wherein each external obfuscation application conducts obfuscation activities and generates results, and wherein the transducer-type rule has an ability to remotely configure, execute and examine the results of one or more obfuscation activities of the external applications.

In a preferred embodiment, the method comprises providing one or more repositories, wherein each repository holds data content, and wherein each repository comprises a repository manager. Preferably, the repository manager provides functionality for computationally searching and editing the repository content, performing general purpose algorithmic services, and performing management services for persisting and virtualizing the content of the repository in an execution environment.

In a preferred embodiment, the method comprises providing one or more repositories, and context-sensitive string and graph language statements are translated into statement in the graph language that are persisted in the repositories. Preferably, the graph language statements are interpreted by a graph automaton in each repository.

In a preferred embodiment, there are obfuscation rules for the enterprise; wherein the data to be obfuscated exists in one or more data sets; wherein each data set has metadata; and wherein the obfuscation rules include specifications for what data elements are to be obfuscated, what obfuscation technique is to be applied to a data element, how each obfuscation technique is to operate, how to get the metadata about a data set, binding a data element to a data resource, decomposition of a data element into sub-fields, how and where to substitute a new value for a data item or items, relationships among and between the data sets of the enterprise, how an obfuscation activity is to operate, how and what to monitor in an obfuscation activity, and how and what to report in an obfuscation activity. Preferably, the method comprises providing one or more repositories, and the obfuscation rules are predefined and preloaded in the repositories.

In a preferred embodiment, one or more of the following functions is/are applied to one or more single or combined data elements to create obfuscation rules that specify a desired obfuscation activity and/or how the obfuscation activity is to be temporally ordered: pre-masking, derivation, value domain constraints, substitution, and post-masking.

In a preferred embodiment, the data to be obfuscated comprises data elements, wherein each data element has a data type, and wherein the data type of each data element is recognized and the data types of all of the data elements need not be the same. Preferably, data constraints are associated with each data element, and the data constraints associated with a data element controls what data values are allowable for that data element.

In a preferred embodiment, complex data types are decomposed into collections of standard data types using rules, and each rule specifies a particular decomposition of a complex data type. Preferably, a data type has a specification, wherein there are constraints associated with a data element, and wherein the rule editor has an ability to extend the constraints associated with a data element to include constraints other than the specification of a data type, wherein a data element comprises data values, and wherein this ability applies whether the data values are concrete or symbolic.

In a preferred embodiment, the rule editor comprises functionality for extending information about a rule to include a provision for documenting the rule from different perspectives. Preferably, the rule has a test and acceptance status, wherein the rule has a development process and progress, and wherein the documentation of the rule includes describing the rule, reporting the test and acceptance status of the rule, and documenting the development process and progress of the rule.

In a preferred embodiment, the method further comprises providing a data systems metadata interface, wherein the data systems metadata interface dynamically extends metadata of a data system so that bindings may be created by the rule evaluator between the metadata of a data system and associated rules. Preferably, information that specifies the active rule to be applied to a particular data element is included in the metadata extensions.

In a preferred embodiment, the data systems metadata interface dynamically extends metadata of a data system so that bindings may be created by the rule evaluator between the metadata of a data system and associated rules. Preferably, information that specifies the active rule to be applied to a particular data element is included in the metadata extensions.

In a preferred embodiment, the method further comprises providing a metadata editor and repository, wherein the enterprise comprises one or more data systems, wherein the data systems comprise data resources, wherein there is metadata about the data resources, and wherein the metadata editor extends the metadata about the data resources in the data systems of the enterprise. Preferably, the extensions of the metadata include information about what data elements are to be obfuscated and how each data element is to be obfuscated. Preferably, the extended metadata is in the form of rules that are directly interpreted by the rule evaluator. Preferably, the method further comprises providing a data systems metadata interface and a data systems explorer, wherein the metadata editor receives metadata from the data systems metadata interface as directed by the data systems explorer.

In a preferred embodiment the enterprise comprises one or more data systems, wherein the data systems comprise data resources, wherein there is metadata about the data resources, and wherein the metadata editor extends the metadata about the data resources in the data systems of the enterprise. Preferably, the extensions of the metadata include information about what data elements are to be obfuscated and how each data element is to be obfuscated. Preferably, the extended metadata is in the form of rules that are directly interpreted by the rule evaluator. Preferably, the metadata editor receives metadata from the data systems metadata interface as directed by the data systems explorer.

In a preferred embodiment, the method further comprises providing an external models interface, wherein there are one or more external models, wherein each external model has specifications, and wherein the external models interface assimilates relevant metadata information from pre-existing external model specifications. Preferably, each external model has a language, wherein the language has a grammar, and wherein the external models interface is a mutable transducer-type rule that parses the language of the external model by applying the grammar for that language. Preferably, the transducer-type rule of the external models interface is a series of transformal grammars that are applied so as to produce an efficient and useful result of the parse action. Preferably, the method further comprises providing a candidate rule editor repository and a data systems explorer, wherein the result of the parse action is transduced into a graph structure that is readily assimilated into the candidate rule editor repository and by the data systems explorer.

In a preferred embodiment, the method further comprises providing an external models interface that generates candidate rules.

In a preferred embodiment, there are one or more external models, wherein each external model has specifications, wherein the external models interface assimilates relevant metadata information from pre-existing external model specifications. Preferably, each external model has a language, wherein the language has a grammar, and wherein the external models interface is a mutable transducer-type rule that parses the language of the external model by applying the grammar for that language. Preferably, the transducer-type rule of the external models interface is a series of transformal grammars that are applied so as to produce an efficient and useful result of the parse action. Preferably, the result of the parse action is transduced into a graph structure that is readily assimilated into the candidate rule editor repository and by the data systems explorer.

In a preferred embodiment, the external models interface generates candidate rules.

In a preferred embodiment, the method further comprises providing a data systems explorer, wherein the enterprise comprises one or more data systems, and wherein the data systems explorer is specialized and optimized to discover, locate and extricate metadata about the data systems and to index the metadata that it finds. Preferably, the method further comprises providing a metadata editor and repository, wherein the data systems comprise data sets, and wherein when the data systems explorer discovers a new or changed data set, it directs the metadata editor to update its repository. Preferably, the method further comprises providing a data systems metadata interface, wherein the metadata editor and repository create dynamic bindings to a data system's metadata resources through the data systems metadata interface. Preferably, metadata is bound to active rules, and the metadata editor repository knows all of the metadata that is bound to the active rules. Preferably, a data system comprises metadata, and if the rule evaluator detects a change in the metadata of a data system, the rule evaluator notifies the metadata editor to update its repository.

In a preferred embodiment, the enterprise comprises one or more data systems, and the data systems explorer is specialized and optimized to discover, locate and extricate metadata about the data systems and to index the metadata that it finds. Preferably, the data systems comprise data sets, and when the data systems explorer discovers a new or changed data set, it directs the metadata editor to update its repository. Preferably, the metadata editor and repository create dynamic bindings to a data system's metadata resources through the data systems metadata interface. Preferably, metadata is bound to active rules, and the metadata editor repository knows all of the metadata that is bound to the active rules. Preferably, a data system comprises metadata, and if the rule evaluator detects a change in the metadata of a data system, the rule evaluator notifies the metadata editor to update its repository.

In a preferred embodiment, the method further comprises providing a data set editor, wherein the data set editor comprises functionality for satisfying transactional integrity requirements for atomicity, consistency, isolation and durability.

In a preferred embodiment the data set editor comprises functionality for satisfying transactional integrity requirements for atomicity, consistency, isolation and durability.

In a preferred embodiment, the method further comprises providing an interactive monitor, wherein results are generated when a rule is evaluated by the rule evaluator, wherein there is metadata about the enterprise, and wherein the interactive monitor monitors user-specified events, the generation of results such that results that are incongruent with one or more active rules are detected, and changes to the metadata about the enterprise.

In a preferred embodiment, results are generated when a rule is evaluated by the rule evaluator, wherein there is metadata about the enterprise, and wherein the interactive monitor monitors user-specified events, the generation of results such that results that are incongruent with one or more active rules are detected, and changes to the metadata about the enterprise.

In a preferred embodiment, the method further comprises providing an interactive monitor, wherein the interactive monitor comprises a monitor editor and repository, and wherein the monitor editor creates active monitor probes.

In a preferred embodiment, the interactive monitor comprises a monitor editor and repository, and the monitor editor creates active monitor probes. Preferably, the active monitor probes provide verification reporting through query and review of active monitoring rules and validation reporting through simulation of selected events and activities to validate their expected behavior.

In a preferred embodiment, the method further comprises providing an interactive monitor, wherein the interactive monitor has an operation, wherein the interactive monitor comprises a test, verify and validation manager, and wherein the test, verify and validation manager tests the operation of the interactive monitor.

In a preferred embodiment, the interactive monitor has an operation, wherein the interactive monitor comprises a test, verify and validation manager, and wherein the test, verify and validation manager tests the operation of the interactive monitor.

In a preferred embodiment, the method further comprises providing an interactive monitor and a data set editor, wherein a data set comprises content, wherein the interactive monitor comprises an active monitor, and wherein the active monitor and rule evaluator together have an ability to override rules that are involved with accessing a data set by adding new rules that represent the content of a data set and/or set a state of the data set editor through a primitive rule that blocks changes to a designated data set.

In a preferred embodiment, a data set comprises content, wherein the interactive monitor comprises an active monitor, and wherein the active monitor and rule evaluator together have an ability to override rules that are involved with accessing a data set by adding new rules that represent the content of a data set and/or set a state of the data set editor through a primitive rule that blocks changes to a designated data set.

In a preferred embodiment, the method further comprises providing an interactive monitor, wherein the interactive monitor comprises a monitor reporting manager and a monitor editor, wherein events and activities are specified to be monitored using the monitor editor, wherein the events and activities have a presentation, and wherein the monitor reporting manager formats the presentation of specified properties of events and activities that have been specified to be monitored.

In a preferred embodiment, the interactive monitor comprises a monitor reporting manager and a monitor editor, wherein events and activities are specified to be monitored using the monitor editor, wherein the events and activities have a presentation, and wherein the monitor reporting manager formats the presentation of specified properties of events and activities that have been specified to be monitored.

In a preferred embodiment, the method further comprises providing an interactive monitor, wherein the interactive monitor comprises an enunciator manager, and wherein the enunciator manager senses high-interest events that are designated for enunciation by a user.

In a preferred embodiment, the interactive monitor comprises an enunciator manager, and the enunciator manager senses high-interest events that are designated for enunciation by a user.

In a preferred embodiment, the method further comprises providing an interactive monitor, wherein the interactive monitor comprises an alarm manager, wherein the alarm manager senses events and activities that are designated to be alarmed.

In a preferred embodiment, the interactive monitor comprises an alarm manager, and the alarm manager senses events and activities that are designated to be alarmed.

In a preferred embodiment, the method further comprises providing an interactive monitor, wherein the interactive monitor comprises a transcript report generator, wherein active rules are evaluated by the rule evaluator, and wherein the transcript report generator senses events and activities that are designated to be reported and creates a transcript report of activities performed by the evaluation of an active rule.

In a preferred embodiment, the interactive monitor comprises a transcript report generator, wherein active rules are evaluated by the rule evaluator, and wherein the transcript report generator senses events and activities that are designated to be reported and creates a transcript report of activities performed by the evaluation of an active rule.

In a preferred embodiment, the multi-platform runtime environment is scalable, allows multiple instances to operate concurrently, and allows an instance to have its own multiple execution threads operating concurrently.

In a preferred embodiment, data from multiple disparate data systems is obfuscated.

In a preferred embodiment, the data to be obfuscated may be either online or offline.

REFERENCE NUMBERS

Figure 1:
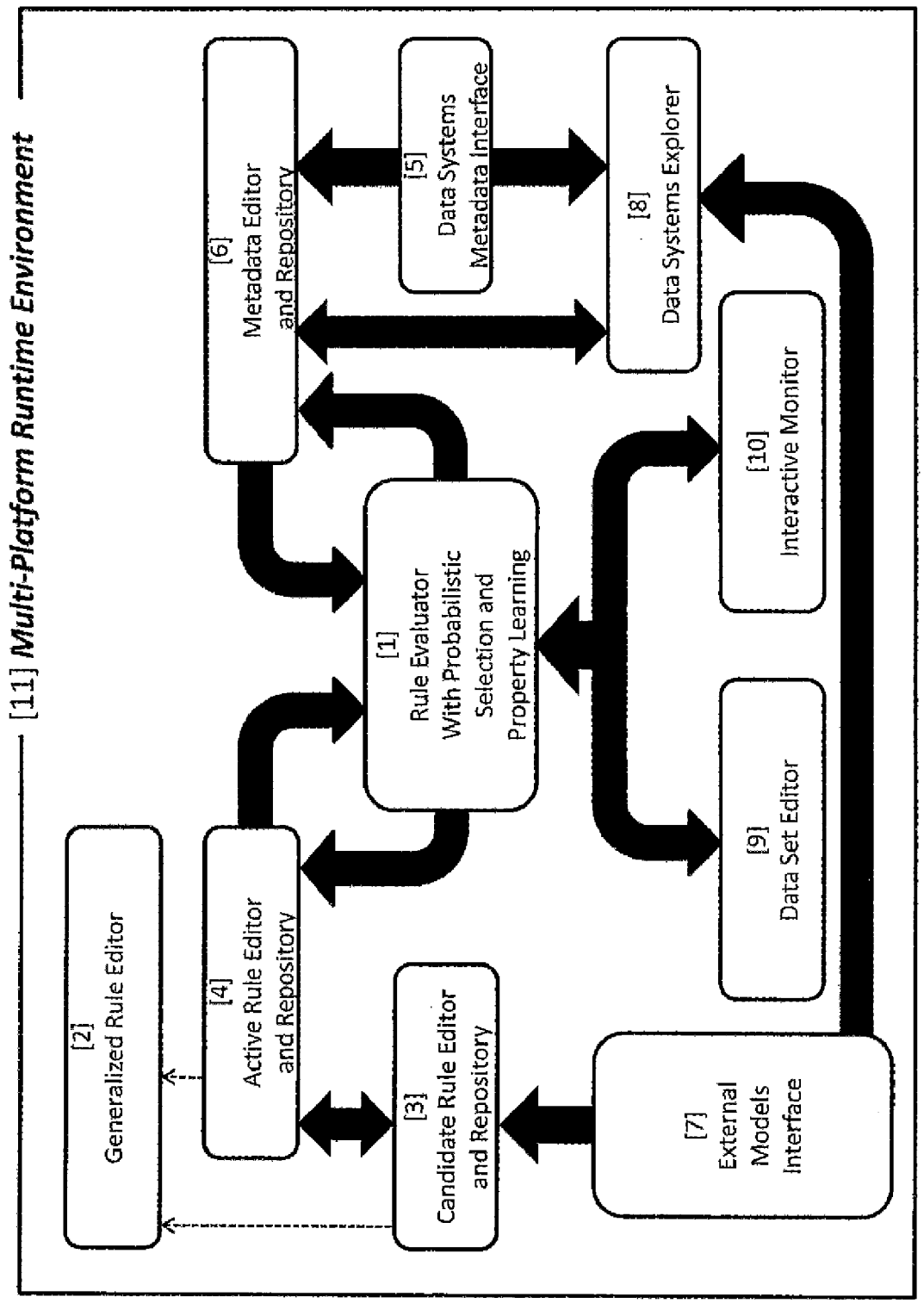
FIG. 1 is a flow chart that shows the major components of the present invention.

1 Rule evaluator
2 Generalized rule editor
3 Candidate rule editor and repository
4 Active rule editor and repository
5 Data systems metadata interface
6 Metadata editor and repository
7 External models interface
8 Data systems explorer
9 Data set editor
10 Interactive monitor
21 Control logic
22 Context-sensitive string and graph language input
23 Context-sensitive string and graph language output
24 Symbol stack
25 Context stack
26 Global memory for primitives
31 Data sources not available: get list of data sources
32 List ready: review list of data sources
33 Add data source: specify data source
34 Remove data source: remove existing data source
35 List complete: process data sources in list
36 New data source specified?: add data source
37 Data source not successfully added?: specify data source
38 Data source successfully added: get list of data sources
39 Data source removed: get list of data sources
310 List empty: end process
311 List not empty: next process
41 Active monitor
41a Active monitor probe
42 Repository
43 Monitor editor
44 Test, verify and validation manager
45 Monitor reporting manager
46 Enunciator manager
47 Alarm manager
48 Transcript report manager

DETAILED DESCRIPTION OF INVENTION

A. Overview

A central element of the present invention is the ability to sufficiently capture and readily model complex specifications of the metadata expressions of the data content of an enterprise. Even with a proper and comprehensive expression of the metadata, "context" issues arise due to the fact that the data resources of an enterprise may be shared for more than one purpose. In the absence of contextual constraints, the rules for data obfuscation may become so entangled and voluminous that the prediction and assurance of the needed result becomes incomprehensible or even technically impossible due to the resources required to create coherent specifications for proper obfuscation. Furthermore, due to the loss of comprehension over the volume of the specifications, as well as incompatible purposes for the data, technical conflicts in the rules and definitions may arise.

The present invention is a system and method for obfuscation of data across an enterprise that addresses these and other challenges associated with enterprise-level data obfuscation. Of the many forms of data that an organization may maintain, the present invention is concerned only with data that is maintained digitally in a computing environment wherein that data may or may not be accessible.

The present invention configures and integrates several technologies to accomplish the following functionalities:

(a) modeling of the enterprise data space in terms of rules that specify the needed behavior to obfuscate a particular data element or a collection of data elements in accordance with the metadata constraints implemented in the data systems of the enterprise;

(b) specification of abstract string and graph languages and their grammars for enterprise and internal interface modeling such that the means to interpret a language may be altered and/or new languages and grammars may be added to interfaces to resources relevant to an obfuscation scenario, thereby providing the organization with the ability to grow its information repositories without the need to modify the program code base;

(c) modeling of decision making such that the present invention learns the probability of success for each alternative solution, thereby making it more likely that the present invention will find with greater speed sensitive data for obfuscation (for example, by searching a data resource about people rather than wastefully searching a data resource about static discrete data elements such as zip codes verses cities);

(d) using abstract machines that directly use string and graph languages and their grammars to carry out particular interpretations of use;

(e) using data-driven and goal-seeking rules and logic rather than static, finite-state logic to represent decision components, which means that rather than mechanically testing and following the branching paths of a decision tree, the present invention reasons about a means to achieve a goal (for example, obfuscating any data element that is used as an identifier involved in a relation to other data sets);

(f) in addition to providing rules and supporting logic to specify concrete properties, providing support for rules that describe reasoning both about how to obfuscate a data element and about what the end result of the obfuscation is intended to be (for example, asserting that an obfuscated telephone number is derived by looking up a bogus telephone number and is to have a particular format);

(g) recognizing that an enterprise may be composed of many disparate data systems, providing the ability to execute the present invention in at least the most common enterprise computer environments, including the ability to operate concurrently and communicate with multiple instances of itself and handle data systems within the enterprise that are temporarily unavailable or not connected through a network; and (h) accessing information about an enterprise that is not built into the code base but rather is completely modeled in the content of one or more repositories.

Providing the combination of the above functionalities in a useful configuration for obfuscating data in all of or in selected data spaces of an enterprise is unique to the present invention. The following sections describe in detail the specific usage of these technologies within the context of the present invention.

B. Major Components of the Present Invention

Although there are many settings for controlling the behaviors of the present invention, the primary means for asserting (that is, adding) information to the present invention is by expressing rules that are edited through the candidate rule editor and the active rule editor (both of which are discussed in greater detail below) and in turn, evaluated by the rule evaluator. In addition, rules may be asserted dynamically during the evaluation of other rules, such as through the external models interface and the data systems explorer (also discussed below).

The rules of the present invention are classified from four mutually exclusive perspectives: (i) at a minimum, there are three logic types of rules called data-driven (that is, if-then forms), goal-seeking (that is, goal-if forms), and transducer-type (that is, informally, conditionally do this, then conditionally do that, etc.); (ii) two intent categories called intensional (that is, the result of an evaluation must comply with this category of rules) and non-intensional (these are the general assertions of information); (iii) two implementation categories of rules called primitive (that is, built into the present invention) and non-primitive (that is, any rule not built into the present invention, such as the rules that are persisted in the present invention's repositories); and (iv) two complexity categories of rules called regressive (that is, the most simple rule form wherein there are no conditions for success) and non-regressive (that is, there are conditions for the success of the rule). Thus, for example, a rule could be goal-driven and primitive and regressive. The manner in which each category of rules behaves and its applicability to the present invention are described more fully below.

FIG. 1 depicts the major components of the present invention, which are outlined below:

(a) a rule evaluator 1 that can optimize its behavior based on both user-specified guidance and on properties learned during the execution of the present invention;

(b) a generalized rule editor 2 that provides the core functionality for specifying, examining, maintaining, simulating and testing behavior and for documenting rules that can be bound to any "named" and "typed" data spaces of the enterprise that are accessible through "connectors" to the data systems of the enterprise;

(c) a candidate rule editor and repository 3 that provides all the functionality of the generalized rule editor 2 but with additional functionality for the development of rules that are candidates for subsequent use as an active rule;

(d) an active rule editor and repository 4 that provides all the functionality of the generalized rule editor 2 but with additional functionality to promote a candidate rule to the active rule state and manage the rule in its active state (note that an active rule is a rule that may be evaluated during an obfuscation-related activity);

(e) a data systems metadata interface 5 for capturing existing rules about metadata often persisted in multiple forms across disparate data systems;

(f) a metadata editor and repository 6 for extending the metadata about the data resources of data systems such that bindings to the appropriate rules and rule sets are enabled and for saving the extensions in a repository;

(g) an external models interface 7 for translating elements of common industry enterprise models into rule and metadata specifications;

(h) a data systems explorer 8 that can examine currently known metadata about enterprise data systems and discover additional metadata that was previously unknown or in conflict with existing specifications;

(i) a data set editor 9 that has the ability to either manually or automatically selectively rewrite portions of the enterprise content and to extend content in lieu of rewriting it;

(j) an interactive monitor 10 that actively and interactively monitors and records any obfuscation-related processing;

(k) a multi-platform runtime environment 11 for all of the above components that has the ability to be executed on most common hardware and operating system platforms.

Each of these major components is discussed more fully below.

1. Rule Evaluator

The rule evaluator 1 is the dominant component for the operation of the present invention. The other components of the present invention provide specialized support for the rule evaluator. Through the rule evaluator, the behavior of the present invention is mostly governed by the content of its repositories, as opposed to the static behavior found in typical code-based behaviors. That is, the present invention is driven by mutable models that are described in the content of the present invention's repositories, and the role of the code base of the present invention is to interpret those models and provide a rich set of primitive interfaces to functionality outside of the code base.

In a preferred embodiment of the present invention, the rule evaluator is a probabilistic-driven rule evaluation suite that can optimize its behavior based on both user-specified guidance and on properties learned during execution. This optimization generally has an extraordinary performance benefit by avoiding computations that can lead to unsuccessful solutions. Upon each execution cycle, the successful bindings to solutions are remembered. In one embodiment of the present invention, the means to find a solution (called a "solution path") is also learned by first determining the ratio of successes to the number of resolution attempts as a measure of probability and then associating that probability with the solution path. Additionally, in another embodiment of the invention, the probability functionality is made more sophisticated by applying probability techniques such as those derived from Bayes Networks or Markov model analysis [2]. Thus, upon the next visit to a previously visited rule, the early phase of the evaluation activity is more quickly found by selecting those solution paths with the highest probability of success.

Of particular note is the rule evaluator service for "what-if" trials to support the specialized needs of simulating an event or activity in components external to the repository. In one embodiment of the present invention, rules operating as agents simulate common events and activities for each class of external components. For example, a rule agent might simulate the failure of a database operation to update a data set. In that many rules may be involved in the obfuscation of data across an enterprise, such simulations are used to test rules in such a manner as to not change data in the enterprise data systems.

Re-evaluation of rules that have been previously evaluated is necessary because the full data space (including the sub-space configurations of an enterprise) is likely to change over time. This is particularly true for large enterprises where the operational units own and share many data resources. The present invention accomplishes this by recognizing changes of any of its rules with respect to time. Thus, if a user-asserted rule or a learned rule has changed since the last time a particular evaluation was performed, and if that change is somehow involved in the current evaluation, then the present invention will force the re-evaluation of the rule that has changed, and it will also raise an event to notify the user of the change.

To model certain problems, the rule evaluator has optimized primitive features for: data-driven and goal-seeking logic, intelligent scheduling, quantification of variables, intensional rules, transducer-type rules, and testing rule behavior (tracing and simulation). At least two mutable functions are provided by the rule evaluator: the auto-generation of filler data and the auto-generation of obfuscated data sets and their distribution. These features are described below.

a. Data-Driven and Goal-Seeking Logic

The data-driven and goal-seeking logic features of the rule evaluator 1 provide the ability to reason about the rules in the repositories of the present invention. Considering the complexities associated with obfuscating data across an enterprise, modeling the decision-making logic for obfuscating data in an enterprise is more than providing simply a static ordered list of instructions. This is especially true for the typical enterprise, which continues to evolve and often has significant changes in its mission.

Rather, decision-making logic must include provisions for creating and executing a plan for decision-making that is based on information that is learned over time about the enterprise. In the present invention, this information is maintained in the repositories. Some of this learned information may be more likely to lead to a successful decision than other information. For example, consider the intentionally simplistic rule: "It is more likely that sensitive data for obfuscation will be found in a data resource about people than a data resource about zip codes for mailing." Upon examination of this rule, not only is the likelihood stated but also guidance is provided as to where to find the desired result for obfuscation.

In their basic behavior, data-driven and goal-seeking rules may be expressed more formally using two well understood techniques for logical reasoning [3] called forward chaining and backward chaining.

In the present invention, data-driven rules are supported by an extended form of forward chaining logic, and goal-seeking rules are supported by an extended form of backward chaining logic. These extended forms of logic are provided by the functionality of the rule evaluator 1 as described herein.

In a preferred embodiment of the present invention, data-driven rules are used to reason about when to apply instructions for obfuscation based on one or more conditions. For example, consider the rule: "If the data element is a telephone number, then its sub-data element of area code specifies a location." Data-driven rules obtained from the repositories of the present invention provide a means to add additional data that in turn may spawn the success of other rules, eventually leading to the success of a particular goal.

For example, consider reasoning about two data elements that are to be obfuscated wherein their new obfuscated data items must have compatible location data (likely sub-data elements as in the case of a telephone number and an address). In a preferred embodiment of the present invention, data-driven rules are used for the expressions of what to do in situations where detected changes in the enterprise are to cause changes in the present invention's behavior and repositories—for example, where a new data set has been added to a collection of data sets or the metadata about a data set has changed. In one embodiment of the present invention, static and axiomatic rule information about common classes or types of data elements may be directly implemented in the code base for improved performance. These implementations are called "primitive rules" or simply "primitives."

In another preferred embodiment of the present invention, goal-seeking rules are used to reason about how to solve one or more goals for an obfuscation activity. For example, the rule evaluator 1 might reason about how to obfuscate one or more data systems of an enterprise. For example, consider the simplistic rule: "A data set can be obfuscated if has not been previously obfuscated today" wherein the conditions for determining whether the data set has been previously obfuscated today are specified through other rules. In that each goal or sub-goal determines which rules are selected and applied, a goal-seeking approach to representing decision components for an enterprise that is changing over time is flexible and simpler to maintain than finite-state logic (such as coded "if" tests). It also allows for reasoning about previously unknown conditions in that for each goal to be resolved, sub-goals are identified wherein a sub-goal may resolve to another rule previously not understood to be part of the existing problem.

A finite-state logic approach for obfuscating an enterprise, on the other hand, must be "fully" understood and specified a priori; that is, the logic must be specified for all known conditions. In this manner, the program will mechanically test most all conditions and mechanically follow the static branches of a decision tree. By contrast, the present invention dynamically creates a plan for solving a problem and then updates that plan as it discovers rules that either present solutions to pending rules or finds more rules to evaluate. In this manner, the present invention can reason about any and all of the active rules in its repositories, which means that the behaviors of the present invention can grow with and adapt to the needs of the enterprise over time. Unlike prior art tools for obfuscation, models of business processes and practices are not frozen in a static code base, and tests are not conducted based on a decision tree that operates statically and blindly over whatever the current data content may be.

Accessing one or more repositories of the present invention to acquire and reason about information is a critical aspect of the present invention in that information about an enterprise is not built into the code base but rather is completely modeled in the content of one or more repositories. In a preferred embodiment of the present invention, there are four important classes of interrogation of the repositories for obfuscation-related information, each of which is described below.

The "literal" interrogation attempts to solve a problem literally as stated; that is, the rules in the repositories of the present invention are not applied. Typically, only the primitive functionality necessary to search a repository's store of information is applied. This form of interrogation produces results only if a matching stated fact or facts is/are found.

The "explicit" interrogation is a relaxation of the literal interrogation. The relaxation is to permit a limited inference (only a certain maximum number of rules can be applied) over any or all of the components of the problem. Consider the intentionally simplistic problem <X> has an engine. With a small amount of inference, it may be reasoned that <X> has an engine could be restated as engine is part of <X>.

The "implicit" interrogation is the antithesis of literal and explicit interrogation in that it attempts to solve a problem by using only implied information. Even though the information store contains the fact "engine is part of a computer," implicit interrogation would only succeed if it could somehow be implied through the rules that "engine is part of a computer." This form of interrogation is necessary to test the inference abilities of a collection of rules.

The "general" interrogation is an optimized combination of all possible solutions generated by interrogating literally, explicitly and implicitly using whatever information can be discovered to contribute to the discovery of another solution. This form of interrogation is the default interrogation.

In the present invention, the data-driven and goal-seeking logic functionality that are part of the rule evaluator's ability to logically reason is central to all other aspects of the present invention. The rule evaluator has many commonly-used primitives (that is, low-level functionality, properties and settings) that are, in a broad sense, rules and properties that are directly implemented in code and data structures of the present invention. For example, one primitive might provide services for printing anything that has been generated for presentation to a human user. Another primitive might provide access to the host environment for acquiring the current wall clock time. These primitives are the foundation from which all other rules and properties of the present invention are constructed.

The data-driven and goal-seeking logic functionality is also used to both discover and assist in defining implications in sensitive data that might otherwise not be realized in an obfuscation activity. Consider an example requirement to obfuscate the location of people. Then consider that in some states and provinces, the license plate number of a vehicle is assigned based on the location of the registrant. Thus, to properly obfuscate the location of a person, the license number of their vehicle would also have to be obfuscated. Then compounding this difficulty, the typical modeling of such information would have the identification of the person in a different data set than the data set of the vehicle and its license number. Indeed, many such implications exist in an enterprise and are solved by the derived knowledge available through the reasoning abilities of the data-driven and goal-seeking logic functionality of the present invention.

b. Intelligent Scheduling

Conventional scheduling tools provide the means for temporally ordering the executions of tasks with limited conditionality. In addition to such scheduling operations, by virtue of the functionality provided by the rule evaluator, the present invention is able to perform the following functions: (i) automatically discovering the tasks (that is, subsequent rule evaluations) to be executed; (ii) executing these tasks in parallel, including any sub-tasking; and (iii) conditionally executing any task based not only on the success of ancestor tasks, but optionally based on the success of any rule known to the present invention. Accordingly, intelligent scheduling reduces the need for human operators to separately identify and manage the many tasks that the present invention automatically identifies as necessary and performs.

For example, the execution of the current thread may be aborted if the processing time reaches a specific wall clock time or if another process or thread has not yet reached completion. Through the present invention's rules, even extremely complex schedules can be readily specified. The benefits of intelligent scheduling through the rules of the present invention include improved productivity of the users, reduced wall-clock time for completion of tasks, and the reduction of complexity associated with obfuscating data across an enterprise. Further, as described more fully below (see Section B.1.e.), an operation such as a schedule may be graphically depicted, thereby improving the ease and quality of comprehension among its users.

c. Quantification of Variables

In the present invention, a rule has a behavior that expresses quantification of the variables in that rule, specifically, logic quantifiers such as the universal ($\forall$) ("every") and existential ($\exists$) ("at least one") quantifiers. Rules without quantification typically express their variable components in class-like statement, such as "Car has engine." The latter statement, however, can be misleading in that not every car has an engine. Instead, the statement, "A car has an engine" would be more accurate. In fact, it would be even more precise to say, "Most cars have an engine." Quantification supports the specification of rules in this manner (i.e., rendering the rules more precise). Other examples of rules with quantification are, "Every Social Security Number is to be obfuscated" and "There is at least one disease of a person to be obfuscated." In one embodiment of the present invention, other quantifiers such as "many" and "no" are also implemented in the rule evaluator 1.

d. Intensional Rules

From a logic perspective, intensional rules in the context of the present invention are rules that describe the intended aspects of the solutions or goals involved in other rules. Consider the obfuscation of a "telephone number" data element. Given that an area code is a constituent element of a telephone number, obfuscating the telephone number without restriction could likely entail changing the area code as well. Consider, however, that a "city" data element might somehow be associated with the telephone number data element (that is, it is in the same data record or it is referentially constrained). What this association infers is that obfuscating the telephone number must be congruent with the city location; therefore, given the rules that obfuscate a telephone number data item, there may be additional rules that constrain the allowable values that can be substituted by the obfuscation activity.

For example, the following intensional rule might be asserted: "For every telephone number, the area of the area code of the telephone number must be consistent with any location data elements." In this scenario, the present invention interrogates its repositories for constraints as part of the derivation of an appropriate obfuscation process, and then applies those constraints to a value domain that will be used to derive the final obfuscated value. Note also that intensional rules will often apply the quantification abilities of the present invention (see Section B.1.c. above).

As opposed to intensional rules that are applied during the obfuscation of a data item, there may be other intensional rules that are applied after the obfuscated valued has been substituted. These latter intensional rules are used to verify the logic of other obfuscation rules, and they may also be used to validate the behavior of rules during obfuscation. In the present invention, these intensional rules are a convenient means for expressing the intended nature of the results of many simple to very complex activities that are involved in obfuscating an enterprise. For example, a user might state (using an intensional rule) that the results of a particular obfuscation activity are to include at least 100,000 changes to the Last Name data element. If this intensional rule failed, then an event would be created to announce the existence of the failure. As such, intensional rules provide an automated means to sense the integrity of a business process such as obfuscating the business data resources of an enterprise. In one embodiment of the present invention, intensional rules have specialized primitives that facilitate the specification of an intended result and the evaluation of an intensional rule— for example, a primitive to fire an alert if an intensional rule fails (see Section B.8. below).

Further, the present invention's intensional rules may also be considered as a means to specify policy in that, by definition, an intensional rule specifies the intended or allowable properties of something.

e. Transducer-Type Rules

A transducer-type rule is the means for expressing temporal rule evaluations in the present invention. A specialized form of transducer is at the core of the rule evaluator of the present invention. Typically, a transducer reads an input and writes an output. [7 at pp. 5, 43-52, 198-213; 9 at pp. 219-242] The transducer-type rule of the present invention does much more than that—it is enabled by all of the other features of the rule evaluator, and it also has some major functional additions to improve reusability, expressive power, and optimization.

Figure 2:
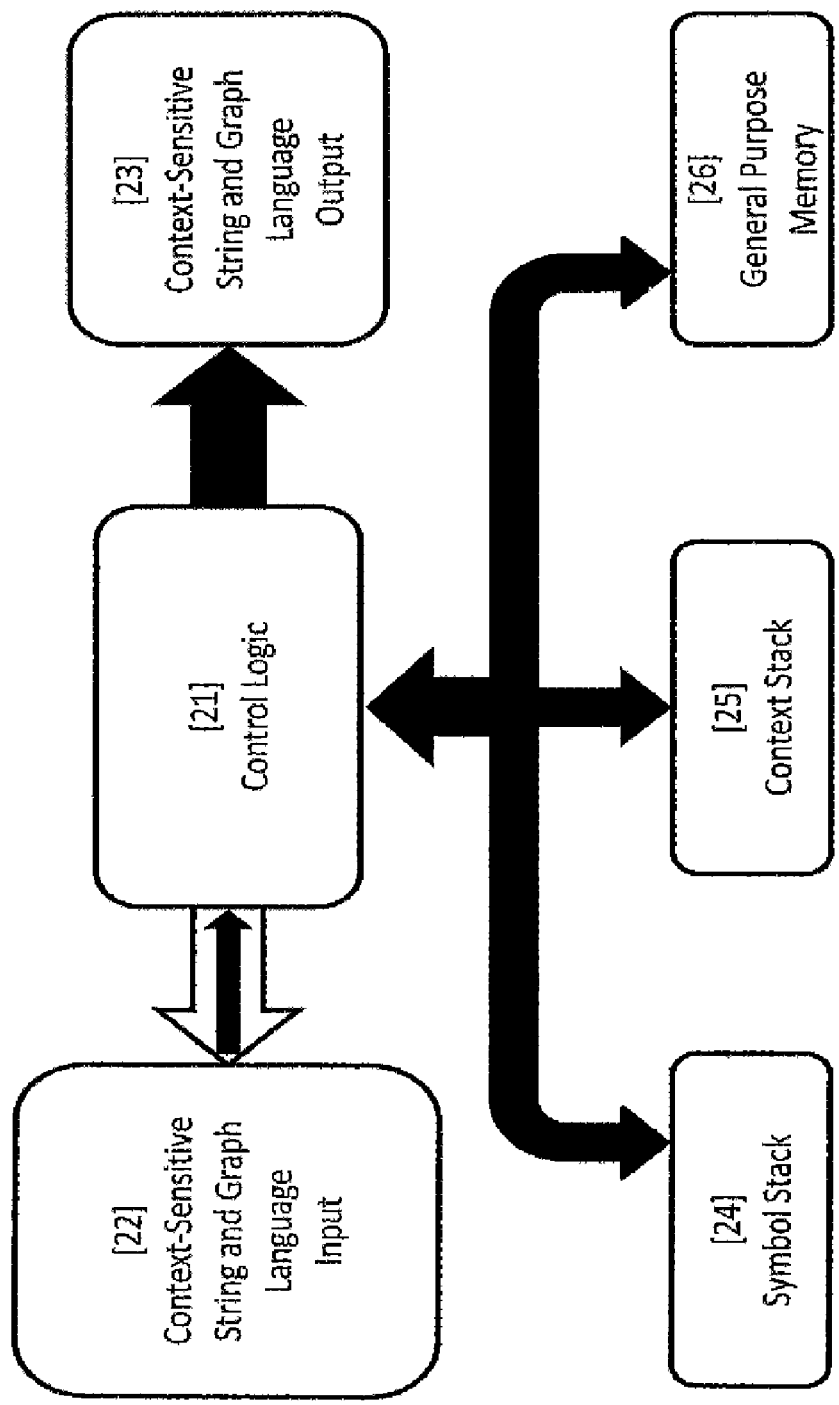
FIG. 2 is a flow chart that depicts the generalized configuration of a transducer-type rule in the context of the present invention.

FIG. 2 is a flow chart that depicts the generalized configuration of a transducer-type rule in the context of the present invention. In the present invention, a transducer-type rule is derived from a generalized transducer-type rule, which is a specialized and optimized primitive form of a rule. Specifically, the functionality of the generalized transducer-type rule is specialized to support the probabilistic selection [2] of alternative changes of state and to learn which alternative state changes are more successful than others through the same technique that is used to select rules probabilistically. This functionality greatly improves the performance of a transducer-type rule by selecting the most probable rules to evaluate. As probabilistic information is learned, the present invention updates the specification of the transducer-type rule involved. (Note that within the present invention, there are specifications of rules and specifications of results. When a rule is evaluated, it produces a result.)

In one embodiment of the present invention, the generalized transducer-type rule may be extended from one of many forms of transducers that vary in complexity and efficiency. [9, 10] The choice is often determined by the dynamic nature of a transducer-type rule's specification in that the cost of compilation or substitution of a simpler transduction may exceed any benefits, especially if a transducer-type rule is frequently changed in a manner that requires repeated compilations or substitutions.

Referring to FIG. 2, the control logic 21 cycles a transducer-type rule through its states and transitions, including an input 22 for the language to be processed, an output 23 for the results of the processing, and a memory that preferably has at least three specialized forms: a symbol stack 24 for holding information about handling the input, a context stack 25 for holding information about the context-sensitive state of the processing, and a general purpose memory 26 for the various primitive functions.

In a preferred embodiment of the present invention, the transducer-type rule can call upon one or more other rules, including a recursive call to itself, and can also form a rule and launch the evaluation of that rule. Some of these other rules may be transducer-type rules, which in turn can call upon other rules, etc. In this manner, a transducer-type rule may be reused rather than having all of its logic replicated elsewhere.

In one embodiment, the transducer-type rule has specialized and optimized primitives that simplify the specification of how to translate one language into another. These translation abilities are of significant importance to the present invention because they allow the transducer-type rule to capture information about the enterprise that is expressed in models external to the present invention and then translate that information into a language that can be used by the repositories of the present invention. In that a language may be defined formally by its grammar, computational linguistics provides a formal means to derive the requirements to parse a language, including translating or transducing that language to another language. Often these requirements are expressed through a theoretical model called an abstract machine, which provides a formal and mathematically understood behavior that can typically be readily implemented in software [2, 4, 5, 6, 7].

In a preferred embodiment of the present invention, a Mealy machine [8] is extended to have (i) usability features for easing the specification and execution of temporal logic (typically procedural in nature) and (ii) the rule features of the present invention so as to behave as a specialized rule that can be evaluated by the rule evaluator 1. This extended Mealy machine is called a "transducer-type rule." The transducer-type rule is used to handle context-sensitive languages within the present invention. As used herein, the term "context-sensitive languages" includes all sub-languages, such as context-free and regular languages.

As an extended Mealy machine, a transducer-type rule of the present invention accordingly may visually represent its allowable behaviors by depicting its set of states and the relation that defines each transition from one state to the next state. This results in a labeled directed graph, wherein the set of vertices is the set of states and the set of edges is the set of state transitions. Furthermore, each edge in the graph is a "labeled" edge from one vertex to the same or another vertex with an edge input label and an edge output label.

A transducer-type rule of the present invention has a single state with no labeled edges entering it—this state is called the initial state. A state that has no labeled edges that leaves this state is called a final state. More than one final state can exist. Thus, a specific execution of a transducer-type rule describes a "path" by indicating in order all of the labeled edges used from an initial state to a final state. In a preferred embodiment of the present invention, a path is used to validate the required behavior of a transducer-type rule.

The present invention extends the specification of a transducer-type rule such that it may be reused in the expressions of both an edge input label and an edge output label, wherein each reference to the same transducer-type rule is a different instance of that transducer-type rule. Thus, the reuse of a transducer-type rule's specification becomes convenient and reduces development time of a specification. It also improves the overall reliability the present invention by avoiding the replication of logic. Moreover, the transducer-type rule hides the complexity of its specification by reducing that specification to a single reference (such a rule name).

The present invention supports intrinsic multi-threading of a transducer-type rule such that more than one execution may be concurrently in progress with one or more other executions in the transducer-type rule. First, by virtue of the rule evaluator, multiple process threads may be using any one rule at the same time. Specifically, any static aspects of a rule are shared among the threads, whereas each mutable aspect is replicated into a separate instance for each thread.

A transducer-type rule is considered successful in its execution (that is, its evaluation as a specialized rule) if its output is not empty. As used in the present invention, the transducer-type rule "executes" its operation when it is asked to be evaluated by the rule evaluator 1. If the transducer-type rule did not generate an output, then it is considered unsuccessful in its execution.

More specifically, if an edge input label is a transducer $T_i$, and if the transducer $T_i$ is successful in its execution, then the edge input label is considered successful. This is an extension of the match on an edge input label as in the Mealy machine. For example, typically the transducer-type rule $T_i$ performs a test on the input from the current input state, or it might perform a complex test that could involve still other transducer-type rules. If the edge input label is successful, then the state transition proceeds to handle the edge output label. In a preferred embodiment of the present invention, any edge input label or edge output label can be substituted with a reference to another transducer-type rule or a recursive reference to the transducer-type rule that is hosting the transition.

Figure 3:
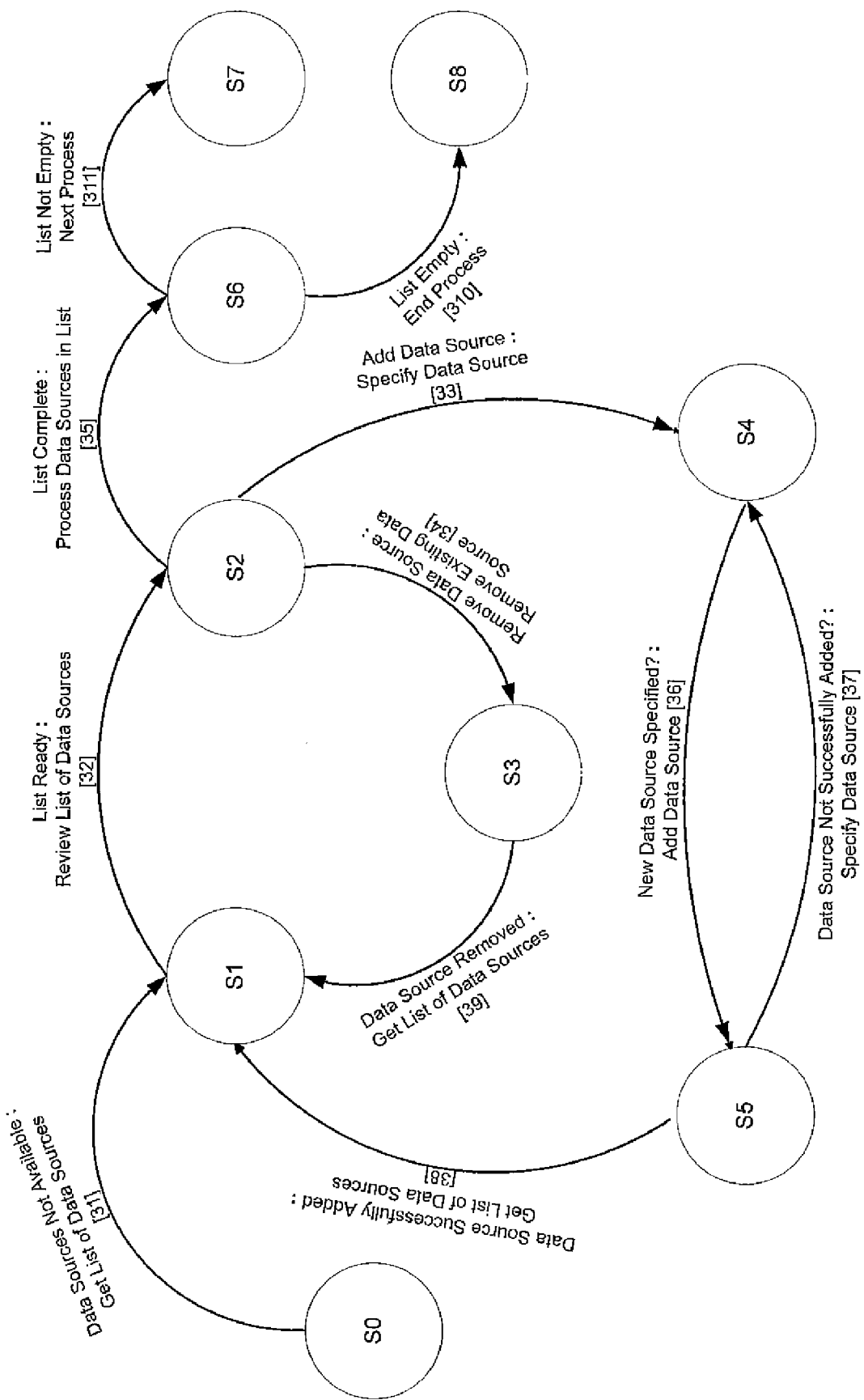
FIG. 3 is a diagram that illustrates an example use of a transducer-type rule in the context of the present invention.

FIG. 3 depicts an example use of the transducer-type rule. In this example, the rules are used to evaluate a state, causing an action to be executed based on the current state of the machine and then transitioning the state of the machine. The states are represented by the nodes (circles with Sn). The value of n in the state title (Sn) represents various states of the machine. The arcs in the diagram have the nomenclature state:action wherein a given state causes the associated action to follow. This example shows how rules may be utilized to prepare data sources for an action that requires the metadata associated with data sources.

In FIG. 3, the initial state of the machine, S0, is that there are no data sources available for use. The rule "Data Sources Not Available" 31 causes the execution of the action "Get List of Data Sources." Once the action is complete, the machine state is transitioned to S1.

At state S1 the rule "List Ready" 32 evaluating true causes the action "Review List of Data Sources" to execute, and then the state of the machine is transitioned to S2. At state S2 three rules are fired: "Add Data Source" 33, "Remove Data Source" 34, and "List Complete" 35. The ability to have more than one rule fire based on a machine state allows for the evaluation of multiple rules and subsequent execution of multiple actions, which in turn allows for logical branching of rules. Rules may be written in such a manner that they are mutually exclusive, in which case only one will execute actions (similar to true/false). Rules may also be written in an inclusive manner, in which case more than one rule may be true, and all rules that evaluate to true will execute their related actions.

If "Add Data Source" 33 evaluates true, then the action "Specify Data Source" is executed and the machine state is transitioned to S3. When the state of the machine is S3, the rule "New Data Source Specified" 36 executes the action "Add Data Source" and transitions the machine state to S4. At state 84 two rules are fired: "Data Source Not Successfully Added" 37, which executes the action "Specify Data Source and transitions the state of the machine to S3, and "Data Source Successfully Added" 38, which executes the action "Get List of Data Sources" and transitions the machine state to S1.

If "Remove Data Source" 34 evaluates true, then the action "Remove Existing Data Source" is executed and the machine state is transitioned to S5. At state S5 the rule "Data Source Removed" 39 is fired, the action "Get List of Data Sources" is executed, and the machine state is transitioned to S1.

If "List Complete" 35 evaluates true, then the action "Process Data Sources in List" is executed and the state of the machine is transitioned to S6. At state S6 two rules are fired: "List Empty" 310 and "List Not Empty" 311. If "List Empty" 310 evaluates true, then the "End Process" action is executed and the machine state is transitioned to S8. If rule "List Not Empty" 311 evaluates true, then the "Next Process" action is executed and the machine state is transitioned to S7. The rule set has ended when the state is at S7 or S8.

In a preferred embodiment of the present invention, a transducer-type rule uses a primitive built-in function to change the technique by which the edges of the next state will be evaluated. By way of example, but not limitation, that technique may be a nondeterministic evaluation technique or a logic programming technique. The nondeterministic evaluation technique is preferably the default in the present invention because the transducer-type rule is typically used for temporal operations, which are more consistent with a nondeterministic evaluation technique.

With the logic programming technique, upon failure of an edge input label or edge output label, the present invention will backtrack to the next most recent alternative edge and attempt to evaluate the next transition (that is, edge). If no transitions of the current state are found to be successful, then the transducer-type rule will backtrack to the previous state in the transducer-type rule's path and repeat the evaluations of the edges at that state. This activity will continue until at least one successful transition is discovered, and then execution of the transducer-type rule will continue. Thus, if no successful transition is discovered, then the owning transducer-type rule fails to write a non-empty output; in other words, the transducer-type rule is considered unsuccessful.

If an edge output label is a transducer-type rule $T_o$, then transducer-type rule $T_o$ is executed. The output of transducer-type rule $T_o$ is written to the output of the transducer-type rule that hosts transducer-type rule $T_o$. In a preferred embodiment of the present invention, the output of transducer-type rule $T_o$ is also written to the executing thread instance of the next state, which in turn may be queried by the edge input label of the next state. In the present invention, the intrinsic multi-threaded nature of a transducer-type rule causes the creation of new instances of any transducer-type rule element that may be variant over the execution threads. For example, certain properties of a state in the transducer-type rule will be variant in each execution thread, such as the time the state was reached or the value of the input to the state.

Additionally, in the present invention, a transducer-type rule may make new assertions (that is, statements of new information) to the present invention's repositories wherein an assertion may also cause one or more other assertions to be added or an existing assertion to be modified or removed. This technique is used to support the learning ability of the present invention. A transducer-type rule may query the present invention's repositories using the data-driven and goal-seeking logic features described in Section B.1.a. above. A transducer-type rule has a retrospection ability that allows the transducer-type rule to examine its specification or the specification of another transducer-type rule, what it is doing, what it has done (that is, the current state of the transducer-type rule's path), and what it will do next.

In the present invention, a transducer-type rule may suspend or terminate the transition operation of one or more edges of the same state. For example, if a transducer-type rule on an edge was successful in finding a goal before the transducer-type rules on other edges of the same state, then it is likely that the behavior may cause the termination of the other, likely nondeterministic, transition operations, thus optimizing the computation required to reach a successful solution and avoid unnecessary expenditure of computational resources. The behavior of a transducer-type rule may be either interpreted directly from its specification or from compiled code.

In a preferred embodiment of the present invention, a transducer-type rule may dynamically create, modify or destroy one or more transducer-type rules, wherein the invocation of any new or modified transducer-type rules may occur immediately or based on subsequent use. Two important benefits of this feature in the present invention are that it is (i) a means for representing a "learned" expression of procedural knowledge (that is, how something is done) and (ii) a means for expressing how an editing operation (such as editing a data set or editing the specification of a rule or transducer) is to be carried out.

In short, the rule evaluator 1 of the present invention is a logic programming system that uses a transducer-type rule as a means for knowledge representation. (This is different than the function for changing the technique by which the edges of the next state will be evaluated, which is discussed above.) In logic programming terms, the edge input label and edge output label on an edge are respectively a condition and a semantic that constitute the antecedent and consequent of a rule. From a logic programming perspective, an edge, otherwise perceived as a rule, is an important part of the knowledge base in the repositories of the present invention. Further, by virtue of the edges being associated with the states of the transducer-type rule, the rule evaluation becomes ordered and thus provides a convenient means for representing procedural knowledge. For example, the procedural knowledge represented in a transducer-type rule could be used to represent how collections of obfuscated data are to be distributed to interested elements internal or external to an enterprise.

As used in the present invention, the transducer-type rule extends the Mealy machine so as to provide a problem-solving technique based on the so-called morphological analysis [11]. Multi-dimensional and non-quantifiable problems, such as may be found in the specifications for obfuscating an enterprise, are reduced in complexity through morphological analysis. The complexity reduction is accomplished by reducing the number of possible solutions by eliminating those combinations of solutions that are illogical as opposed to attempting to reduce the number of variables.

For example, the transducer-type rule of the present invention may represent cognitive processes, particularly that of human users. In this regard, dialogue between the human user and a transducer-type rule is modeled and then used to control computer support using a graph as depicted in FIG. 3. The result is a very effective and intelligent man-machine interface. In fact, many problems involving decision and reasoning forms of support (e.g., startup and recovery) may be expressed and operationally supported by the present invention's transducer-type rule, thus easing specification of and interaction with the many obfuscation activities within an enterprise.

f. Testing Rule Behavior: Tracing and Simulation

The rule evaluator 1 includes functionality for testing both candidate and active rules through tracing and simulating the execution behavior of a rule, wherein the simulation ability can block data changes to the data systems of the enterprise. The tracing and simulation functionalities provide a means for verifying and validating the effects of rule behavior on the enterprise.

To be effective, the simulation may be single-stepped so that each step of the rule's execution state can be examined. Single-stepping may be initiated by: (i) starting an evaluation that is designated to be traced or simulated; (ii) manual initiation using a break key or the evaluation of the primitive rule (of the present invention) to cause immediate breaking; (iii) designating a rule to be traced or simulated and additionally based on any properties of that rule such as the current evaluation values; and (iv) designating an event to be traced or simulated. For the transducer-type rules that are intrinsically temporal in nature, each step of execution is a transition from one state to another; for data-driven and goal-seeking rules, on the other hand, each step of execution occurs when the rule evaluator 1 unifies to another rule.

In one embodiment of the present invention, the stimulation is presented graphically to a user as a network of nodes and links depicting the steps, their execution status and errors, and including multiple paths to depict multi-threaded operations. Controls are offered to single-step the next step (that is, execute the next step and then halt), skip forward to a future designated step (that is, continue execution to the designated step and then halt), rollback to a previous step (if possible), abort, restart and save the current depiction for later examination.

g. Mutable Function for Auto-Generation of Filler Data

Obfuscation involves much more than simply changing data values in that a data collection may also have properties that are considered sensitive. In the present invention, obfuscation also involves automated generation of new filler data content. Consider a data set containing data about the employees of a company. Even if all of the employees' data elements were encrypted, it would still be possible to determine the number of employees by simply counting the number of employee records. Similarly, the number of columns in a data collection could (undesirably) distinguish it among other collections of data. In one embodiment of the present invention that uses the SQL language of the Java Database Connectivity (JDBC) interface (see Section B.7. below), either data elements (i.e., columns) or rows, together with their corresponding filler content may be inserted.

The data that is used for filler must abide by the constraints of the metadata for each data set as specified by one or more repositories of the present invention that participate in the specification. It is most likely that such filler data will be comprised of data taken from more than one value domain, for example, filler data for a "Last Name" column, filler data for a "Telephone" number column, etc.

In one embodiment of the present invention, generation of the filler data is accomplished through either or both of the following two approaches: (a) deriving the data from actual data; and (b) generating artificial data based on the rules that specify the technique for generating each data type, with optional additional specifications for any specialized roles of that data type (for example, a rule for generating a Social Security number versus a rule for generating a telephone number in Europe).

h. Mutable Auto-Generation of Obfuscated Data Sets and Their Distribution

Conventional obfuscation tools provide the means for obfuscating an existing data set often by copying existing data sets to holding data sets, while obfuscating the data in line with the copy operation using static hard-coded functionality driven by a few limited models of where to perform the obfuscation and what obfuscation technique to apply. By contrast, the present invention automatically creates the obfuscated data sets by evaluating the rules and properties for obfuscation in the various repositories of the present invention.

Through its primitive functions, the present invention can execute any external applications that may be desired or entrenched in the existing enterprise. That is, if an enterprise has in-place applications to obfuscate a part of the data of an enterprise, then one or more transducer-type rules of the present invention may be specified that can remotely configure, execute and examine the results of one or more obfuscation activities of such applications.

Furthermore, through its primitive functions, the present invention can handle rules, preferably in the form of a transducer-type rule, for distributing resultant obfuscated data sets and any other desired data sets electronically to specified organizational elements that are either part of or external to the enterprise.

For development, maintenance, compliance and quality assurance reasons, testing is a crucial business function for most any operational obfuscation activity. Generally, this does not imply that a complete obfuscation activity be performed. Rather, the obfuscation activity is performed under test conditions and data. It is possible that the complete obfuscation of one or more data sets may not be necessary for testing purposes or for the limited creation of a collection of data sets and their schema structure. By applying rules that determine the context (that is, the rule space and data space) of subsequent rule evaluations, the present invention provides an ability to control the success or failure of rules operating within the scope of that context. Accordingly, the present invention limits the operations of obfuscation rules to only certain operations, including the sampling of data that may be accessed, through rules that in effect block designated portions of an evaluation's problem space.

In that the specification of the creation of obfuscated data sets and the distribution of these and any other associated data sets in the present invention is comprised of rules, essentially all significant activities may specified, edited, tested and monitored during execution (that is, evaluated by the rule evaluator of the present invention).

2. Rule Editors and Repositories

The rule editors and repositories of the present invention are a suite of functionality to specify, persist, search, edit, destroy, examine, document and test obfuscation rules that can be bound dynamically (that is, implemented in the execution environment) to any "named" and "typed" data spaces of the enterprise that are accessible through "connectors" to the data systems of the enterprise. Information associated with this functionality is presented to a user through both textual and graphic mutable representations.

The present invention completely models the information about an enterprise in the content of one or more repositories of the present invention. Each repository has a repository manager that provides the functionality for computationally (that is, these are not directly for the human interface): (i) searching the repository content; (ii) editing the repository content; (iii) performing various general purpose algorithmic services such as for optimization and pattern matching; and (iv) performing various management services for persisting and virtualizing the content of the repository in the execution environment, as well as other common data management services such as setting operational management parameters, performing checkpoints and recovery, etc.

The present invention applies a technique for specifying the appropriate technical and business rules of an enterprise obfuscation activity in various contexts and then applies a technology that can efficiently implement the intent of these rules within those contexts. For the specification of rules, both context-sensitive string and graph languages capture the expression of rules and data definitions.

In a preferred embodiment of the present invention, context-sensitive string and graph language statements are translated into statements in the graph language that are persisted in the repositories of the present invention. In turn, these statements in the graph language are directly interpreted by a graph automaton [12] in each repository 3, 4, 6, 10. In turn, the rule evaluator 1 carries out the logical reasoning and semantics of the rule specifications.

In one embodiment of the present invention, the language of each repository is a formal graph language described by a formal grammar, called a "plex" grammar [13, 14] that, in combination with attribute grammars [15], is used to represent the contents of each repository. Graph languages and their grammars, as opposed to their counterpart string languages and grammars, efficiently and succinctly express the many multi-dimensional relationships that are necessary to model an enterprise and in turn direct obfuscation activities. Graph languages and their grammars are well studied and mathematically understood to offer the efficiency and expressive power [12 at 294-313] needed by each of the repositories of the present invention. Further, many indices are both statically and dynamically created and maintained to improve access and performance of graphical operations in each repository. The high performance of the graph language expressions provides not only immediate information about the state of the present invention but also a means for capturing prior state expressions (as derived by the active rules). In addition, the graph language expressions provide the performance needed to efficiently evaluate the implications of future states.

In the present invention, the obfuscation rules for an enterprise include, at a minimum, specifications for: (i) what data elements are to be obfuscated; (ii) what obfuscation technique is to be applied to a data element; (iii) how each obfuscation technique is to operate; (iv) how to get the metadata about a data set; (v) binding a data element to the data resource; (vi) decomposition of a data element into sub-fields wherein each sub-field may be separately accessed and manipulated in the same manner as a data element; (vii) how and where to substitute a new value for a data item or data items; (viii) the relationships among the constituent data sets of the enterprise; (ix) how an obfuscation activity is to operate; (x) how and what to monitor in an obfuscation activity; and (xi) how and what to report in an obfuscation activity. In a preferred embodiment of the present invention, a foundational collection of these rules is predefined and preloaded in the present invention's repositories. Generally, all these foundational rules are mutable; however, it is likely that certain axiomatic rules of the invention may not be mutable.

Additionally, in a preferred embodiment, the present invention has primitive rules for high-performance, frequently-used functions that can be applied both functionally and temporally. At a minimum, these primitive rules are for: (i) obfuscating the data item of a data element such that specified components of the data item are removed at specific named locations in the data item; (ii) obfuscating the data item of a data element such that one or more constants or one or more specified outputs of the result of computation are inserted at specific named locations in the data item; (iii) obfuscating the data item of one or more data elements by writing the same value to each of these data items; (iv) handling an expression to be performed wherein the allowable functions include all SQL functions and the regular expressions supported by the database connectivity; (v) handling without failure any expression that is intended to be using the SQL language, including expressions that are, at a point in time of use, either syntactically or semantically incorrect for an intended data system; and (vi) translating string language representations of rules into the graph language used by the present invention's repositories.

In a preferred embodiment, there are at least five high-level data obfuscation functions, each of which has its own set of rules that specifies the behavior of the function. Within the context of the present invention, each of these functions may be applied in varying combinations and orders. These five functions are: pre-masking, derivation, value domain constraints, substitution, and post-masking. Each of these high-level functions can be applied optionally to one or more single or combined data elements to create obfuscation rules that specify the desired obfuscation and/or how this activity is to be temporally ordered.

In one embodiment of the present invention, these five functions are extensions of the implementation of the relational calculus functionality found in contemporary relational database management systems (RDBMS). In this respect, these five functions are limited only by the functional capacity of and the connectors [5] to the target data systems.

The "pre-masking" function removes irrelevant syntactical elements from a data item and is frequently applied to character-based data, such as that found on legacy data systems. One might use pre-masking to extract specific digits of a phone number from the dashes and parentheses, or to work with the many variations in which dates and times can be stored. For convenience to a user of the present invention, many different templates for both common and specialized data patterns will be made available, as well as provisions for creating customized patterns.

The "derivation" function derives data from a data item, possibly from sub-fields and possibly in combination with data items from other data elements. The derivation function can be used for any number of different mathematical and data manipulation operations. One may want to do something as simple as combine a first and last name column to create a third, full name column, or multiply the numbers of a length and width column to create an area column. The user can also perform more complex operations, such as converting dates originally in a specialized representation (such as three-digit binary) to date objects compliant with standards such as found in an RDBMS.

The "value domain constraints" function constrains the value of a data item that is used to replace a value to be obfuscated. This constraint is a relation (that is, a collection) that contains the domain of values (either explicitly or implicitly) that should have only the most minimal, user-acceptable, relation to the original data item. An example of this type of constraint might be to simply fill a field with an encrypted value, thereby making the contents of that field essentially unintelligible. For what is often called de-identification, it is possible to either implicitly (for example, over a numeric domain) or explicitly (looking up a value anywhere in the connected enterprise) generate a replacement data value. Through other features of the present invention such as cross-platform support in the topic specifying the data set editor (see Section B.7. below), this lookup may be in the same data system or any other data system that is connected to the network. Further, these functions must produce identical values from identical data items, thereby assuring referential integrity among identical data items distributed over an enterprise.

The "substitution" function substitutes a new value (typically an obfuscated value) into a data item. The default substitution function is to substitute the value computed by the current obfuscation process into the targeted data item; however, the substitution function can also substitute the new value in another data item of a different data element, such as in data tables that support multi-level security. The substitution function provides a means for applying still further computation to an obfuscated value for a data item—for example, adding a checksum value to the value of the obfuscated data item as is sometimes done with Social Security numbers and credit card numbers.

The "post-masking" function is in many respects the reverse of the pre-masking function, and it, too, is frequently used in operations on legacy systems. Thus, it is possible to add syntactical elements back to a value. In that a data representation is not always formatted in a desired manner, it may be necessary to add to and rearrange the elements of a data item. Consider taking a string of digits that represent a date (062188) and formatting them into a more reader-friendly format (21 Jun. 1988). For convenience to a user of the present invention, many different templates for both common and specialized data patterns will be made available, as well as provisions for creating customized patterns.

The data elements (that is, columns or fields) of a data set contain data items wherein each data item is of a particular data type; for example, the data element of Street Number typically has data items in which all are of the data type called integer. Many data systems require that all of the data items of each data element be of the same data type. By contrast, the present invention recognizes the data type of each data element and thus does not have this rigid restriction on data elements. Conventional obfuscation tools typically provide support specific to only certain data types, whereas the present invention can handle most any data type. In the present invention, it is the type of data constraints (which may optionally include the specification of a data type) associated with a data element that controls what data values (and, optionally, their respective data types) are allowable for that data element.

So as to support the broad data requirements of enterprise-level obfuscation, in one embodiment of the present invention, the common data types, such as integer, Boolean, float, string, etc., are implemented in compliance with the widely-used industry standard called JDBC. This standard covers nearly all data systems and data types used by organizations worldwide. The present invention recognizes all of the common data types through its primitive functions [5, 14, 15] and thus can access and manipulate essentially any type of data with both ease and extensive support. Further, the present invention can also hand the often complex forms of non-standard data and data structures that are specified in many older data systems, such as those found on mainframe computers. These complex data types may be decomposed into collections of standard data types using rules, wherein each rule specifies a particular decomposition of a complex data type. In turn, each rule specifies (i) the relationship back to the originating complex data type, (ii) the means for decomposing this particular component into a standard data type from the complex data type, and (iii) its own rule form (e.g., data-driven, goal-seeking, transducer-type), which may be referenced in other rules. The rule evaluator can then reason about a complex data type and in turn perform other activities with the same ease as with the common data types.

In addition to the common data types, other metadata about a data element is essential, such as its size in characters or its range of allowable values. This additional metadata is frequently made available through the metadata catalogues of the targeted data systems. Each data type is further defined by rules specified by users of the present invention. All data serviced by the present invention is required to conform to the constraints that are defined by the properties of the corresponding data type.

Special classes of data types—for example, data elements involving binary large object bitmaps (or BLOBs), such as compressed data, sound tracks, video tracks, and very large text objects—require special consideration. If such a binary object is obfuscated, the object may no longer be operable. For example, if the bits in a JPEG image are obfuscated, the image may no longer be viewable. The specialized limitations of binary large objects are driven by their semantics and application context, for example, aliasing in graphic data and modulation issues in video streams. Even for these types of objects, however, the present invention can provide at least some level of support through its de-identification features, that is, replacing one data item with another.

Frequently, data systems provide additional constraints on their data content other than just specifying the data type, for example, by specifying that a value must be within a certain range. Older business applications often add even more constraints on data through the computational behavior of their application code. Further complicating the issue is the fact that there are often undocumented constraints applied manually by the users of those applications. The rule editor of the present invention can extend the constraints for a particular data element to cover such scenarios, whether the data values are concrete (for example, 123, "Bob") or symbolic (for example, a primary key in a relational database system), thereby enabling the present invention to manage data content that requires additional data constraints other than the data type.

In a preferred embodiment of the present invention, the rule editor includes functionality for extending the information about each rule with a provision for documenting the rule from different perspectives. Such documentation, often managed off-line to obfuscation tools, is needed for coherent management of the complexity of an obfuscation action, especially if the obfuscation is enterprise-wide. In one embodiment of the present invention, the user interface presents a multi-pane or tabbed window where one document pane might be used for describing the rule, another document pane might report the test and acceptance status (including, in one embodiment, a simulation of the problem at issue—see Section B.1.f.), and yet another pane might be used to document the rule's development process and progress. Preferably, the user may create new document panes or remove existing panes. It is likely that this user interface would be entirely configured through rules created by users of the present invention.

In the present invention, the generalized rule editor 2 provides common functionality for both the candidate rule editor and repository 3 and the active rule editor and repository 4. Both the candidate rule editor 3 and the active rule editor 4, however, also offer specialized functionality for, in the case of the candidate rule editor, the development of rules that are candidates for subsequent use as active rules, and in the case of the active rule editor, the escalation of a rule to the active state and the simulation and testing of that rule's behavior in an execution environment.

a. Candidate Rule Editor and Repository

The candidate obfuscation rule editor and repository 2 is a collection of user-created and optionally dynamically derived obfuscation rules (that is, rules derived from the previous evaluation of other rules) that are candidates to become active rules. In the context of the present invention, an active rule is one that might be found useful by a user of the present invention. The dynamically derived obfuscation rules are generated from various external models through the external models interface 7. An external model is a model generated externally from the present invention, for example, an enterprise model specified in the Unified Modeling Language (UML). For user-created rules (that is, manually created rules), the candidate rule editor has a human-machine interface that is provided by its parent generalized rule editor abilities. Note that the active rule editor and the candidate rule editor are both specialized extensions of the generalized rule editor functionality.

b. Active Rule Editor and Repository

The active rule editor and repository 4 is a specialization of the generalized rule editor and repository 2 with additional functionality for escalating a rule to the active state and providing a means for simulating and testing the rule's behavior in an execution environment. As such, the active rule editor and repository is a suite of functionality for specifying, editing, destroying, examining, documenting and testing obfuscation rules that can be bound dynamically (that is, implemented in the execution environment) to any "named" and "typed" data spaces of the enterprise that are accessible through "connectors" to the data systems of the enterprise.

3. Data Systems Metadata Interface

The data systems metadata interface 5 is a suite of functionality for accessing the metadata about the data sets of the enterprise's data systems. Often metadata is persisted in multiple forms across the enterprise due to the disparate data systems technologies. For an RDBMS system, the metadata are typically maintained as a collection of structures within the data system and are accessible through specialized Application Programming Interfaces (APIs). Some non-RDBMS systems have the same conventions as an RDBMS system in that they store the metadata internally, whereas other non-RDBMS systems maintain the metadata in separate data sets. Further, there are data systems where the metadata are expressed and applied only within the context of one or more computer application programs. In that case, the data systems metadata interface must acquire from the users all of the metadata needed for any intended obfuscation activity, for example, the data type of each data element, the name of the data element, etc. In a preferred embodiment of the present invention, a JDBC interface is implemented to access the metadata.

The data systems metadata interface 5 dynamically extends metadata of a data system such that bindings may be created between a data system's metadata and the associated rules by the rule evaluator 1. The data systems metadata interface 5 does not replicate the metadata contained in data systems if that metadata is derived from other properties collected about the metadata. In those instances in which the metadata is replicated, that metadata is transformed into a set of rules that may be immediately interpreted by the rule evaluator 1.

In a preferred embodiment, information that specifies the active rule to be applied to a particular data element is included in the metadata extensions, as is information that specifies aspects such as performance and protocol states for interacting with the metadata (for example, the data set is currently open in read mode).

4. Metadata Editor and Repository

The metadata editor and repository 6 is a suite of functionality for extending the metadata about the data resources of the enterprise's data systems. At a minimum, the extensions of the metadata include additional information about what data elements are to be obfuscated and how each data element is to be obfuscated. In a preferred embodiment of the present invention, all of this extended metadata is in the form of rules that may be directly interpreted by the rule evaluator 1. The metadata editor 6 receives metadata from the data systems metadata interface 5, as directed by the data systems explorer 8.

The metadata editor 6 is a suite of functionality for specifying, persisting, searching, editing, destroying, examining, documenting and testing metadata bindings to the active rules of the present invention and to the data systems involved. In one embodiment of the present invention, the functions of the metadata editor are similar to the same functions in the generalized rule editor, and both textual and graphic mutable representations are also used.

5. External Models Interface

The external models interface 7 assimilates relevant metadata information from preexisting external model specifications. Often the external models are models of the enterprise. Generally, such enterprise models represent a considerable investment in time and engineering resources. In this respect, it is productive to capture relevant information that may exist in their content, particularly in lieu of manually entering such information in this invention's repositories. Examples of the modeling languages [16] for such external enterprise models are RM-ODP [10, 17], UML, Alloy, XML and SQL, and popular programming languages such as JAVA, C, C+ and C#.

The external models interface 7 is a mutable transducer-type rule that parses a particular external model's language by applying the grammar for that language. In a preferred embodiment of this transducer-type rule, a series of transformal grammars is applied so as to produce a more efficient and useful result of the parse action. Either concurrently or as a separated step, the parsed result is then transduced into a graph structure that may be readily assimilated into the candidate rule editor repository 3 and by the data systems explorer 8.

In a preferred embodiment of the present invention, to greatly reduce a grammar specification for the translation engine, only the relevant modeling syntax need be detailed in the grammar, while the remaining grammar need be detailed only to a level sufficient to provide the syntactical sentinels for the more detailed grammar.

6. Data Systems Explorer

The data systems explorer 8 of the present invention explores the data systems of the enterprise. It is specialized and optimized to not only index the data that it finds but also to discover, locate and extricate the metadata currently known about the data systems. Upon the discovery of a data system in the enterprise or a new or changed data set that is part of a data system known to the data systems explorer, the data systems explorer directs the metadata editor 6 to update its repository with the metadata about the data system resources involved in the discovery.

Another means of discovery is through the external models interface 7, which generates candidate rules (see FIG. 1). As the external models interface 7 discovers information, it issues assertions of new candidate rules that specify each discovery. These assertions are in the form of the graph language representation of relevant metadata taken from an external model and thus can be readily assimilated by the data systems explorer 8.

As part of the exploration activity, candidate keys may be discovered that in turn will lead to other data sets in the same or other data systems. A difficult scenario involving other data systems occurs in data systems that have features for federation over the same or even foreign data system technologies, wherein the federation feature of a data system causes the content of other data systems to appear as part of it. Thus, the data systems explorer must be aware of and handle the federated content such that operations on that data are preformed correctly. In other words, one or more data sets that are federated into one or more other data systems must be distinguished such that the obfuscation-related activities do not interpret each instance of the same data set as different data sets.

Yet another complication is that the explorer must resolve issues associated with multiple paths, including cyclic paths among the data sets due to cross-referencing among the data sets (for example, a personnel data set that references a skills data set that in turn references a schools data set that in turn references a skills data set again). Thus, the typical "visitor" pattern [11] is insufficient to explore the networked relationships over the enterprise data sets.

The present invention solves the problems of federation and multi-path cross-referencing by applying the context-sensitive features of the transducer-type rule while reasoning about scenarios that involve context-sensitive issues.

Initially, the metadata known about the enterprise in the metadata editor repository 6 will most likely be small; however, as each solution for a new requirement involving obfuscation is implemented, new data systems will be involved. These new data systems may also reveal new relationships to previously known data systems, as well as revealing still other new data systems. Thus, over time, the metadata known to the present invention will grow. Additionally, users of the present invention may add metadata through the metadata editor 6, which will cause the data systems explorer 8 to recognize and use that metadata as it explores the enterprise.

The metadata editor and repository 6 creates dynamic bindings to a data system's metadata resources through the data systems metadata interface 5. These bindings are dynamic in that the metadata content is not copied to the metadata editor 6, but rather included by reference in the metadata editor repository 6. Accordingly, the metadata for a data system will always be current during a specific transaction.

Another significant problem is that enterprises frequently have multiple data systems operating on disparate platforms that are in various states of change at different rates of change. Thus, it is reasonable to expect that the present invention cannot be continually aware of what these changes are, particularly if any of the enterprise systems are or become disconnected from the enterprise network. Further, in that it is not practical to do a total "state" freeze of an enterprise, it must be assumed that concurrency breaches could exist.

The present invention solves the above concurrency problems by virtue of the metadata editor repository 6, which knows all of the metadata that is bound to the active rules of the present invention. As the data systems explorer 8 scans the data system of the enterprise, it checks the metadata (in the metadata editor repository) that is bound to active rules for compliance with the data system being currently scanned by the data systems explorer 8. Accordingly, the data systems explorer 8 detects changes that affect the metadata editor repository 6. Upon detecting such a change, the data systems explorer 8 notifies the metadata editor to update its repository.

Similarly, metadata changes are detected also by the rule evaluator 1. During an evaluation, if an active rule fails in its attempt to acquire metadata from a targeted data system, and if the failure is not due to the execution environment, then the failure must be due to a change in the targeted data system's metadata. Upon detecting such a change, the rule evaluator 1 notifies the metadata editor to update its repository, and then the rule evaluator 1 attempts to acquire metadata from the targeted data system a second time. If the rule fails the second time, then the rule evaluation fails, and the subsequent behavior is governed by the context of the other rules involved in the evaluation.

7. Data Set Editor

The data set editor 9 is a specialized editor that queries and rewrites (i.e., modifies, inserts or deletes) selective partitions of the enterprise content as directed by the rule evaluator 1. The rule evaluator 1 forms the low-level data structures and then invokes its primitive functions to cause the query or rewrite of the enterprise content through the data set editor 9. In a preferred embodiment, each query or rewrite activity involves an SQL generation function in the data set editor 9 that produces the SQL text needed or the previously-complied SQL bindings to be issued to the present invention's interface to JDBC-compliant drivers. All of the application programming interfaces of the data set editor 9 are preferably JDBC-compliant.

The query functionality of the data set editor 9 is limited only by the features of the data systems involved. The purpose of the query facility is to support features of the rule evaluator 1 that extend the SQL-based functionality generally available through the enterprise's constituent data systems.

The data set rewrite features of the data set editor 9 support all traditional modifications to an individual data item, as well as the modifications to sets of data items such as those found in the SQL UPDATE statement with all of its associated SQL features. The data set editor's rewrite abilities also include the functionality for extending content in lieu of rewriting it. What this means is that rather than replacing a data item with another data item, the replacement value may be written to another data element. This feature is necessary to support such requirements as where a data set and its associated control environment concurrently support more than one level of security. For example, a sensitive data item may remain in the multi-level security data set while its obfuscated value is written to another data element of the same or a different data set that is to be accessed by a lower-level security process.

In conjunction with the data systems involved, the data set editor includes the necessary primitive functionality for assuring transactional integrity. In one embodiment of the present invention, and to the extent possible, the data set editor 9 will augment the limited integrity features of a data system with additional features to assure satisfaction of at least the minimal transactional integrity requirements for atomicity, consistency, isolation, and durability (otherwise known as ACID). These transactional integrity features are derived from three abilities of the present invention: (i) the evaluation by the rule evaluator 1 of active rules (likely transducer-type rules); (ii) the built-in ACID support of the data set editor 9; and (iii) the extensive use by the present invention of the built-in support of the connector technology (such as JDBC) that continues to evolve its robustness in industry. In combination, particularly as derived by the rule evaluator 1, transactional integrity, including transactional management, is achieved.

8. Interactive Monitor

Figure 4:
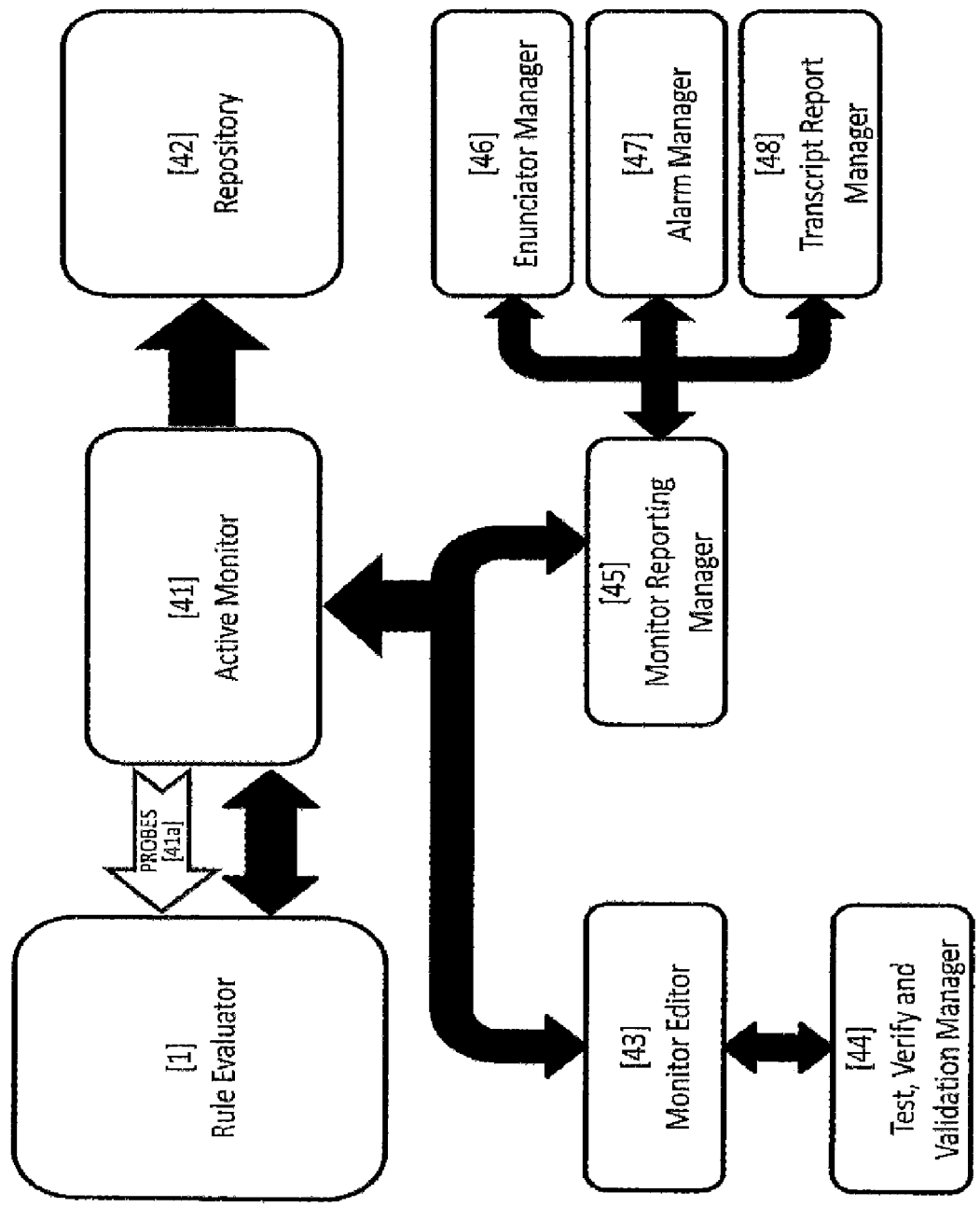
FIG. 4 is a flow chart that shows the major components of the interactive monitor of the present invention.

The interactive monitor 10 is a suite of functionality for actively (as opposed to only passively recording) and interactively (that is, a user can interact with an evaluation in progress) monitoring and recording any evaluation operated by the rule evaluator 1. As depicted in FIG. 4, the interactive monitor is comprised of an active monitor 41 that interacts with the rule evaluator 1, a repository for the active monitor information 42, a monitor editor 43, and a reporting manager 45.

The interactive monitor 10 is more than a passive monitor of the rule evaluations in the present invention. It is active and interactive in that users of the present invention can interact with an ongoing evaluation of any active rule, wherein probes are installed in the rule evaluator 1 to sense aspects of an evaluation. In turn, these probes not only report on the state of the evaluation, but they can also interrupt the rule evaluation to (i) change the content of the variables that represent the current state of the rule evaluation, (ii) force the result to be different than that of the current rule evaluation, (iii) force the rule evaluation of a newly user-created rule or a current active rule, (iv) begin or change the reporting on the succeeding rule evaluations using the features of the monitor reporting manager 45, (v) edit the rule involved in the current rule evaluation as well as any other active or candidate rule and then restart the rule evaluation from the current rule evaluation point through the monitor editor 43 (or another editor that allows the probes to perform this same functionality), and (vi) change what is being monitored and how it is being monitored through the monitor editor 43 (or another editor that allows the probes to perform this same functionality).

As opposed to passive monitoring, active monitoring is aware of what is being monitored such that as an event occurs, the behavior of the monitoring may optionally change and optionally even involve human intervention as appropriate. The modified behavior may be to monitor more detailed or lower-level activities, including the possibility of redirecting the originating activity to do something else or terminate.

In a preferred embodiment, the scope of active monitoring includes at least the following: (i) monitoring of user-specified events; (ii) monitoring the generation of results such that results that are incongruent with one or more active rules are detected; and (iii) monitoring changes to the metadata about the enterprise. User-specified events include, for example, events raised by sensing a change to each resource used in the rule evaluation, events raised by sensing each active rule as it is used (this is an activity trace), events raised by sensing how long the rule evaluation has been running at each rule evaluation point, events raised by sensing whether the rule evaluation has reached a specified threshold or epoch, and events raised by sensing errors and warnings issued by the rule evaluation.

The monitor editor 43 and repository 42 are a suite of functionality for specifying, persisting, searching, editing, destroying, examining, documenting and testing of the active monitor probes. The active monitor probes are created by the monitor editor 43 for each event or activity to be actively monitored. Information associated with the functionality of the monitor editor 43 and repository 42 is presented to a user through both textual and graphic mutable representations. Printing services are provided through the present invention's rule evaluator 1 by applying printing rules as part of an active monitor rule. Further, through the rule editor, the query processing may be controlled over both explicit and implicit information, as explained above in Section B.1.a.

The test, verify and validation manager 44 can test the operation of the interactive monitor. The testing performed by the interactive monitor is an extension of the present invention's rule evaluator 1. Additional mutable and non-mutable primitive rules are provided to simplify the testing, verification and validation of the probes created through the monitor editor 43.

The present invention provides the service for "what-if" trials of the interactive monitor 10 without changing the physical data of the enterprises data systems. In that the data item of a data element may be considered logically as a regressive rule, the active monitor 41 in conjunction with the rule evaluator 1 can either (i) override the rules that are involved with accessing a data set by adding new rules that represent the content of a data set or (ii) set a state of the data set editor 9 through a primitive rule that blocks changes to a designated data set. During the testing of an active rule, the evaluation may be paused, terminated or redirected by forcing changes to the state of the evaluation.

Further, in conjunction with the rule evaluator 1, the services of an active monitor probe 41a includes at least the following functions: (i) verification reporting through the query and review of the active monitoring rules; and (ii) validation reporting through the simulation of selected events and activities to validate their expected behavior.

The monitor reporting manager 45 formats the presentation of specified properties of the events and activities that have been specified to be monitored using the monitor editor 43. This formatting can be for presentation to other processes in the same or different hosting environments or for presentation to a human user. The presentation forms are enunciation, alarms and transcript reports.

The enunciator manager 46 senses high-interest events that are designated for enunciation by the user. These events might include, for example, the fact that something has been activated, the fact that obfuscation results are incongruent with intentions, or the existence of changes to metadata in a data system that is in use by rules for obfuscation. A high-interest event is identified through the rule specifications in the various repositories of the present invention. An example of such a rule might be, "Every failed obfuscation activity is an enunciation event." Typically, an enunciated event or activity will cause the display of one or more presentations or messages to notify one or more operators of the present invention (see, for example, FIG. 5).

The alarm manager 47 senses events and activities that are designated to be alarmed. Alarms provide extended features for the enunciation of events and activities. Specifically, alarms prove additional means for gaining the immediate attention of those users who are interested in any enunciated event or activities. In one embodiment of the present invention, key personnel receive notifications through their mobile phones or pagers.

Typically, an enunciated event or activity will cause the display of one or more presentations or messages to notify one or more users of the present invention. These displays are completely configurable using the rules of the present invention. In a preferred embodiment, one of the many embedded screen designers (such as Web Services or Java Bean screen designers) is integrated into the present invention to assist users in visualizing and configuring the screen as specified by the rules of the present invention.

Figure 5:
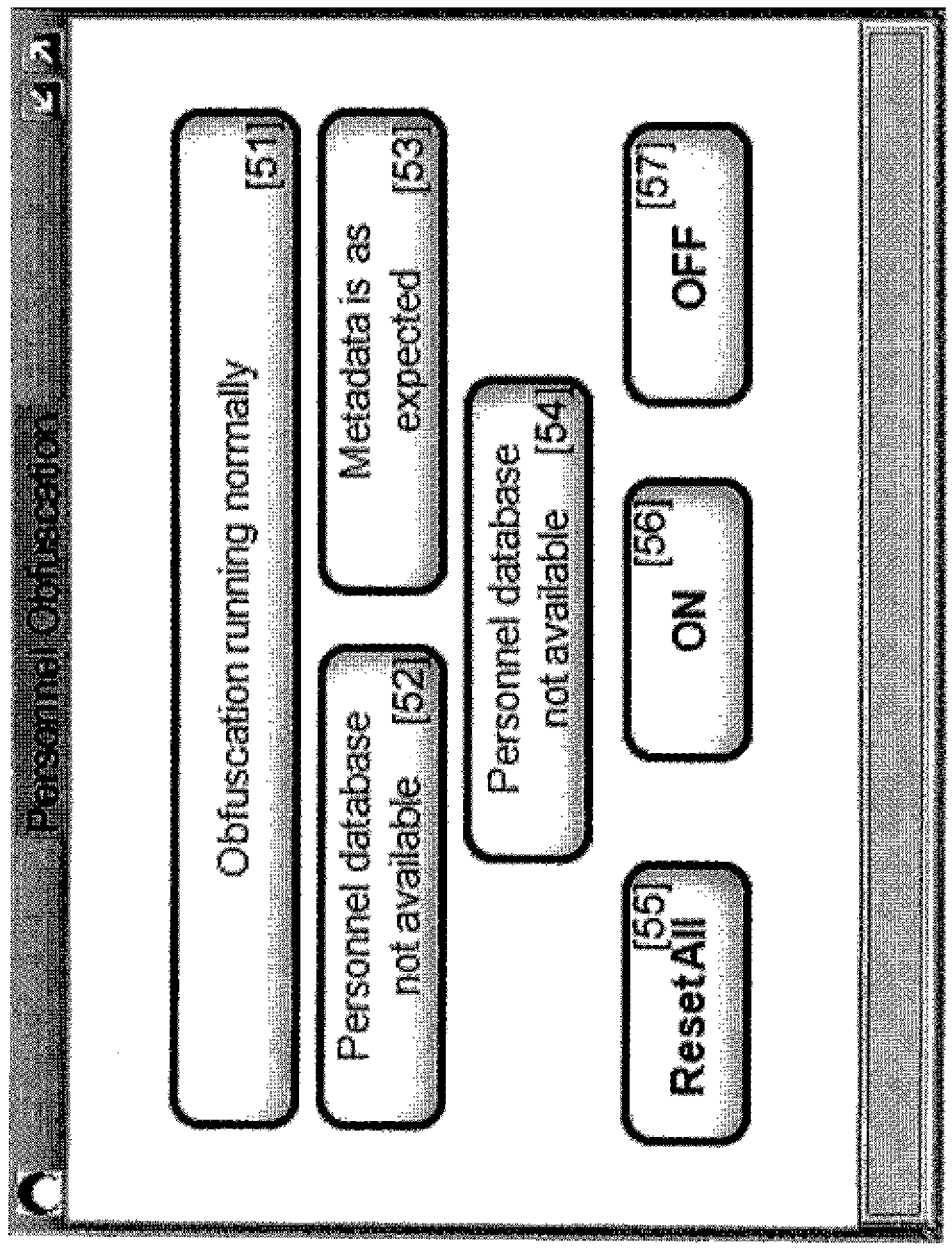
FIG. 5 is an example depiction of a screen for enunciating events with buttons to launch actions in response to certain events.

Of the many possible displays and combinations of display widgets, FIG. 5 depicts one simplistic example of a user-specified screen to enunciate certain events. The example scenario is of a geographically distributed, multi-data system, and a collection of data sets containing personnel data that is being obfuscated. Buttons can be used to indicate a status and optionally to launch an action based on that status. This screen uses seven buttons, four of which report on the running activity with the three remaining buttons managing the display. The first button 51 remains illuminated while the obfuscation activity is running. The second button 52 reports that the personnel database is not available, and by clicking that button, the obfuscation activity could be signaled to suspend the current activity and wait until the personnel database is available. The third button 53 reports that the metadata remains as expected while the obfuscation activity is running (an administrator at a remote site may be making changes that may affect parts of a data set being obfuscated). The fourth button 54 reports that one of the remote data sets at a contractor site is taking longer than expected, and by clicking on the button, an action is taken to abort processing this data set and not include it in the final output configuration. The remaining buttons for display are to clear the display indications 55 or turn the enunciator on 56 or off 57, each initiating an appropriate action upon the button being clicked.

Referring back to FIG. 4, the transcript report generator 48 senses events and activities that are designated to be reported and creates a transcript report of activities performed by the evaluation of an active rule, such as evaluating a rule to do obfuscation. In a preferred embodiment, customizable standard reports are pre-defined and pre-loaded into the present invention's repositories to meet stereotypic needs of an enterprise as well as frequently applicable regulatory requirements. Further, additional reports may be specified by editing the repositories, including the removal of previously defined reports. Modifying, adding or removing a report may entail editing one or more repositories, depending of the logic of the support to that report.

9. Multi-Platform Runtime Environment

In that the present invention is an enterprise tool, it must have the ability to be executed in at least the most common enterprise computer environments. Thus, the multi-platform runtime environment 11 for all of the components identified above is scalable and has the ability to be executed on at least the most common hardware and operating system platforms. In addition, the runtime environment must have the ability for multiple instances to operate concurrently, including any and all of these instances having their own multiple execution threads operating concurrently. This is particularly true in large enterprises where many obfuscation activities may be running concurrently and where many different hardware and operating system platforms are likely involved.

The present invention interfaces to multiple disparate data systems, all of which need to handled concurrently. Although not necessary, a standard data system interface framework is highly desirable to achieve simplicity, maximize scalability, and reduce system maintenance costs. In one embodiment of the present invention, the components are developed using the Java programming language and JDBC-compliant drivers for connection to the enterprise data sources. Having a JDBC-based bridge driver to Open Database Connectivity (ODBC)-compliant drivers is necessary for many data systems that may be part of an enterprise.

In a computing environment, data may be either online or offline. In the case of offline data, such data will need to be returned to the online environment for processing and then, if desired, returned to the offline environment. Moreover, it is possible that a data collection and its digital hosting environment within an enterprise may be not accessible through a network connection. In such offline scenarios, the present invention is deployed in multiple instances for each of the disconnected hosting environments. The present invention has "input" and "output" channels, as well as the necessary functionality for transferring data (such as configuration data, shared data, data updates, etc.). In one embodiment of the present invention, removal media is used to transfer data from one system to the next.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

REFERENCES

The following references are incorporated herein by reference:
1. Ponemon Institute, LLC. "2006 Annual Study: Cost of a Data Breach, Understanding Financial Impact, Customer Turnover, and Preventative Solutions." PGP Corporation and Vontu, Inc., 2006. http://www.computerworld.com/pdfs/PGP_Annual_Study_PDF.pdf.
2. Johnson, Mark. "Grammars, Graphs and Automata." Brown University, ALTA Summer School, December 2003. http://www.cog.brown.edu/~mj.
3. Russell, Stuart and Peter Norvig. "Artificial Intelligence: A Modern Approach," $2^{nd}$ ed. Upper Saddle River, N.J.: Pearson Education, Inc., 2003. 218-220, 235, 280-87.
4. Aho, A. V. and J. D. Ullman. "The Theory of Parsing, Translation, and Compiling," Vol. I: Parsing. Englewood-Cliffs, N.J.: Prentice Hall, 1972.
5. Aho, A. V. and J. D. Ullman. "Principles of Compiler Design." Menlo Park, Calif.: Addison Wesley, 1978.
6. Hopcroft, John E. and Jeffrey D. Ullman. "Introduction to Automata Theory, Languages, and Computation." Reading, Mass.: Addison-Wesley Publishing Company, 1979.
7. Yeh, Raymond T. "Applied Computation Theory: Analysis, Design, Modeling." Englewood Cliffs, N.J.: Prentice Hall, 1976. 43-52.
8. Mealy, G. H. "A Method for Synthesizing Sequential Circuits." Bell System Tech. Journal, Vol. 34, September 1955. 1045-79.
9. Kain, Richard Y. "Automata Theory: Machines and Languages." Computer Science Series. Malabar, Fla.: Robert E. Krieger Publishing Company, Inc., 1972 reprint 1981. 183-210.
10. Lam-Son Lê, Alain Wegmann. "An RM-ODP Based Ontology and a CAD Tool for Modeling Hierarchical Systems in Enterprise Architecture Workshop on ODP for Enterprise Computing, in Conjunction with 9th EDOC." Enschede, The Netherlands, 2005. 7-15. http://www.lcc.uma.es/~av/wodpec2005/wodpec2005-Proceedings.pdf.
11. Gamma, Erich, Richard Helm, Ralph Johnson and John Vlissides. "Design Patterns: Elements of Reusable Object-Oriented Software." Boston, Mass.: Addison Wesley, 1994. 74-75, 3321-334.
12. McHugh, James A. "Algorithmic Graph Theory." Englewood Cliffs, N.J.: Prentice Hall, 1990.
13. Feder, J. "Plex Languages." Information Sciences, Vol. 3. American Elsevier Publishing Company, Inc., New York, 1971. 225-41.
14. Keukelarr, J. H. D. "Topics in Soft Computing." Doctoral Dissertation, Royal Institute of Technology. Stockholm, Sweden: Universitetsservice US AB, 2002. 46-79. http://www.nada.kth.se/utbildning/forsk.utb/avhandlingar/dokt/keukelaar.pdf.
15. Swierstra, Wouter. "Why Attribute Grammars Matter." The Monad Reader, Issue 4. 2005. http://www.haskell.org/tmrwiki/WhyAttributeGrammarsMatter.
16. Lam-Son Lê, Alain Wegmann. "Definition of an Object-Oriented Modeling Language for Enterprise Architecture Proceedings of 38th Hawaii International Conference on System Sciences." Track 8. Waikoloa, Hi.: IEEE Computer Society, January 2005. 222a. http://csdl2.computer.org/comp/proceedings/hicss/2005/2268/08/22680222a.pdf.
17. Wegmann, A. and A. Naumenko. "Conceptual Modeling of Complex Systems Using an RM-ODP Based Ontology." Proceedings of the $5^{th}$ International EDOC. Seattle, Wash.: IEEE, 2001. 200-211.

We claim:
1. A system for obfuscating data across an enterprise, comprising:
   (a) a rule evaluator;
   (b) an active rule editor;
   (c) an active rule editor repository;
   (d) a candidate rule editor; and
   (e) a candidate rule editor repository;
   wherein the enterprise has one or more data systems comprising data;
   wherein the rule evaluator evaluates active rules and optimizes its behavior based on both user-specified guidance and properties learned during system execution;
   wherein the active rule editor provides functionality for specifying, examining, maintaining, simulating and testing active rule behavior and for documenting rules that are bound to any named and typed data spaces of the enterprise that are accessible through connectors to the data systems of the enterprise;
   wherein the active rule editor and repository provide functionality for promoting a candidate rule to an active rule and managing the rule in its active state;
   wherein the candidate rule editor provides functionality for specifying, examining, maintaining, simulating and testing active rule behavior and for documenting rules that are bound to any named and typed data spaces of the enterprise that are accessible through connectors to the data systems of the enterprise;
   wherein the candidate rule editor and repository provide functionality for developing rules that are candidates for subsequent use as active rules;
   wherein the system uses the rule evaluator to control elimination and retention of patterns of characters in the data, replaces values with other values in the data, and replaces data items with constant values;
   wherein the system dynamically creates a plan for solving a problem and then updates the plan as it discovers rules that present solutions to pending rules or finds more rules to evaluate;
   wherein when a rule evaluation is executed, it either succeeds or fails, wherein an ancestor rule evaluation is a rule evaluation that must succeed prior to a previous ancestor rule evaluation being executed, and wherein the system automatically discovers subsequent rule evaluations to be executed, executes the subsequent rule evaluations in parallel, and conditionally executes any rule evaluation based not only on the success of ancestor rule evaluations but also on the success of any rule known to the system;
   wherein each active rule comprises one or more variables, and each active rule has a behavior that expresses quantification of the variables in that rule as logic quantifiers;
   wherein the system uses intensional rules that describe intended aspects of solutions or goals involved in other rules to obfuscate a data item;
   wherein the system uses transducer-type rules, each having a specification, to support probabilistic selection of alternative changes of state of the transducer-type rule itself and to learn which alternative state changes are more successful than others, and wherein the system updates the specification of the transducer-type rule involved as probabilistic information is learned;
   wherein a transducer-type rule is able to dynamically create, modify and/or destroy one or more other transducer-type rules, and invocation of any new or modified trans- ducer-type rule is enabled immediately or based on subsequent use of the new or modified transducer-type rule; and wherein the rule evaluator includes functionality for testing both candidate and active rules through tracing and simulating execution behavior of a rule, and wherein the simulation functionality includes the ability to block data changes to the data systems of the enterprise.

2. The system of claim 1, further comprising a candidate rule editor and repository;

wherein the candidate rule editor provides functionality for specifying, examining, maintaining, simulating and testing active rule behavior and for documenting rules that are bound to any named and typed data spaces of the enterprise that are accessible through connectors to the data systems of the enterprise; and wherein the candidate rule editor and repository provide functionality for developing rules that are candidates for subsequent use as active rules.

3. The system of claim 1, further comprising a metadata editor and repository, wherein the metadata editor and repository provide functionality for extending metadata about the data systems of the enterprise in order to enable bindings to rules that will be used to obfuscate the data and for saving the extensions.

4. The system of claim 3, further comprising a data systems metadata interface;

wherein the enterprise has data content; and wherein the data systems metadata interface provides functionality for capturing existing rules about metadata in the data content of the enterprise and/or in one or more repositories of the present invention.

5. The system of claim 4, wherein the metadata is persisted in multiple forms across disparate data systems.

6. The system of claim 1, further comprising an external models interface, wherein the external model interface translates elements of common industry enterprise models into rule and metadata specifications.

7. The system of claim 1, further comprising a data systems explorer, wherein the enterprise comprises one or more data systems, and wherein the data systems explorer examines known metadata about the data systems of the enterprise and discovers additional metadata that was previously unknown or in conflict with specifications already existing in the repositories.

8. The system of claim 1, further comprising a data set editor;

wherein the enterprise has data content;

wherein the data content comprises data elements and data items; and wherein the data set editor has an ability to manually or automatically selectively rewrite portions of the data content of the enterprise and/or to extend or remove the data content.

9. The system of claim 1, further comprising an interactive monitor;

wherein the interactive monitor actively and interactively monitors and records obfuscation-related processing executed by the present invention.

10. A system for obfuscating data across an enterprise, comprising:

(a) a candidate rule editor;
(b) a candidate rule repository;
(c) a candidate rule repository manager;
(d) an active rule editor;
(e) an active rule repository;
(f) an active rule repository manager;
(g) a rule evaluator;
(h) a data systems metadata interface;
(i) a metadata editor;
(j) a metadata repository;
(k) a metadata repository manager;
(l) a data set editor;
(m) a data systems explorer;
(n) an interactive monitor;
(o) an external models interface; and
(p) a multi-platform runtime environment;

wherein the candidate rule editor manipulates, edits and tests rules that have been identified by a user as candidate rules for conducting the obfuscation;

wherein the active rule editor creates an active rule and/or promotes a candidate rule to an active rule based on criteria applied by the user;

wherein the rule evaluator evaluates the active rules;

wherein the data systems metadata interface captures metadata residing in and associated with data systems within the enterprise and the repositories of the present invention;

wherein the metadata editor edits the metadata captured by the metadata capture agent and stored in the metadata repository;

wherein the data set editor edits data sets and data systems within the enterprise;

wherein the data systems explorer explores the enterprise to discover digital content stored in data systems within the enterprise;

wherein the interactive monitor actively and interactively monitors, reports, enunciates, and alerts, and has an ability to detect obfuscation activities that are not in compliance with active rules and change the obfuscation activities;

wherein the external models interface provides access to systems external to the present invention;

wherein the candidate rule editor provides functionality for specifying, examining, maintaining, simulating and testing active rule behavior and for documenting rules that are bound to any named and typed data spaces of the enterprise that are accessible through connectors to the data systems of the enterprise;

wherein the candidate rule editor and repository provide functionality for developing rules that are candidates for subsequent use as active rules;

wherein the data systems contain data, and the system uses the rule evaluator to control elimination and retention of patterns of characters in the data, replaces values with other values in the data, and replaces data items with constant values;

wherein the system dynamically creates a plan for solving a problem and then updates the plan as it discovers rules that present solutions to pending rules or finds more rules to evaluate;

wherein when a rule evaluation is executed, it either succeeds or fails, wherein an ancestor rule evaluation is a rule evaluation that must succeed prior to a previous ancestor rule evaluation being executed, and wherein the system automatically discovers subsequent rule evaluations to be executed, executes the subsequent rule evaluations in parallel, and conditionally executes any rule evaluation based not only on the success of ancestor rule evaluations but also on the success of any rule known to the system;

wherein each active rule comprises one or more variables, and each active rule has a behavior that expresses quantification of the variables in that rule as logic quantifiers;

wherein the system uses intensional rules that describe intended aspects of solutions or goals involved in other rules to obfuscate a data item;

wherein the system uses transducer-type rules, each having a specification, to support probabilistic selection of alternative changes of state of the transducer-type rule itself and to learn which alternative state changes are more successful than others, and wherein the system updates the specification of the transducer-type rule involved as probabilistic information is learned;

wherein a transducer-type rule is able to dynamically create, modify and/or destroy one or more other transducer-type rules, and invocation of any new or modified transducer-type rule is enabled immediately or based on subsequent use of the new or modified transducer-type rule; and wherein the rule evaluator includes functionality for testing both candidate and active rules through tracing and simulating execution behavior of a rule, and wherein the simulation functionality includes the ability to block data changes to the data systems of the enterprise.

11. The system of claim 9 or 10, wherein the interactive monitor comprises an active monitor and repository.

12. The system of claim 11, wherein any evaluation of a rule comprises at least one state, wherein probes installed in the rule evaluator sense aspects of a rule evaluation and report on the state of the evaluation.

13. The system of claim 12, wherein an evaluation of a rule produces a result, wherein the probes have an ability to interrupt the rule evaluation to change the content of variables that represent the current state of the rule evaluation, force the result to be different than that of the current rule evaluation, force the evaluation of a newly user-created rule or a current active rule, begin or change reporting on succeeding rule evaluations, edit the rule involved in the current rule evaluation or any other active or candidate rule and then restart the rule evaluation from the current rule evaluation state, and change what is being monitored and how it is being monitored.

14. The system of claim 13, wherein the ability of the probes to begin or change reporting on succeeding rule evaluations is accomplished through the use of a monitor reporting manager.

15. The system of claim 13, wherein the ability of the probes to edit the rule involved in the current rule evaluation or any other active or candidate rule and then restart the rule evaluation from the current rule evaluation state is accomplished through the use of an editor.

16. The system of claim 13, wherein the ability of the probes to change what is being monitored and how it is being monitored is accomplished through the use of an editor.

17. The system of claim 1 or 10, wherein the enterprise comprises classes of external components, and wherein rules operating as agents simulate common events and activities for each class of external components.

18. The system of claim 1 or 10, wherein the rule evaluator senses whether a rule has changed over time, forces re-evaluation of the rule if it has changed, and raises an event to notify a user of the change.

19. The system of claim 1 or 10, wherein the rule evaluator comprises optimized primitive features for data-driven and goal-seeking logic, intelligent scheduling, quantification of variables, intensional rules, transducer-type rules, and testing rule behavior.

20. The system of claim 1 or 10, wherein the rule evaluator provides functionality for auto-generation of filler data and auto-generation and distribution of obfuscated data sets to specified organizational elements that are part of or external to the enterprise.

21. The system of claim 1 or 10, wherein the system uses data-driven and goal-seeking rules to reason about a means for achieving a goal, wherein the data-driven rules are supported by an extended form of forward chaining logic, wherein the goal-seeking rules are supported by an extended form of backward chaining logic, and wherein the extended forms of logic are provided by the rule evaluator.

22. The system of claim 21, wherein the data-driven and goal-seeking rules discover and assist in defining implications in sensitive data that might otherwise not be realized in an obfuscation activity.

23. The system of claim 1 or 10, wherein the system comprises one or more repositories and a code base, wherein each repository comprises content, and wherein information about the enterprise is not built into the code base but modeled in the content of one or more of the repositories.

24. The system of claim 1 or 10, wherein each active rule has one or more variables, wherein each active rule has a behavior, and wherein the behavior of an active rule expresses quantification of the variable(s) in the active rule.

25. The system of claim 1 or 10, wherein active rules are used to obfuscate the data, wherein each rule has a behavior, and wherein the system uses intensional rules in obfuscating data items, verifying the logic of the active rules used to conduct the obfuscation, and/or validating the behavior of rules during obfuscation.

26. The system of claim 1 or 10, wherein a transducer-type rule is a means for expressing temporal rule evaluations, and wherein the system uses transducer-type rules to support probabilistic selection of alternative changes of state and to learn which alternative state changes are more successful than others.

27. The system of claim 26, wherein each transducer-type rule has a specification, and wherein as probabilistic information is learned, the system updates the specification of the transducer-type rule.

28. The system of claim 26, wherein a transducer-type rule processes an input and generates an output;

wherein the input is context-sensitive string and graph language input;

wherein the output is context-sensitive string and graph language output;

wherein the transducer-type rule comprises control logic and a memory;

wherein the control logic cycles the transducer-type rule through states and transitions;

wherein each state is context-sensitive;

wherein the memory comprises a symbol stack, a context stack, and a general purpose memory;

wherein the symbol stack holds information about handling the input;

wherein the context stack holds information about the context-sensitive state of the processing; and wherein the general purpose memory is used for various primitive functions.

29. The system of claim 28, wherein the transducer-type rule has an ability to call upon one or more other rules, effectuate a recursive call to itself, and/or form a new rule and launch the evaluation of that rule.

30. The system of claim 28, wherein the transducer-type rule a specifications of how to translate one language into another, and wherein the transducer-type rule has specialized and optimized primitives that simplify the specification.

31. The system of claim 28, wherein the transducer-type rule is an extended Mealy machine.

32. The system of claim 31, where the transducer-type rule undergoes transitions from one state to another, wherein there is a relation that defines each transition from one state to another state, and wherein the transducer-type rule visually represents its allowable behaviors by depicting its set of states and the relation that defines each transition from one state to another state.

33. The system of claim 32, wherein the visual representation is a labeled directed graph.

34. The system of claim 33, wherein the labeled directed graph comprises a set of vertices and a set of edges, and wherein the set of vertices represents the states and the set of edges represents the transitions.

35. The system of claim 34, wherein the graph comprises edges, wherein each edge is a labeled edge from one vertex to the same or another vertex, and wherein each edge has an edge input label and an edge output label.

36. The system of claim 35, wherein a specific execution of a transducer-type rule describes a path by indicating in order all of the labeled edges used from an initial state to a final state.

37. The system of claim 35, wherein the transducer-type rule is reused in the expression of both an edge input label and an edge output label, wherein there may be more than one reference to the same transducer-type rule, and wherein each reference to the same transducer-type rule is a different instance of that transducer-type rule.

38. The system of claim 35, wherein the transducer-type rule hosts a transition, wherein a reference to another transducer-type rule or a recursive reference to the transducer-type rule that is hosting the transition is substituted for any edge output label or edge input label.

39. The system of claim 26, wherein the system supports intrinsic multi-threading of a transducer-type rule such that more than one execution may be concurrently in progress with one or more other executions in the same transducer-type rule.

40. The system of claim 1 or 10, wherein the rule evaluator enables multiple process threads to use the same active rule simultaneously.

41. The system of claim 40, wherein each rule has static and mutable aspects, and wherein the static aspects of a rule are shared among the threads and the mutable aspects of a rule are replicated into a separate instance for each thread.

42. The system of claim 26, wherein the transducer-type rule has an output, wherein the transducer-type rule executes an operation when the rule evaluator causes the rule to be evaluated, and wherein the transducer-type rule is successful in its execution if its output is not empty.

43. The system of claim 1 or 10, wherein the system comprises one or more repositories, wherein the system uses transducer-type rules to support probabilistic selection of alternative changes of state and to learn which alternative state changes are more successful than others, wherein the transducer-type rule has an ability to make new assertions to the repositories, and wherein an assertion has an ability to cause one or more other assertions to be added or an existing assertion to be modified or removed.

44. The system of claim 1 or 10, wherein the system comprises one or more repositories, wherein the system uses transducer-type rules to support probabilistic selection of alternative changes of state and to learn which alternative state changes are more successful than others, and wherein the transducer-type rule has an ability to query the repositories using data-driven and goal-seeking logic features.

45. The system of claim 1 or 10, wherein the system uses transducer-type rules to support probabilistic selection of alternative changes of state and to learn which alternative state changes are more successful than others, wherein each transducer-type rule has a specification, and wherein each transducer-type rule has a retrospection ability that allows the transducer-type rule to examine its own specification and/or the specification of another transducer-type rule, what that rule is doing, what it has done, and what it will do next.

46. The system of claim 1 or 10, wherein the system uses transducer-type rules to support probabilistic selection of alternative changes of state and to learn which alternative state changes are more successful than others, wherein each state comprises one or more edges, and wherein the transducer-type rule has an ability to suspend or terminate a transition operation of one or more edges of the same state.

47. The system of claim 1 or 10, wherein the system uses transducer-type rules to support probabilistic selection of alternative changes of state and to learn which alternative state changes are more successful than others, and wherein the transducer-type rule has an ability to dynamically create, modify or destroy one or more transducer-type rules.

48. The system of claim 1 or 10, wherein the rule evaluator is a logic programming system that uses a transducer-type rule as a means for knowledge representation.

49. The system of claim 1 or 10, wherein candidate rules and active rules have execution behaviors, and wherein the rule evaluator comprises functionality for testing candidate and active rules through tracing and simulating the execution behavior of a rule.

50. The system of claim 49, wherein the simulation is presented graphically to a user as a network of nodes and links depicting steps, their execution status and errors, and including multiple paths to depict multi-threaded operations.

51. The system of claim 1 or 10, wherein the rule evaluator includes functionality for the automated generated of filler data;
   wherein the filler data is added to one or more data sets;
   wherein each data set has metadata;
   wherein the metadata has constraints;
   wherein the rule evaluator evaluates a rule that has a specification; and
   wherein the new filler data abides by the constraints of the metadata for each data set as specified by one or more repositories that participate in the specification.

52. The system of claim 51, wherein the generation of filler data is accomplished by deriving the filler data from actual data.

53. The system of claim 51, wherein the filler data is comprised of one or more data types, wherein there is a technique for generating each data type, and wherein the generation of filler data is accomplished by generating artificial data based on rules that specify the technique for generating each data type.

54. The system of claim 1 or 10, wherein the system comprises one or more repositories, wherein there are rules and properties for obfuscation, and wherein the system automatically creates obfuscated data sets by evaluating the rules and properties for obfuscation in the various repositories.

55. The system of claim 1 or 10, wherein the system uses transducer-type rules to support probabilistic selection of alternative changes of state and to learn which alternative state changes are more successful than others;
   wherein the enterprise has one or more external obfuscation applications;
   wherein each external obfuscation application conducts obfuscation activities and generates results; and wherein the transducer-type rule has an ability to remotely configure, execute and examiner the results of one or more obfuscation activities of the external applications.

56. The system of claim 26, wherein the enterprise has one or more external obfuscation applications, wherein each external obfuscation application conducts obfuscation activities and generates results, and wherein the transducer-type rule has an ability to remotely configure, execute and examine the results of one or more obfuscation activities of the external applications.

57. The system of claim 1 or 10, wherein the system comprises one or more repositories, wherein each repository holds data content, and wherein each repository comprises a repository manager.

58. The system of claim 57, wherein the repository manager provides functionality for computationally searching and editing the repository content, performing general purpose algorithmic services, and performing management services for persisting and virtualizing the content of the repository in an execution environment.

59. The system of claim 1 or 10, wherein the system comprises one or more repositories, and wherein context-sensitive string and graph language statements are translated into statement in the graph language that are persisted in the repositories.

60. The system of claim 59, wherein the graph language statements are interpreted by a graph automaton in each repository.

61. The system of claim 1 or 10, wherein there are obfuscation rules for the enterprise;
    wherein the data to be obfuscated exists in one or more data sets;
    wherein each data set has metadata;
    and wherein the obfuscation rules include specifications for what data elements are to be obfuscated, what obfuscation technique is to be applied to a data element, how each obfuscation technique is to operate, how to get the metadata about a data set, binding a data element to a data resource, decomposition of a data element into subfields, how and where to substitute a new value for a data item or items, relationships among and between the data sets of the enterprise, how an obfuscation activity is to operate, how and what to monitor in an obfuscation activity, and how and what to report in an obfuscation activity.

62. The system of claim 61, wherein the system comprises one or more repositories, and wherein the obfuscation rules are predefined and preloaded in the repositories.

63. The system of claim 1 or 10, wherein the system applies one or more of the following functions to one or more single or combined data elements to create obfuscation rules that specify a desired obfuscation activity and/or how the obfuscation activity is to be temporally ordered: pre-masking, derivation, value domain constraints, substitution, and post-masking.

64. The system of claim 1 or 10, wherein the data to be obfuscated comprises data elements, wherein each data element has a data type, and wherein the system recognizes the data type of each data element and does not require the data types of all of the data elements to be the same.

65. The system of claim 64, wherein data constraints are associated with each data element, and wherein the data constraints associated with a data element controls what data values are allowable for that data element.

66. The system of claim 1 or 10, wherein complex data types are decomposed into collections of standard data types using rules, and wherein each rule specifies a particular decomposition of a complex data type.

67. The system of claim 64, wherein a data type has a specification, wherein there are constraints associated with a data element, wherein the rule editor has an ability to extend the constraints associated with a data element to include constraints other than the specification of a data type, wherein a data element comprises data values, and wherein this ability applies whether the data values are concrete or symbolic.

68. The system of claim 1 or 10, wherein the rule editor comprises functionality for extending information about a rule to include a provision for documenting the rule from different perspectives.

69. The system of claim 68, wherein the rule has a test and acceptance status, wherein the rule has a development process and progress, and wherein the documentation of the rule includes describing the rule, reporting the test and acceptance status of the rule, and documenting the development process and progress of the rule.

70. The system of claim 1, further comprising a data systems metadata interface, wherein the data systems metadata interface dynamically extends metadata of a data system so that bindings may be created by the rule evaluator between the metadata of a data system and associated rules.

71. The system of claim 70, wherein information that specifies the active rule to be applied to a particular data element is included in the metadata extensions.

72. The system of claim 10, wherein the data systems metadata interface dynamically extends metadata of a data system so that bindings may be created by the rule evaluator between the metadata of a data system and associated rules.

73. The system of claim 72, wherein information that specifies the active rule to be applied to a particular data element is included in the metadata extensions.

74. The system of claim 1, further comprising a metadata editor and repository, wherein the enterprise comprises one or more data systems, wherein the data systems comprise data resources, wherein there is metadata about the data resources, and wherein the metadata editor extends the metadata about the data resources in the data systems of the enterprise.

75. The system of claim 74, wherein the extensions of the metadata include information about what data elements are to be obfuscated and how each data element is to be obfuscated.

76. The system of claim 74, wherein the extended metadata is in the form of rules that are directly interpreted by the rule evaluator.

77. The system of claim 74, further comprising a data systems metadata interface and a data systems explorer, wherein the metadata editor receives metadata from the data systems metadata interface as directed by the data systems explorer.

78. The system of claim 10, wherein the enterprise comprises one or more data systems, wherein the data systems comprise data resources, wherein there is metadata about the data resources, and wherein the metadata editor extends the metadata about the data resources in the data systems of the enterprise.

79. The system of claim 78, wherein the extensions of the metadata include information about what data elements are to be obfuscated and how each data element is to be obfuscated.

80. The system of claim 78, wherein the extended metadata is in the form of rules that are directly interpreted by the rule evaluator.

81. The system of claim 78, wherein the metadata editor receives metadata from the data systems metadata interface as directed by the data systems explorer.

82. The system of claim 1, further comprising an external models interface, wherein there are one or more external models, wherein each external model has specifications, and wherein the external models interface assimilates relevant metadata information from pre-existing external model specifications.

83. The system of claim 82, wherein each external model has a language, wherein the language has a grammar, and wherein the external models interface is a mutable transducer-type rule that parses the language of the external model by applying the grammar for that language.

84. The system of claim 83, wherein the transducer-type rule of the external models interface is a series of transformal grammars that are applied so as to produce an efficient and useful result of the parse action.

85. The system of claim 84, further comprising a candidate rule editor repository and a data systems explorer, wherein the result of the parse action is transduced into a graph structure that is readily assimilated into the candidate rule editor repository and by the data systems explorer.

86. The system of claim 1, further comprising an external models interface that generates candidate rules.

87. The system of claim 10, wherein there are one or more external models, wherein each external model has specifications, and wherein the external models interface assimilates relevant metadata information from pre-existing external model specifications.

88. The system of claim 87, wherein each external model has a language, wherein the language has a grammar, and wherein the external models interface is a mutable transducer-type rule that parses the language of the external model by applying the grammar for that language.

89. The system of claim 88, wherein the transducer-type rule of the external models interface is a series of transformal grammars that are applied so as to produce an efficient and useful result of the parse action.

90. The system of claim 89, wherein the result of the parse action is transduced into a graph structure that is readily assimilated into the candidate rule editor repository and by the data systems explorer.

91. The system of claim 10, wherein the external models interface generates candidate rules.

92. The system of claim 1, further comprising a data systems explorer, wherein the enterprise comprises one or more data systems, and wherein the data systems explorer is specialized and optimized to discover, locate and extricate metadata about the data systems and to index the metadata that it finds.

93. The system of claim 92, further comprising a metadata editor and repository, wherein the data systems comprise data sets, and wherein when the data systems explorer discovers a new or changed data set, it directs the metadata editor to update its repository.

94. The system of claim 93, further comprising a data systems metadata interface, wherein the metadata editor and repository create dynamic bindings to a data system's metadata resources through the data systems metadata interface.

95. The system of claim 93, wherein metadata is bound to active rules, and wherein the metadata editor repository knows all of the metadata that is bound to the active rules.

96. The system of claim 93, wherein a data system comprises metadata, and wherein if the rule evaluator detects a change in the metadata of a data system, the rule evaluator notifies the metadata editor to update its repository.

97. The system of claim 10, wherein the enterprise comprises one or more data systems, and wherein the data systems explorer is specialized and optimized to discover, locate and extricate metadata about the data systems and to index the metadata that it finds.

98. The system of claim 97, wherein the data systems comprise data sets, and wherein when the data systems explorer discovers a new or changed data set, it directs the metadata editor to update its repository.

99. The system of claim 98, wherein the metadata editor and repository create dynamic bindings to a data system's metadata resources through the data systems metadata interface.

100. The system of claim 98, wherein metadata is bound to active rules, and wherein the metadata editor repository knows all of the metadata that is bound to the active rules.

101. The system of claim 98, wherein a data system comprises metadata, and wherein if the rule evaluator detects a change in the metadata of a data system, the rule evaluator notifies the metadata editor to update its repository.

102. The system of claim 1, further comprising a data set editor, wherein the data set editor comprises functionality for satisfying transactional integrity requirements for atomicity, consistency, isolation and durability.

103. The system of claim 10, wherein the data set editor comprises functionality for satisfying transactional integrity requirements for atomicity, consistency, isolation and durability.

104. The system of claim 1, further comprising an interactive monitor, wherein results are generated when a rule is evaluated by the rule evaluator, wherein there is metadata about the enterprise, and wherein the interactive monitor monitors user-specified events, the generation of results such that results that are incongruent with one or more active rules are detected, and changes to the metadata about the enterprise.

105. The system of claim 10, wherein results are generated when a rule is evaluated by the rule evaluator, wherein there is metadata about the enterprise, and wherein the interactive monitor monitors user-specified events, the generation of results such that results that are incongruent with one or more active rules are detected, and changes to the metadata about the enterprise.

106. The system of claim 1, further comprising an interactive monitor, wherein the interactive monitor comprises a monitor editor and repository, and wherein the monitor editor creates active monitor probes.

107. The system of claim 10, wherein the interactive monitor comprises a monitor editor and repository, and wherein the monitor editor creates active monitor probes.

108. The system of claim 106 or 107, wherein the active monitor probes provide verification reporting through query and review of active monitoring rules and validation reporting through simulation of selected events and activities to validate their expected behavior.

109. The system of claim 1, further comprising an interactive monitor, wherein the interactive monitor has an operation, wherein the interactive monitor comprises a test, verify and validation manager, and wherein the test, verify and validation manager tests the operation of the interactive monitor.

110. The system of claim 10, wherein the interactive monitor has an operation, wherein the interactive monitor comprises a test, verify and validation manager, and wherein the test, verify and validation manager tests the operation of the interactive monitor.

111. The system of claim 1, further comprising an interactive monitor and a data set editor, wherein a data set comprises content, wherein the interactive monitor comprises an active monitor, and wherein the active monitor and rule evaluator together have an ability to override rules that are involved with accessing a data set by adding new rules that represent the content of a data set and/or set a state of the data set editor through a primitive rule that blocks changes to a designated data set.

112. The system of claim 10, wherein a data set comprises content, wherein the interactive monitor comprises an active monitor, and wherein the active monitor and rule evaluator together have an ability to override rules that are involved with accessing a data set by adding new rules that represent the content of a data set and/or set a state of the data set editor through a primitive rule that blocks changes to a designated data set.

113. The system of claim 1, further comprising an interactive monitor, wherein the interactive monitor comprises a monitor reporting manager and a monitor editor, wherein events and activities are specified to be monitored using the monitor editor, wherein the events and activities have a presentation, and wherein the monitor reporting manager formats the presentation of specified properties of events and activities that have been specified to be monitored.

114. The system of claim 10, wherein the interactive monitor comprises a monitor reporting manager and a monitor editor, wherein events and activities are specified to be monitored using the monitor editor, wherein the events and activities have a presentation, and wherein the monitor reporting manager formats the presentation of specified properties of events and activities that have been specified to be monitored.

115. The system of claim 1, further comprising an interactive monitor, wherein the interactive monitor comprises an enunciator manager, and wherein the enunciator manager senses high-interest events that are designated for enunciation by a user.

116. The system of claim 10, wherein the interactive monitor comprises an enunciator manager, and wherein the enunciator manager senses high-interest events that are designated for enunciation by a user.

117. The system of claim 1, further comprising an interactive monitor, wherein the interactive monitor comprises an alarm manager, and wherein the alarm manager senses events and activities that are designated to be alarmed.

118. The system of claim 10, wherein the interactive monitor comprises an alarm manager, and wherein the alarm manager senses events and activities that are designated to be alarmed.

119. The system of claim 1, further comprising an interactive monitor, wherein the interactive monitor comprises a transcript report generator, wherein active rules are evaluated by the rule evaluator, and wherein the transcript report generator senses events and activities that are designated to be reported and creates a transcript report of activities performed by the evaluation of an active rule.

120. The system of claim 10, wherein the interactive monitor comprises a transcript report generator, wherein active rules are evaluated by the rule evaluator, and wherein the transcript report generator senses events and activities that are designated to be reported and creates a transcript report of activities performed by the evaluation of an active rule.

121. The system of claim 10, wherein the multi-platform runtime environment is scalable, allows multiple instances to operate concurrently, and allows an instance to have its own multiple execution threads operating concurrently.

122. The system of claim 1 or 10, wherein the system interfaces to multiple disparate data systems.

123. The system of claim 1 or 10, wherein the data to be obfuscated may be either online or offline.

124. A method for obfuscating data across an enterprise, comprising:
(a) providing a rule evaluator;
(b) providing an active rule editor; and
(c) providing an active rule editor repository;
wherein the enterprise has one or more data systems;
wherein the rule evaluator evaluates active rules and optimizes its behavior based on both user-specified guidance and properties learned during system execution;
wherein the active rule editor provides functionality for specifying, examining, maintaining, simulating and testing active rule behavior and for documenting rules that are bound to any named and typed data spaces of the enterprise that are accessible through connectors to the data systems of the enterprise;
wherein the active rule editor and repository provide functionality for promoting a candidate rule to an active rule and managing the rule in its active state;
wherein the candidate rule editor provides functionality for specifying, examining, maintaining, simulating and testing active rule behavior and for documenting rules that are bound to any named and typed data spaces of the enterprise that are accessible through connectors to the data systems of the enterprise;
wherein the candidate rule editor and repository provide functionality for developing rules that are candidates for subsequent use as active rules;
wherein the system uses the rule evaluator to control elimination and retention of patterns of characters in the data, replaces values with other values in the data, and replaces data items with constant values;
wherein the system dynamically creates a plan for solving a problem and then updates the plan as it discovers rules that present solutions to pending rules or finds more rules to evaluate;
wherein when a rule evaluation is executed, it either succeeds or fails, wherein an ancestor rule evaluation is a rule evaluation that must succeed prior to a previous ancestor rule evaluation being executed, and wherein the system automatically discovers subsequent rule evaluations to be executed, executes the subsequent rule evaluations in parallel, and conditionally executes any rule evaluation based not only on the success of ancestor rule evaluations but also on the success of any rule known to the system;
wherein each active rule comprises one or more variables, and each active rule has a behavior that expresses quantification of the variables in that rule as logic quantifiers;
wherein the system uses intensional rules that describe intended aspects of solutions or goals involved in other rules to obfuscate a data item;
wherein the system uses transducer-type rules, each having a specification, to support probabilistic selection of alternative changes of state of the transducer-type rule itself and to learn which alternative state changes are more successful than others, and wherein the system updates the specification of the transducer-type rule involved as probabilistic information is learned;
wherein a transducer-type rule is able to dynamically create, modify and/or destroy one or more other transducer-type rules, and invocation of any new or modified transducer-type rule is enabled immediately or based on subsequent use of the new or modified transducer-type rule; and
wherein the rule evaluator includes functionality for testing both candidate and active rules through tracing and simulating execution behavior of a rule, and wherein the simulation functionality includes the ability to block data changes to the data systems of the enterprise.

125. The method of claim 124, further comprising providing a candidate rule editor and repository;
- wherein the candidate rule editor provides functionality for specifying, examining, maintaining, simulating and testing active rule behavior and for documenting rules that are bound to any named and typed data spaces of the enterprise that are accessible through connectors to the data systems of the enterprise; and
- wherein the candidate rule editor and repository provide functionality for developing rules that are candidates for subsequent use as active rules.

126. The method of claim 124, further comprising providing a metadata editor and repository, wherein the metadata editor and repository provide functionality for extending metadata about the data systems of the enterprise in order to enable bindings to rules that will be used to obfuscate the data and for saving the extensions.

127. The method of claim 126, further comprising providing a data systems metadata interface;
- wherein the enterprise has data content; and
- wherein the data systems metadata interface provides functionality for capturing existing rules about metadata in the data content of the enterprise and/or in one or more repositories of the present invention.

128. The method of claim 126, wherein the metadata is persisted in multiple forms across disparate data systems.

129. The method of claim 124, further comprising providing an external models interface, wherein the external models interface translates elements of common industry enterprise models into rule and metadata specifications.

130. The method of claim 124, further comprising providing a data systems explorer, wherein the enterprise comprises one or more data systems, and wherein the data systems explorer examines known metadata about the data systems of the enterprise and discovers additional metadata that was previously unknown or in conflict with specifications already existing in the repositories.

131. The method of claim 124, further comprising providing a data set editor;
- wherein the enterprise has data content;
- wherein the data content comprises data elements and data items; and
- wherein the data set editor has an ability to manually or automatically selectively rewrite portions of the data content of the enterprise and/or to extend or remove the data content.

132. The method of claim 124, further comprising providing an interactive monitor;
- wherein the interactive monitor actively and interactively monitors and records obfuscation-related processing executed by the present invention.

133. A method for obfuscating data across an enterprise, comprising:
- (q) providing a candidate rule editor;
- (r) providing a candidate rule repository;
- (s) providing a candidate rule repository manager;
- (t) providing an active rule editor;
- (u) providing an active rule repository;
- (v) providing an active rule repository manager;
- (w) providing a rule evaluator;
- (x) providing a data systems metadata interface;
- (y) providing a metadata editor;
- (z) providing a metadata repository;
- (aa) providing a metadata repository manager;
- (bb) providing a data set editor;
- (cc) providing a data systems explorer;
- (dd) providing an interactive monitor;
- (ee) providing an external models interface; and
- (ff) providing a multi-platform runtime environment;
- wherein the candidate rule editor manipulates, edits and tests rules that have been identified by a user as candidate rules for conducting the obfuscation;
- wherein the active rule editor creates an active rule and/or promotes a candidate rule to an active rule based on criteria applied by the user;
- wherein the rule evaluator evaluates the active rules;
- wherein the data systems metadata interface captures metadata residing in and associated with data systems within the enterprise and the repositories of the present invention;
- wherein the metadata editor edits the metadata captured by the metadata capture agent and stored in the metadata repository;
- wherein the data set editor edits data sets and data systems within the enterprise;
- wherein the data systems explorer explores the enterprise to discover digital content stored in data systems within the enterprise;
- wherein the interactive monitor actively and interactively monitors, reports, enunciates, and alerts, and has an ability to detect obfuscation activities that are not in compliance with active rules and change the obfuscation activities;
- wherein the external models interface provides access to systems external to the present invention; and
- wherein the candidate rule editor provides functionality for specifying, examining, maintaining, simulating and testing active rule behavior and for documenting rules that are bound to any named and typed data spaces of the enterprise that are accessible through connectors to the data systems of the enterprise;
- wherein the candidate rule editor and repository provide functionality for developing rules that are candidates for subsequent use as active rules;
- wherein the data systems contain data, and the system uses the rule evaluator to control elimination and retention of patterns of characters in the data, replaces values with other values in the data, and replaces data items with constant values;
- wherein the system dynamically creates a plan for solving a problem and then updates the plan as it discovers rules that present solutions to pending rules or finds more rules to evaluate;
- wherein when a rule evaluation is executed, it either succeeds or fails, wherein an ancestor rule evaluation is a rule evaluation that must succeed prior to a previous ancestor rule evaluation being executed, and wherein the system automatically discovers subsequent rule evaluations to be executed, executes the subsequent rule evaluations in parallel, and conditionally executes any rule evaluation based not only on the success of ancestor rule evaluations but also on the success of any rule known to the system;
- wherein each active rule comprises one or more variables, and each active rule has a behavior that expresses quantification of the variables in that rule as logic quantifiers;
- wherein the system uses intensional rules that describe intended aspects of solutions or goals involved in other rules to obfuscate a data item;
- wherein the system uses transducer-type rules, each having a specification, to support probabilistic selection of alternative changes of state of the transducer-type rule itself and to learn which alternative state changes are more successful than others, and wherein the system updates the specification of the transducer-type rule involved as probabilistic information is learned;

wherein a transducer-type rule is able to dynamically create, modify and/or destroy one or more other transducer-type rules, and invocation of any new or modified transducer-type rule is enabled immediately or based on subsequent use of the new or modified transducer-type rule; and wherein the rule evaluator includes functionality for testing both candidate and active rules through tracing and simulating execution behavior of a rule, and wherein the simulation functionality includes the ability to block data changes to the data systems of the enterprise.

134. The method of claim 132 or 133, wherein the interactive monitor comprises an active monitor and repository.

135. The method of claim 134, wherein any evaluation of a rule comprises at least one state, wherein probes installed in the rule evaluator sense aspects of a rule evaluation and report on the state of the evaluation.

136. The method of claim 135, wherein an evaluation of a rule produces a result, wherein the probes have an ability to interrupt the rule evaluation to change the content of variables that represent the current state of the rule evaluation, force the result to be different than that of the current rule evaluation, force the evaluation of a newly user-created rule or a current active rule, begin or change reporting on succeeding rule evaluations, edit the rule involved in the current rule evaluation or any other active or candidate rule and then restart the rule evaluation from the current rule evaluation state, and change what is being monitored and how it is being monitored.

137. The method of claim 136, wherein the ability of the probes to begin or change reporting on succeeding rule evaluations is accomplished through the use of a monitor reporting manager.

138. The method of claim 136, wherein the ability of the probes to edit the rule involved in the current rule evaluation or any other active or candidate rule and then restart the rule evaluation from the current rule evaluation state is accomplished through the use of an editor.

139. The method of claim 136, wherein the ability of the probes to change what is being monitored and how it is being monitored is accomplished through the use of an editor.

140. The method of claim 124 or 133, wherein the enterprise comprises classes of external components, and wherein rules operating as agents simulate common events and activities for each class of external components.

141. The method of claim 124 or 133, wherein the rule evaluator senses whether a rule has changed over time, forces re-evaluation of the rule if it has changed, and raises an event to notify a user of the change.

142. The method of claim 124 or 133, wherein the rule evaluator comprises optimized primitive features for data-driven and goal-seeking logic, intelligent scheduling, quantification of variables, intensional rules, transducer-type rules, and testing rule behavior.

143. The method of claim 124 or 133, wherein the rule evaluator provides functionality for auto-generation of filler data and auto-generation and distribution of obfuscated data sets to specified organizational elements that are part of or external to the enterprise.

144. The method of claim 124 or 133, wherein data-driven and goal-seeking rules are used to reason about a means for achieving a goal, wherein the data-driven rules are supported by an extended form of forward chaining logic, wherein the goal-seeking rules are supported by an extended form of backward chaining logic, and wherein the extended forms of logic are provided by the rule evaluator.

145. The method of claim 144, wherein the data-driven and goal-seeking rules discover and assist in defining implications in sensitive data that might otherwise not be realized in an obfuscation activity.

146. The method of claim 124 or 133, wherein the method comprises providing one or more repositories and a code base, wherein each repository comprises content, and wherein information about the enterprise is not built into the code base but modeled in the content of one or more of the repositories.

147. The method of claim 124 or 133, wherein each active rule has one or more variables, wherein each active rule has a behavior, and wherein the behavior of an active rule expresses quantification of the variable(s) in the active rule.

148. The method of claim 124 or 133, wherein active rules are used to obfuscate the data, wherein each rule has a behavior, and wherein intensional rules are used in obfuscating data items, verifying the logic of the active rules used to conduct the obfuscation, and/or validating the behavior of rules during obfuscation.

149. The method of claim 124 or 133, wherein a transducer-type rule is a means for expressing temporal rule evaluations, and wherein transducer-type rules are used to support probabilistic selection of alternative changes of state and to learn which alternative state changes are more successful than others.

150. The method of claim 149, wherein each transducer-type rule has a specification, and wherein as probabilistic information is learned, the specification of the transducer-type rule is updated.

151. The method of claim 149, wherein a transducer-type rule processes an input and generates an output;

wherein the input is context-sensitive string and graph language input;

wherein the output is context-sensitive string and graph language output;

wherein the transducer-type rule comprises control logic and a memory;

wherein the control logic cycles the transducer-type rule through states and transitions;

wherein each state is context-sensitive;

wherein the memory comprises a symbol stack, a context stack, and a general purpose memory;

wherein the symbol stack holds information about handling the input;

wherein the context stack holds information about the context-sensitive state of the processing; and wherein the general purpose memory is used for various primitive functions.

152. The method of claim 151, wherein the transducer-type rule has an ability to call upon one or more other rules, effectuate a recursive call to itself, and/or form a new rule and launch the evaluation of that rule.

153. The method of claim 151, wherein the transducer-type rule a specifications of how to translate one language into another, and wherein the transducer-type rule has specialized and optimized primitives that simplify the specification.

154. The method of claim 151, wherein the transducer-type rule is an extended Mealy machine.

155. The method of claim 154, where the transducer-type rule undergoes transitions from one state to another, wherein there is a relation that defines each transition from one state to another state, and wherein the transducer-type rule visually represents its allowable behaviors by depicting its set of states and the relation that defines each transition from one state to another state.

156. The method of claim 155, wherein the visual representation is a labeled directed graph.

157. The method of claim 156, wherein the labeled directed graph comprises a set of vertices and a set of edges, and wherein the set of vertices represents the states and the set of edges represents the transitions.

158. The method of claim 157, wherein the graph comprises edges, wherein each edge is a labeled edge from one vertex to the same or another vertex, and wherein each edge has an edge input label and an edge output label.

159. The method of claim 158, wherein a specific execution of a transducer-type rule describes a path by indicating in order all of the labeled edges used from an initial state to a final state.

160. The method of claim 158, wherein the transducer-type rule is reused in the expression of both an edge input label and an edge output label, wherein there may be more than one reference to the same transducer-type rule, and wherein each reference to the same transducer-type rule is a different instance of that transducer-type rule.

161. The method of claim 158, wherein the transducer-type rule hosts a transition, wherein a reference to another transducer-type rule or a recursive reference to the transducer-type rule that is hosting the transition is substituted for any edge output label or edge input label.

162. The method of claim 149, wherein intrinsic multi-threading of a transducer-type rule is supported such that more than one execution may be concurrently in progress with one or more other executions in the same transducer-type rule.

163. The method of claim 124 or 133, wherein the rule evaluator enables multiple process threads to use the same active rule simultaneously.

164. The method of claim 163, wherein each rule has static and mutable aspects, and wherein the static aspects of a rule are shared among the threads and the mutable aspects of a rule are replicated into a separate instance for each thread.

165. The method of claim 149, wherein the transducer-type rule has an output, wherein the transducer-type rule executes an operation when the rule evaluator causes the rule to be evaluated, and wherein the transducer-type rule is successful in its execution if its output is not empty.

166. The method of claim 124 or 133, wherein the method comprises providing one or more repositories, wherein transducer-type rules are used to support probabilistic selection of alternative changes of state and to learn which alternative state changes are more successful than others, wherein the transducer-type rule has an ability to make new assertions to the repositories, and wherein an assertion has an ability to cause one or more other assertions to be added or an existing assertion to be modified or removed.

167. The method of claim 124 or 133, wherein the method comprises providing one or more repositories, wherein transducer-type rules are used to support probabilistic selection of alternative changes of state and to learn which alternative state changes are more successful than others, and wherein the transducer-type rule has an ability to query the repositories using data-driven and goal-seeking logic features.

168. The method of claim 124 or 133, wherein transducer-type rules are used to support probabilistic selection of alternative changes of state and to learn which alternative state changes are more successful than others, wherein each transducer-type rule has a specification, and wherein each transducer-type rule has a retrospection ability that allows the transducer-type rule to examine its own specification and/or the specification of another transducer-type rule, what that rule is doing, what it has done, and what it will do next.

169. The method of claim 124 or 133, wherein transducer-type rules are used to support probabilistic selection of alternative changes of state and to learn which alternative state changes are more successful than others, wherein each state comprises one or more edges, and wherein the transducer-type rule has an ability to suspend or terminate a transition operation of one or more edges of the same state.

170. The method of claim 124 or 133, wherein transducer-type rules are used to support probabilistic selection of alternative changes of state and to learn which alternative state changes are more successful than others, and wherein the transducer-type rule has an ability to dynamically create, modify or destroy one or more transducer-type rules.

171. The method of claim 124 or 133, wherein the rule evaluator is a logic programming system that uses a transducer-type rule as a means for knowledge representation.

172. The method of claim 124 or 133, wherein candidate rules and active rules have execution behaviors, and wherein the rule evaluator comprises functionality for testing candidate and active rules through tracing and simulating the execution behavior of a rule.

173. The method of claim 172, wherein the simulation is presented graphically to a user as a network of nodes and links depicting steps, their execution status and errors, and including multiple paths to depict multi-threaded operations.

174. The method of claim 124 or 133, wherein the rule evaluator includes functionality for the automated generated of filler data;
  wherein the filler data is added to one or more data sets;
  wherein each data set has metadata;
  wherein the metadata has constraints;
  wherein the rule evaluator evaluates a rule that has a specification; and
  wherein the new filler data abides by the constraints of the metadata for each data set as specified by one or more repositories that participate in the specification.

175. The method of claim 174, wherein the generation of filler data is accomplished by deriving the filler data from actual data.

176. The method of claim 174, wherein the filler data is comprised of one or more data types, wherein there is a technique for generating each data type, and wherein the generation of filler data is accomplished by generating artificial data based on rules that specify the technique for generating each data type.

177. The method of claim 124 or 133, wherein the method comprises providing one or more repositories, wherein there are rules and properties for obfuscation, and wherein obfuscated data sets are created automatically by evaluating the rules and properties for obfuscation in the various repositories.

178. The method of claim 124 or 133, wherein transducer-type rules are used to support probabilistic selection of alternative changes of state and to learn which alternative state changes are more successful than others;
  wherein the enterprise has one or more external obfuscation applications;
  wherein each external obfuscation application conducts obfuscation activities and generates results; and
  wherein the transducer-type rule has an ability to remotely configure, execute and examiner the results of one or more obfuscation activities of the external applications.

179. The method of claim 149, wherein the enterprise has one or more external obfuscation applications, wherein each external obfuscation application conducts obfuscation activities and generates results, and wherein the transducer-type rule has an ability to remotely configure, execute and examine the results of one or more obfuscation activities of the external applications.

180. The method of claim 124 or 133, wherein the method comprises providing one or more repositories, wherein each repository holds data content, and wherein each repository comprises a repository manager.

181. The method of claim 180, wherein the repository manager provides functionality for computationally searching and editing the repository content, performing general purpose algorithmic services, and performing management services for persisting and virtualizing the content of the repository in an execution environment.

182. The method of claim 124 or 133, wherein the method comprises providing one or more repositories, and wherein context-sensitive string and graph language statements are translated into statement in the graph language that are persisted in the repositories.

183. The method of claim 182, wherein the graph language statements are interpreted by a graph automaton in each repository.

184. The method of claim 124 or 133, wherein there are obfuscation rules for the enterprise;
wherein the data to be obfuscated exists in one or more data sets;
wherein each data set has metadata;
and wherein the obfuscation rules include specifications for what data elements are to be obfuscated, what obfuscation technique is to be applied to a data element, how each obfuscation technique is to operate, how to get the metadata about a data set, binding a data element to a data resource, decomposition of a data element into subfields, how and where to substitute a new value for a data item or items, relationships among and between the data sets of the enterprise, how an obfuscation activity is to operate, how and what to monitor in an obfuscation activity, and how and what to report in an obfuscation activity.

185. The method of claim 184, wherein the method comprises providing one or more repositories, and wherein the obfuscation rules are predefined and preloaded in the repositories.

186. The method of claim 124 or 133, wherein one or more of the following functions is/are applied to one or more single or combined data elements to create obfuscation rules that specify a desired obfuscation activity and/or how the obfuscation activity is to be temporally ordered: pre-masking, derivation, value domain constraints, substitution, and post-masking.

187. The method of claim 124 or 133, wherein the data to be obfuscated comprises data elements, wherein each data element has a data type, and wherein the data type of each data element is recognized and the data types of all of the data elements need not be the same.

188. The method of claim 187, wherein data constraints are associated with each data element, and wherein the data constraints associated with a data element controls what data values are allowable for that data element.

189. The method of claim 124 or 133, wherein complex data types are decomposed into collections of standard data types using rules, and wherein each rule specifies a particular decomposition of a complex data type.

190. The method of claim 187, wherein a data type has a specification, wherein there are constraints associated with a data element, and wherein the rule editor has an ability to extend the constraints associated with a data element to include constraints other than the specification of a data type, wherein a data element comprises data values, and wherein this ability applies whether the data values are concrete or symbolic.

191. The method of claim 124 or 133, wherein the rule editor comprises functionality for extending information about a rule to include a provision for documenting the rule from different perspectives.

192. The method of claim 191, wherein the rule has a test and acceptance status, wherein the rule has a development process and progress, and wherein the documentation of the rule includes describing the rule, reporting the test and acceptance status of the rule, and documenting the development process and progress of the rule.

193. The method of claim 124, further comprising providing a data systems metadata interface, wherein the data systems metadata interface dynamically extends metadata of a data system so that bindings may be created by the rule evaluator between the metadata of a data system and associated rules.

194. The method of claim 193, wherein information that specifies the active rule to be applied to a particular data element is included in the metadata extensions.

195. The method of claim 133, wherein the data systems metadata interface dynamically extends metadata of a data system so that bindings may be created by the rule evaluator between the metadata of a data system and associated rules.

196. The method of claim 195, wherein information that specifies the active rule to be applied to a particular data element is included in the metadata extensions.

197. The method of claim 124, further comprising providing a metadata editor and repository, wherein the enterprise comprises one or more data systems, wherein the data systems comprise data resources, wherein there is metadata about the data resources, and wherein the metadata editor extends the metadata about the data resources in the data systems of the enterprise.

198. The method of claim 197, wherein the extensions of the metadata include information about what data elements are to be obfuscated and how each data element is to be obfuscated.

199. The method of claim 197, wherein the extended metadata is in the form of rules that are directly interpreted by the rule evaluator.

200. The method of claim 197, further comprising providing a data systems metadata interface and a data systems explorer, wherein the metadata editor receives metadata from the data systems metadata interface as directed by the data systems explorer.

201. The method of claim 133, wherein the enterprise comprises one or more data systems, wherein the data systems comprise data resources, wherein there is metadata about the data resources, and wherein the metadata editor extends the metadata about the data resources in the data systems of the enterprise.

202. The method of claim 201, wherein the extensions of the metadata include information about what data elements are to be obfuscated and how each data element is to be obfuscated.

203. The method of claim 201, wherein the extended metadata is in the form of rules that are directly interpreted by the rule evaluator.

204. The method of claim 201, wherein the metadata editor receives metadata from the data systems metadata interface as directed by the data systems explorer.

205. The method of claim 124, further comprising providing an external models interface, wherein there are one or more external models, wherein each external model has specifications, and wherein the external models interface assimilates relevant metadata information from pre-existing external model specifications.

206. The method of claim 205, wherein each external model has a language, wherein the language has a grammar, and wherein the external models interface is a mutable transducer-type rule that parses the language of the external model by applying the grammar for that language.

207. The method of claim 206, wherein the transducer-type rule of the external models interface is a series of transformal grammars that are applied so as to produce an efficient and useful result of the parse action.

208. The method of claim 207, further comprising providing a candidate rule editor repository and a data systems explorer, wherein the result of the parse action is transduced into a graph structure that is readily assimilated into the candidate rule editor repository and by the data systems explorer.

209. The method of claim 124, further comprising providing an external models interface that generates candidate rules.

210. The method of claim 132, wherein there are one or more external models, wherein each external model has specifications, and wherein the external models interface assimilates relevant metadata information from pre-existing external model specifications.

211. The method of claim 210, wherein each external model has a language, wherein the language has a grammar, and wherein the external models interface is a mutable transducer-type rule that parses the language of the external model by applying the grammar for that language.

212. The method of claim 211, wherein the transducer-type rule of the external models interface is a series of transformal grammars that are applied so as to produce an efficient and useful result of the parse action.

213. The method of claim 212, wherein the result of the parse action is transduced into a graph structure that is readily assimilated into the candidate rule editor repository and by the data systems explorer.

214. The method of claim 133, wherein the external models interface generates candidate rules.

215. The method of claim 124, further comprising providing a data systems explorer, wherein the enterprise comprises one or more data systems, and wherein the data systems explorer is specialized and optimized to discover, locate and extricate metadata about the data systems and to index the metadata that it finds.

216. The method of claim 215, further comprising providing a metadata editor and repository, wherein the data systems comprise data sets, and wherein when the data systems explorer discovers a new or changed data set, it directs the metadata editor to update its repository.

217. The method of claim 216, further comprising providing a data systems metadata interface, wherein the metadata editor and repository create dynamic bindings to a data system's metadata resources through the data systems metadata interface.

218. The method of claim 216, wherein metadata is bound to active rules, and wherein the metadata editor repository knows all of the metadata that is bound to the active rules.

219. The method of claim 216, wherein a data system comprises metadata, and wherein if the rule evaluator detects a change in the metadata of a data system, the rule evaluator notifies the metadata editor to update its repository.

220. The method of claim 133, wherein the enterprise comprises one or more data systems, and wherein the data systems explorer is specialized and optimized to discover, locate and extricate metadata about the data systems and to index the metadata that it finds.

221. The method of claim 220, wherein the data systems comprise data sets, and wherein when the data systems explorer discovers a new or changed data set, it directs the metadata editor to update its repository.

222. The method of claim 221, wherein the metadata editor and repository create dynamic bindings to a data system's metadata resources through the data systems metadata interface.

223. The method of claim 221, wherein metadata is bound to active rules, and wherein the metadata editor repository knows all of the metadata that is bound to the active rules.

224. The method of claim 221, wherein a data system comprises metadata, and wherein if the rule evaluator detects a change in the metadata of a data system, the rule evaluator notifies the metadata editor to update its repository.

225. The method of claim 124, further comprising providing a data set editor, wherein the data set editor comprises functionality for satisfying transactional integrity requirements for atomicity, consistency, isolation and durability.

226. The method of claim 133, wherein the data set editor comprises functionality for satisfying transactional integrity requirements for atomicity, consistency, isolation and durability.

227. The method of claim 124, further comprising providing an interactive monitor, wherein results are generated when a rule is evaluated by the rule evaluator, wherein there is metadata about the enterprise, and wherein the interactive monitor monitors user-specified events, the generation of results such that results that are incongruent with one or more active rules are detected, and changes to the metadata about the enterprise.

228. The method of claim 133, wherein results are generated when a rule is evaluated by the rule evaluator, wherein there is metadata about the enterprise, and wherein the interactive monitor monitors user-specified events, the generation of results such that results that are incongruent with one or more active rules are detected, and changes to the metadata about the enterprise.

229. The method of claim 124, further comprising providing an interactive monitor, wherein the interactive monitor comprises a monitor editor and repository, and wherein the monitor editor creates active monitor probes.

230. The method of claim 133, wherein the interactive monitor comprises a monitor editor and repository, and wherein the monitor editor creates active monitor probes.

231. The method of claim 229 or 230, wherein the active monitor probes provide verification reporting through query and review of active monitoring rules and validation reporting through simulation of selected events and activities to validate their expected behavior.

232. The method of claim 124, further comprising providing an interactive monitor, wherein the interactive monitor has an operation, wherein the interactive monitor comprises a test, verify and validation manager, and wherein the test, verify and validation manager tests the operation of the interactive monitor.

233. The method of claim 133, wherein the interactive monitor has an operation, wherein the interactive monitor comprises a test, verify and validation manager, and wherein the test, verify and validation manager tests the operation of the interactive monitor.

234. The method of claim 124, further comprising providing an interactive monitor and a data set editor, wherein a data set comprises content, wherein the interactive monitor comprises an active monitor, and wherein the active monitor and rule evaluator together have an ability to override rules that are involved with accessing a data set by adding new rules that represent the content of a data set and/or set a state of the data set editor through a primitive rule that blocks changes to a designated data set.

235. The method of claim 133, wherein a data set comprises content, wherein the interactive monitor comprises an active monitor, and wherein the active monitor and rule evaluator together have an ability to override rules that are involved with accessing a data set by adding new rules that represent the content of a data set and/or set a state of the data set editor through a primitive rule that blocks changes to a designated data set.

236. The method of claim 124, further comprising providing an interactive monitor, wherein the interactive monitor comprises a monitor reporting manager and a monitor editor, wherein events and activities are specified to be monitored using the monitor editor, wherein the events and activities have a presentation, and wherein the monitor reporting manager formats the presentation of specified properties of events and activities that have been specified to be monitored.

237. The method of claim 133, wherein the interactive monitor comprises a monitor reporting manager and a monitor editor, wherein events and activities are specified to be monitored using the monitor editor, wherein the events and activities have a presentation, and wherein the monitor reporting manager formats the presentation of specified properties of events and activities that have been specified to be monitored.

238. The method of claim 124, further comprising providing an interactive monitor, wherein the interactive monitor comprises an enunciator manager, and wherein the enunciator manager senses high-interest events that are designated for enunciation by a user.

239. The method of claim 133, wherein the interactive monitor comprises an enunciator manager, and wherein the enunciator manager senses high-interest events that are designated for enunciation by a user.

240. The method of claim 124, further comprising providing an interactive monitor, wherein the interactive monitor comprises an alarm manager, and wherein the alarm manager senses events and activities that are designated to be alarmed.

241. The method of claim 133, wherein the interactive monitor comprises an alarm manager, and wherein the alarm manager senses events and activities that are designated to be alarmed.

242. The method of claim 124, further comprising providing an interactive monitor, wherein the interactive monitor comprises a transcript report generator, wherein active rules are evaluated by the rule evaluator, and wherein the transcript report generator senses events and activities that are designated to be reported and creates a transcript report of activities performed by the evaluation of an active rule.

243. The method of claim 133, wherein the interactive monitor comprises a transcript report generator, wherein active rules are evaluated by the rule evaluator, and wherein the transcript report generator senses events and activities that are designated to be reported and creates a transcript report of activities performed by the evaluation of an active rule.

244. The method of claim 133, wherein the multi-platform runtime environment is scalable, allows multiple instances to operate concurrently, and allows an instance to have its own multiple execution threads operating concurrently.

245. The method of claim 124 or 133, wherein data from multiple disparate data systems is obfuscated.

246. The method of claim 124 or 133, wherein the data to be obfuscated may be either online or offline.

* * * * *